United States Patent [19]
Polk et al.

[11] Patent Number: 5,634,002
[45] Date of Patent: May 27, 1997

[54] METHOD AND SYSTEM FOR TESTING GRAPHICAL USER INTERFACE PROGRAMS

[75] Inventors: George A. Polk, Sunnyvale; Vladimir G. Ivanovic, Palo Alto; Hans E. Muller, Saratoga; John S. Kern, Mountain View; Robert Jervis, Monte Sereno; Rance DeLong, Los Gatos, all of Calif.

[73] Assignee: Sun Microsystems, Inc., Mountain View, Calif.

[21] Appl. No.: 455,583

[22] Filed: May 31, 1995

[51] Int. Cl.$^6$ .................................................. G06F 11/00
[52] U.S. Cl. .................................. 395/183.14; 395/183.22
[58] Field of Search .......................... 395/183.14, 183.13, 395/183.15, 184.01, 183.22

[56] References Cited

U.S. PATENT DOCUMENTS

| | | | |
|---|---|---|---|
| 5,233,611 | 8/1993 | Triantafyllos et al. | 395/183.14 |
| 5,333,302 | 7/1994 | Hensley et al. | 395/183.14 |
| 5,355,342 | 10/1994 | Pope et al. | 395/183.14 |

FOREIGN PATENT DOCUMENTS

WO94/11818  5/1994  WIPO .......................... G06F 11/00

OTHER PUBLICATIONS

Mosley et al., "Client–Server User Interface Testing", IEEE Software, vol. 12, Iss. !, pp. 124–127. Jan. 1995.

Andreas,"Automated Regression Testing Of Graphical User Interface Based Applications", System Sciences, 1991 Ann. conf. vol. II IEEE 1991.

Su et al., "Experience In Testing The Motif Interface", IEEE Software, vol. 8, Iss.2, pp. 26–33 Mar. 1991.

Yip et al., "Graphical User Interface Validation: A Problem Analysis And A Strategy To Solution", IEEE pp. 91–100 1991.

Yip et al., "Applying Formal Specification And Functional Testing To Graphical User Interfaces", IEEE pp. 557–561 1991.

*Primary Examiner*—Robert W. Beausoliel, Jr.
*Assistant Examiner*—Joseph E. Palys
*Attorney, Agent, or Firm*—Timothy J. Crean

[57] ABSTRACT

In a preferred embodiment, the present invention provides an improved method and system for testing a graphical user interface program. The preferred embodiment provides improved performance over prior methods because it decouples the testing of an program's engine component from the testing of its GUI component. The preferred method begins the testing process by invoking test functions that send data to the program's engine component. The data simulates user action on the graphical user interface of the program. In response to receiving the data, the engine component processes the simulated user action as if it had been sent from the graphical user interface component. The preferred method captures the results of this processing and uses the results to determine whether the engine component is performing properly. By testing the engine component without invoking the graphical user interface component, the preferred embodiment reduces the overall time spent testing the GUI program and allows the testing of the program to begin at an earlier point in the development process than had earlier been possible.

19 Claims, 9 Drawing Sheets

NhFunction

| Varies | NhFunction |
|---|---|
| Handle | Application |
| String | Name of library function |
| String | Name of library |
| int | Number of arguments to follow this one (between 0 and 25, this argument is required only in the C interface, because Perl is capable of counting the arguments for you) |
| ... | additional optional arguments |

This is a very powerful function. It is only available from the driver-side interfaces and it allows you to cause the calling of any library function from within the client application. The function must exist within a shared library that you can name. If not linked to your client application already, the shared library will be linked to it and the function you specify will be called by the client application. In this way you can get additional functionality out of the driver-client link and are not limited merely to calls which we have implemented for you (like NhXtMoveWidget, NhXmGetFocusWidget, NhXtMapWidget, and so forth.) The return value is whatever the function within the client returns after the call is complete. There is a maximum limit of 25 optional arguments to the NhFunction call. See also the information on NhSymbol, NhPointerToObject, and NhObjectToPointer calls.

C:
```
NHHandle ap;
NHObject shell;
void *widget;
...
widget = NhObjectToPointer(ap, shell);
NhFunction(ap, "XtMoveWidget", "libXt.so", 3, widget, 20, 20);
```

Perl: `$widget = &NhObjectToPointer($ap, $shell);`

FIG. 5

NhSymbol

| Varies | NhSymbol | |
|---|---|---|
| Handle | Application | |
| String | Symbol name | |
| String | Library name | |

This function allows you to look up symbols out of a shared library. The symbols returned may be used in calls within the client that you generate with the NhFunction call. The return value of this call varies with the type of symbol returned.

| C | NHHandle ap;<br>void *widget_class;<br>...<br>widget_class = NhSymbol(ap, "xmPushButtonWidgetClass", "libXm.so"); |
|---|---|
| Perl | $widget_class = &NhSymbol($ap, "xmPushButtonWidgetClass", "libXm.so"); |

FIG. 6

NhPointerToObject

| Success | NhPointerToObject |
|---|---|
| Handle | Application |
| Pointer | Client-side pointer to convert to a driver-side object |

This function converts a client-side widget pointer (or object pointer in XView) to a driver-side hierarchical object name. When used in conjunction with NhFunction, this allows you to return values that are widgets and convert them to objects you can address in driver-side scripts.

C:
```
NHHandle ap;
NHObject shell, button;
void *shell_widget_pointer;
void *button_widget_pointer
...
shell_widget_pointer = NhObjectToPointer(ap, shell);
button_widget_pointer = NhFunction(ap, "XtNameToWidget", "libXt.so", 2,
shell_widget_pointer, "*filebutton");
button = NhPointerToObject(ap, button_widget_pointer);
...
NhButtonEvent(ap, button, Button1, NHClick, NHCenter, NHCenter);
```

Perl:
```
$shell_widget_pointer = &NhObjectToPointer($ap, $shell);
$button_widget_pointer = &NhFunction($ap, "XtNameToWidget",
"libXt.so", $shell_widget_pointer, "*filebutton");
$button = &NhPointerToObject($ap, $button_widget_pointer);
...
&NhButtonEvent($ap, $button, $Button1, &NHClick, &NHCenter,
&NHCenter);
```

FIG. 7

NhObjectToPointer

| Success | NhObjectToPointer |
|---|---|
| Handle | Application |
| Object | Object to convert a client-side pointer |

This function converts a driver-side hierarchical name object to a client-side widget pointer (or object pointer in XView.) used in conjunction with NhFunction, this allows you to make function calls within the client on any object you know the name of on the driver-side.

| C | NHHandle ap;<br>NHObject button;<br>void *widget_pointer;<br>...<br>widget_pointer = NhObjectToPointer(ap, button);<br>NhFunction(ap, "XtUnmapWidget", "libXt.so", 1, widget_pointer); |
|---|---|
| Perl | $widget_pointer = &NhObjectToPointer($ap, $button);<br>&NhFunction($ap, "XtUnmapWidget", "libXt.so", $widget_pointer); |

FIG. 8

METHOD AND SYSTEM FOR TESTING GRAPHICAL USER INTERFACE PROGRAMS

COPYRIGHTED MATERIALS

A portion of the disclosure of this patent document contains material which is subject to copyright protection. The copyright owner has no objection to the facsimile reproduction by anyone for purpose of review of the patent document or the patent disclosure, as it appears in the Patent and Trademark Office patent files or records, but otherwise reserves all copyrights whatsoever.

BACKGROUND OF THE INVENTION

1. Field of the Invention

This invention relates generally to the field of software testing and, more particularly, to the field of testing graphical user interface programs.

2. Description of the Related Art

One aspect of the field of software testing focuses on the testing of graphical user interface programs (GUI programs). A GUI program is a program that provides functionality which is not accessible from a command line but is accessible through the program's graphical user interface. Typically, GUI program testing takes place during a product development cycle of a new program. GUI program testing may also take place during the development of a new version of an existing GUI program.

GUI program testing often relies on a test engineer manually trying different user input combinations and noting anomalies as they occur. After the engineer changes the software to address the anomalies, the manual testing process is repeated until the test engineer verifies that the anomalies have been fixed. Manual testing has several drawbacks. For example, it is prone to error because it relies too heavily on human involvement in the testing process.

Due to the inadequacies of manual testing techniques, automated testing techniques have been developed. FIG. 1 illustrates a computer system 100 for testing a GUI program 101 using automated testing techniques found in the prior art. The computer system 100 includes a display device 103, a storage device 105, an input device 107, and a computer 109. The computer includes an interface 111, a processor 113, and a computer memory 115, which stores the GUI program 101. The GUI program includes a GUI component 119 and an engine component 121. The GUI component updates and retrieves information from a GUI 117. In short, the GUI component has program code to control changes to the GUI. Typically, the code is generated automatically from GUI builders. Engine code is code that implements the program's functionality. In other words, engine code generates the information to be displayed on the GUI.

Prior art automated testing methods simulate input events (such as mouse clicks) in order to test the same data processing paths that are invoked in response to user input. In this way all functionality in a GUI program is tested through the program's GUI component. The prior art methods begin the testing process by having a user enter data through a GUI 117 using the input device 107. For example, the inputs may indicate that a "File Open" command should be invoked. The method records the user inputs and saves them to a separate file. The recorded inputs are used as a test script 123 later in the testing process. A test script engine 124 drives the test script 123. In response to the inputs, the GUI 117 changes its state. For example, if the inputs indicate that a "File Open" operation should be invoked, then the method opens a file and displays it on the display device 103. In response to the changes in the GUI the method saves the new GUI state as a bitmap in a raster file (also called saving a "snapshot" of the GUI). The bitmap may also be saved in any other type of image format.

The snapshot acts as a baseline for comparing the program's response to user inputs at an earlier point in the development process with the program's response to the same user input at a later point in the development process. For example, as the development process continues, changes are made to the program code underlying the GUI component 119 and the engine component 121. In order to test the changes using automated techniques, the prior art method replays the user inputs recorded earlier. In response to replaying the user input, the GUI component 119 invokes the engine component 121 which in turn instructs the GUI component to redraw the GUI. In this way the engine component 121 is invoked through the GUI component 119. The method then takes a snapshot of the changes to the GUI 117. Finally, the earlier snapshot is compared to the later snapshot. If the snapshots are identical then the method concludes that the changes made to the program work properly. Non-identical snapshots may indicate that a bug has been introduced into the program.

There are several disadvantages associated with the automated testing techniques used in the prior art. The maintainability of the "test scripts" (i.e., the recorded user inputs) is low. In other words, as the development cycle progresses, the GUI 117 typically undergoes a wide variety of changes. Therefore, the user inputs made at an early stage of development may be meaningless at a later stage of development. One example could involve recording a user selecting a pull-down menu on a first screen and then invoking a "File Open" command from the pull-down menu. If the "File Open" command was removed from the pull-down menu of the first screen during the development cycle then the test script would be invalid when testing the revised pull-down menu. In this case a comparison of GUI snapshots would be impossible.

Another disadvantage associated with the prior art method involves the difficulty involved in porting the test scripts to different platforms. If the "baseline" snapshot is taken on a first platform and subsequently compared to a snapshot taken on a second platform then the bitmaps will not match if any of the system parameters change between the platforms. For example, snapshots taken on an Intel™ platform are often more condensed than snapshots taken on a Sparc™ platform. Therefore, the snapshots will not match even if the test script causes the same actions to occur to the GUIs of both platforms.

Another disadvantage associated with the method of the prior art is the amount of storage space required to store the snapshots. Each snapshot requires a significant amount of storage space. Often, over 300 snapshots are saved in order to fully test one GUI program. Such storage requirements are expensive and therefore provide a disincentive to using the prior art method.

Finally, even if the prior art testing method concludes that a bug was introduced into the GUI program, it is still difficult to determine whether the bug is in the GUI component 119, or the engine component 121, or some combination of the two components.

SUMMARY OF THE INVENTION

In a preferred embodiment, the present invention provides an improved method and system for testing a graphical user interface program. The preferred embodiment provides improved performance over prior methods because it decouples the testing of a program's engine component from the testing of its GUI component. The preferred method begins the testing process by invoking test functions that send data to the program's engine component. The data simulates user action on the graphical user interface of the program. In response to receiving the data, the engine component processes the simulated user action as flit had been sent from the graphical user interface component. The preferred method captures the results of this processing and uses the results to determine whether the engine component is performing properly.

DESCRIPTION OF THE DRAWINGS

FIG. 5 illustrates the programming interface for NhFunction in a language independent format.

FIG. 6 illustrates the programming interface for NhSymbol in a language independent format.

FIG. 7 illustrates the programming interface for NhPointerToObject in a language independent format.

FIG. 8 illustrates the programming interface for NhObjectToPointer in a language independent format.

Appendix A is a No Hands manual.

DESCRIPTION OF THE PREFERRED EMBODIMENT

Overview of the Preferred Method

In a preferred embodiment, the present invention provides an improved method and system for testing a graphical user interface program. The present invention overcomes problems in the prior art by decoupling the testing of the program's engine component from the testing of the program's GUI component.

The preferred embodiment is typically used during the development of a new product. Not all components of a product move through the development cycle at the same pace. It has been observed that the design of an engine component of a GUI program typically stabilizes before the design of a graphical user interface component. This observation is important to understanding why the prior art testing methods fail to efficiently test GUI programs. The prior art methods test each component of the graphical user interface program through the GUI component. It is inefficient to test a GUI program through a component whose design is typically unstable well into the product development cycle.

The preferred embodiment provides improved performance over prior methods because it tests a program's engine component without invoking the engine component through the GUI component. The preferred method begins the testing process by invoking test functions that send data to the program's engine component. The data simulates user action on the graphical user interface of the program. In response to receiving the data, the engine component processes the simulated user action as if it had been sent from the graphical user interface component. The preferred method examines the results of this processing to determine whether the engine component is performing properly. By testing the engine component without invoking the graphical user interface component, the preferred embodiment increases the portability and maintainability of the test scripts while reducing the overall time spent testing the GUI program.

Overview of the Preferred System

Figure 1:
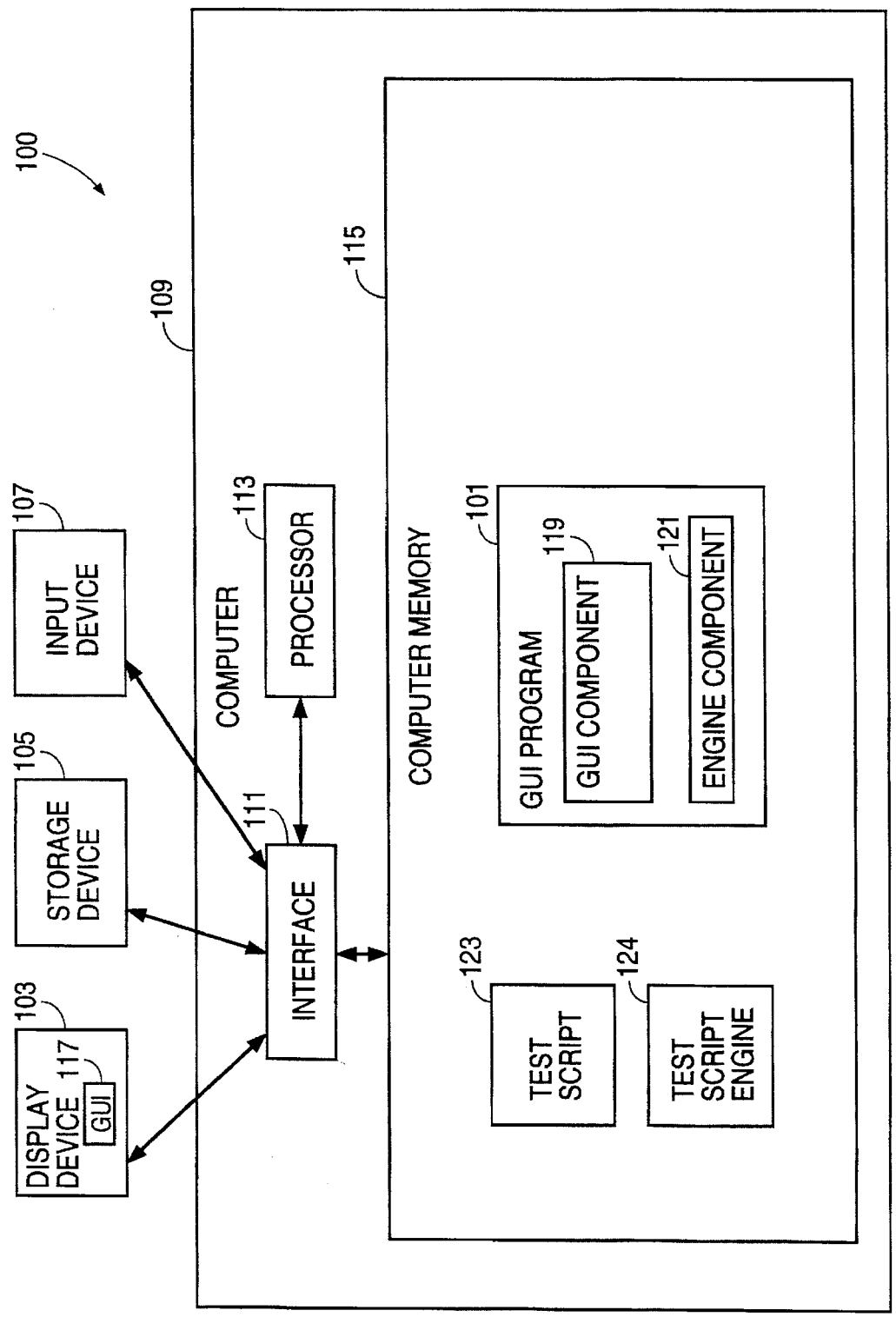
FIG. 1 illustrates a computer system for testing a GUI program using automated testing techniques found in the prior art.
Figure 2:
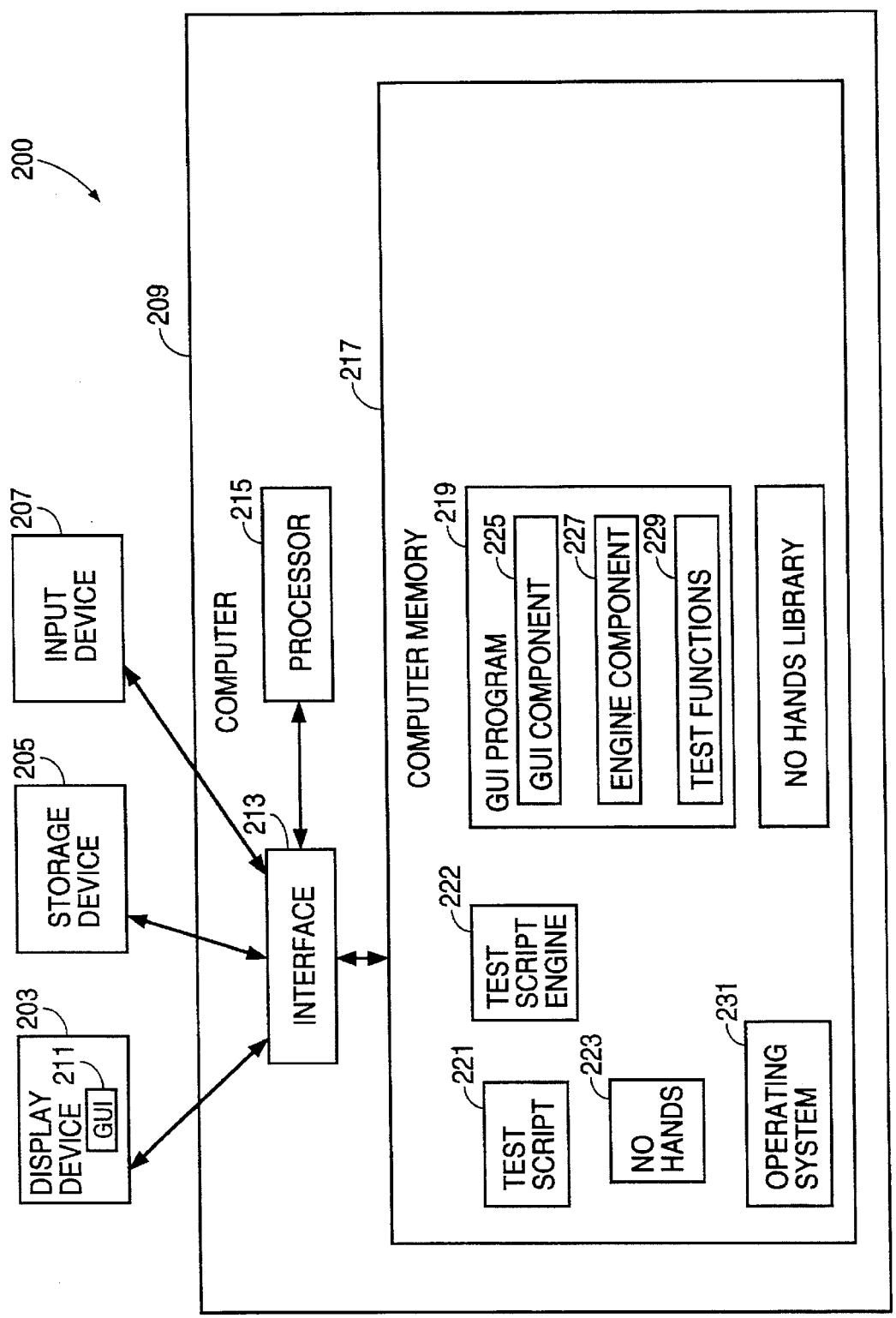
FIG. 2 illustrates a computer system for testing a GUI program using the automated testing techniques of the present invention.

FIG. 2 illustrates a computer system 200 which provides an environment for practicing the preferred method of the present invention. The computer system 200 includes a display device 203, a storage device 205, an input device 207, and a computer 209. The display device 203 includes a graphical user interface (GUI) 211 for facilitating the input and output of data in the system 200. The computer includes an interface 213, a processor 215, and a computer memory 217. The computer memory stores a number of items including a GUI program 219, a test script 221, and a test script engine 222. The GUI program and the test script are preferably implemented as distinct processes. The test script 221 includes a series of commands which invoke routines that simulate user action on a user interface of the GUI program. The simulated action is used to test the GUI program. Test scripts can be manually developed from design specifications of the GUI component and the engine component while both components are under development. The test scripts can also be created automatically through use of a computer program developed for that purpose. The commands are retrieved from the test script and sent to the GUI program via a component 223. In the preferred embodiment, the component 223 is the No Hands software product from SunSoft, a division of Sun Microsystems, Inc.[1] The No Hands product is described in the No Hands manual attached hereto as Appendix A and incorporated herein by reference. The No Hands program is preferably implemented as a distinct process and communicates with the test script and the GUI program through any well-known interprocess communication mechanism (not shown). The computer memory also includes an operating system 231.

[1]. Sun, SunSoft and Sun Microsystems are trademarks or registered trademarks of Sun Microsystems, Inc. in the United States and other countries.

In one embodiment of the present invention the GUI program includes a GUI component 225, an engine component 227, and a test function component 229. The GUI component updates and retrieves information from the GUI 211. The engine component implements the program's underlying functionality. The test function component is invoked from routines in a No Hands library 233. Those of ordinary skill will understand that the No Hands library can be linked, either dynamically or statically, into the GUI program. The test function sends simulated interactions between program components to the program's engine component. The test function component then returns a value to the test script 221 or the test script uses the No Hands component 223 to retrieve information to determine whether the engine component is functioning properly.

The Preferred Embodiment

Figure 3:
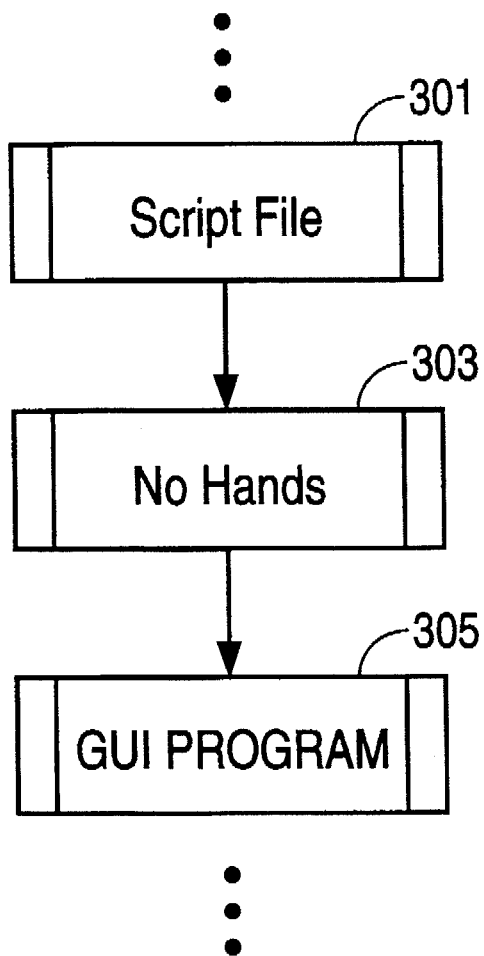
FIG. 3 illustrates a flow diagram that provides an overview of the processing that takes place when practicing an embodiment of the present invention.

FIGS. 3–9 are flow diagrams which illustrate a preferred method for practicing the present invention. FIG. 3 is a flow diagram that provides an overview of the processing that takes place in the system 200 when the preferred embodiment tests a GUI program. In step 301, the method invokes a test script. The test script then launches No Hands in step 303. No Hands retrieves from the test script a command which instructs the GUI program to run a test function. The No Hands process then sends the command to the GUI program. In step 305, the GUI program receives the command and invokes the test function indicated by the command. The test function invokes the engine component and then No Hands or the test script compares the result produced by the engine component with an expected result to determine whether the engine component works as expected.

Figure 4:
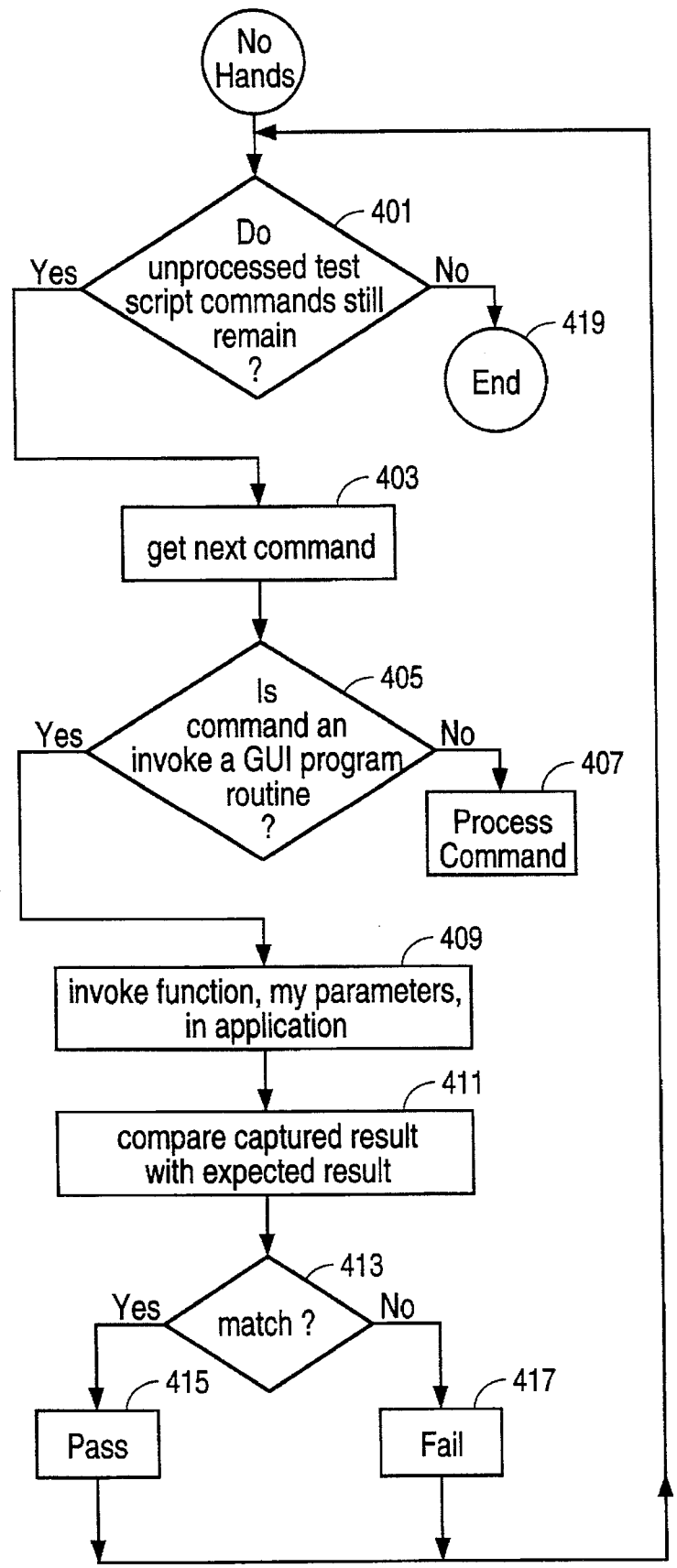
FIG. 4 is a flow diagram of the steps taken by a No Hands process when practicing an embodiment of the present invention.

FIG. 4 is a flow diagram of the steps taken by the No Hands process. Before processing begins in this method, the system opens the test script through a call to the operating system. The test script then launches No Hands through a call to the operating system. In step 401, No Hands determines whether unprocessed commands still remain in the test script. If unprocessed commands do remain, No Hands retrieves the next command from the test script (step 403). The command instructs the GUI program to invoke a test function which indicates whether the engine component of the program is working properly. In one embodiment, the preferred command is a No Hands NhFunction command. The NhFunction command allows a user of the command to cause the calling of any library routine within the GUI program. The routine may, for example, exist within a shared, linked library that can be named or in a binary program with a corresponding symbol table. In some embodiments, the NhFunction command calls an NhSymbol command which looks up symbols out of a shared library. The symbols returned may be used in calls generated by NhFunction. The NhFunction command may also call NhPointerToObject or NhObjectToPointer. NhPointerToObject converts a widget pointer from the GUI program to a corresponding object name maintained by No Hands. When used in conjunction with NhFunction, return values are converted to objects that can be addressed in the test scripts. NhObjectToPointer converts the No Hands' object name to the widget pointer recognized by the GUI program. When used in conjunction with NhFunction, function calls can be made within the GUI program on any object whose name is known by No Hands. FIG. 5 illustrates the programming interface for NhFunction in a language independent format. FIG. 6 illustrates the programming interface for NhSymbol in a language independent format. FIG. 7 illustrates the programming interface for NhPointerToObject in a language independent format. FIG. 8 illustrates the programming interface for NhObjectToPointer in a language independent format.

Returning to the discussion of FIG. 4, in step 405, No Hands examines the command it retrieved from the test script. If the command does not instruct the system to invoke a routine internal to the GUI program then normal processing occurs in step 407. However, if the command (e.g., the NhFunction command) does instruct the GUI program to invoke an internal routine (e.g., an internal test function) then No Hands executes the command to invoke the routine. Upon return from step 409, No Hands compares the result captured by the test function with an expected result (step 411). In the preferred embodiment a set of expected results is determined before testing begins and is maintained in a separate file. If the result from the engine component matches the expected result (step 413), then the engine component passes this test (step 415). If the results do not match then the engine component fails this test (step 417). Those of ordinary skill will understand that the comparison could also be carried out after performing a series of invocations of the engine component instead of after performing a single invocation of the engine component. Those of ordinary skill will also understand that the analysis of the captured results could alternatively be performed by the test script. Upon completion of step 415 or 417, processing continues with step 401. In step 401, if all the commands have been processed then processing stops in the test script (step 419).

Figure 9:
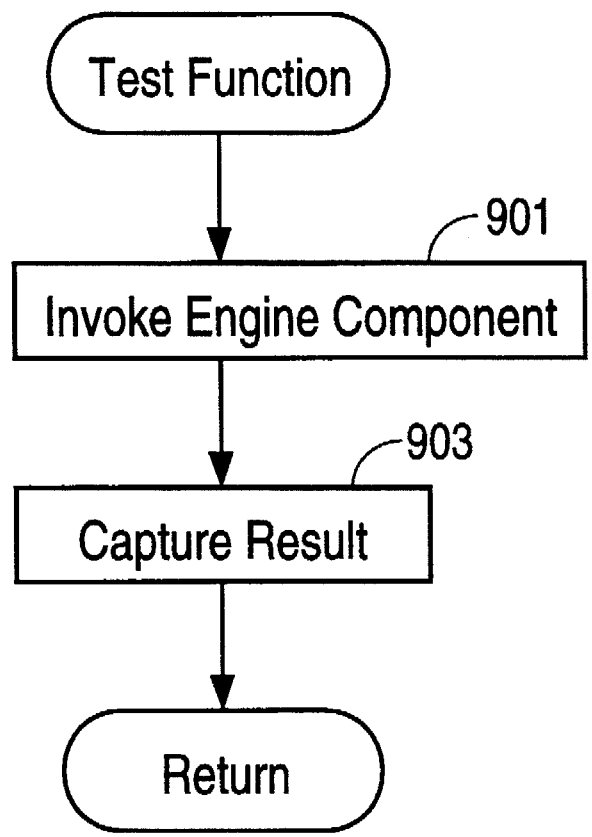
FIG. 9 is a flow diagram that illustrates the steps taken by a test function when practicing an embodiment of the present invention.

FIG. 9 is a flow diagram that illustrates the steps taken by the test function. In step 901, the test function invokes the engine component of the GUI program. The test function typically simulates interactions between program components, which are represented by a set of callbacks invoked by the GUI component in response to an event on the user interface. A callback is a routine that is automatically invoked in response to user input on a GUI object. For example, a set of callback routines could be invoked when the left mouse button is pressed and released while inside a button of a dialog box. Therefore, the test function typically invokes those parts of the engine component which would have been invoked by the callback routines associated with a given event. Those of ordinary skill will understand that test functions are not limited to simulating interactions between program components but could instead be written to simulate any action(s) processed by the program. At times, no actual data is sent via the test function, rather, the invocation of the test function is the data itself (e.g., instructing a debugger to perform a step). Test functions can also be written to provide access to internal data for consistency checking and to provide additional functionally that aids the testing process but is not exposed to the user.

In step 903, the test function captures the result of the data processing performed by the engine component. For example, the test function could instruct the GUI program to write its results to a separate file for later examination or the test function itself could have a return value that indicates the result of the processing. After performing the test, the test function returns to the No Hands process, indicating that the test function has completed its processing and the GUI program is ready to receive a new command.

By following the preferred method illustrated in FIGS. 3–9, a test engineer is able to test an engine component of a GUI program without invoking the engine component through the GUI component. After the design of the GUI component has stabilized, the test engineer can begin testing the GUI component. Since the test engineer knows that the engine component works properly, the test engineer need only make sure that the GUI appears correctly on the display device and that the proper callbacks are made in response to user action on the GUI.

The present invention provides a number of advantages over methods used in the prior art. First, the total time spent testing the GUI program decreases. In the prior art a bug was found by comparing snapshots. However, this technique did not tell the test engineer whether the bug was in the GUI component or the engine component. It was up to the test engineer to search both components looking for the bug. Using the techniques of the present invention this search time is minimized because the two components are tested separately.

Second, the present invention makes it easier to port the test scripts and test results. As was mentioned above, the prior art methods ran into problems when comparing snapshots of GUIs across different platforms. If any system parameters changed between platforms then the snapshots could give the false indication of a bug when the programs actually worked as expected. By creating test scripts which test the underlying functionality of the engine component, the present invention provides scripts which are easily ported because the underlying functionality of the GUI program typically remains substantially the same across platforms.

In short, the preferred embodiment provides complete flexibility by isolating testing of the GUI component from testing of the engine component.

From the foregoing it will be appreciated that, although specific embodiments of the invention have been described herein for purposes of illustration, various modifications may be made without deviating from the spirit and scope of the invention. For example, while the test functions have been shown and discussed as residing in the GUI program, those of ordinary skill in the art will appreciate that the test functions could alternatively be incorporated in a library and linked (either dynamically or statically) to the GUI program. While the embodiment discussed above uses the No Hands product to provide synchronization and inter-process communication, those of ordinary skill will understand that this functionality could be provided directly by the test script. While the embodiment discussed above illustrates one aspect of the invention using a GUI program and a test script, those of ordinary skill will understand that the invention can be used to provide more effective testing of any two software components.

While the interprocess communication channels have been discussed above as two-way communication links, those of ordinary skill will understand that one-way communication links could be substituted for some or all of the two-way communication links.

Another embodiment operates in a way substantially similar to the preferred embodiment, except that the test functions are used to test the GUI component 225 without invoking the engine component 227. In this way testing of the GUI component is decoupled from testing of the engine component.

Those of ordinary skill will understand that when test functions are included (i.e., instrumented) in the GUI program, the test functions can later be used to perform diagnostics on the program after it is operational in the field.

While the embodiment discussed above describes simulating user actions in the test functions, those of ordinary skill will realize that these test functions can be used to simulate and report on non-GUI events affecting the engine component, such as in a distributed or client/server application. For example, a query to a remote database could be reported on or even simulated by test functions.

APPENDIX A
No Hands
*Prepared by*
Van A. Boughner
Douglas R. Stein
2550 Garcia Avenue
Mountain View, CA 94043
U.S.A.
Part No.: 801-6803-01

Contents

| | |
|---|---|
| Preface. | ix |
| 1. Introduction | 1 |
| What is No Hands? | 1 |
| What Does No Hands Automate? | 2 |
| Functional Environments | 2 |
| Requirements | 3 |
| Support - "no-hands-support@sun" | 3 |
| No Hands v1.0 vs. v1.1 | 3 |
| Competing Technologies. | 3 |
| Using No Hands Tests Under TET. | 4 |
| Two Programming Interfaces for No Hands Driver | 4 |
| Clients of the No Hands Driver | 5 |
| Object Level Referencing | 7 |
| Test Scripts and Programs. | 8 |
| Event Simulation in No Hands | 9 |

|                                                      |      |
| ---------------------------------------------------- | ---- |
| Multiple Clients                                     | 10   |
| 2. Installation                                  | 11 |
| Installing No Hands                                  | 11   |
| Setting up Your Environment                          | 12   |
| 3. C Interface                                   | 15 |
| C Tests are Linked with libnhd                       | 16   |
| Components of a C Interface Test                     | 16   |
| Hierarchy Header Files                               | 17   |
| Launching Applications                               | 20   |
| User Input Simulation                                | 20   |
| Test Result Verification                             | 21   |
| Wrapup                                               | 22   |
| 4. Perl Interface                                | 23 |
| Perl Scripts are Interpreted by nhd                  | 24   |
| An Example of How Perl Differs from C                | 25   |
| Components of a Perl Interface Test                  | 25   |
| Making Perl Scripts Self-Executing                   | 26   |
| Hierarchy Header Files                               | 26   |
| Launching Applications                               | 29   |
| User Input Simulation                                | 30   |
| Verifying Test Results                               | 30   |
| Wrapup                                               | 31   |
| 5. Library Routine Groupings                     | 33 |
| Routines Available Only in the Driver Side Library   | 33   |

|   |   |   |
|---|---|---|
|   | Initialization and Utility Routines | 34 |
|   | Information Gathering Routines | 35 |
|   | Event Generation Routines | 35 |
|   | Objects Within Objects | 36 |
|   | Object Component Location | 37 |
|   | Image Routines | 39 |
|   | Routine Use Summary | 41 |
|   | Symbol Summary | 42 |
| 6. | Library Routine Reference | 47 |
| 7. | Advanced Topics/Trouble-shooting | 143 |
|   | System Calls and Environment | 143 |
|   | XView | 146 |
|   | OLIT | 150 |
|   | Motif | 153 |
|   | TET | 154 |
| A. | Samples - C | 155 |
|   | XView Sliders | 155 |
| B. | Samples - Perl | 159 |
|   | XView Textfields | 159 |
| C. | Acknowledgments | 163 |
| D. | References | 165 |
|   | Index | 167 |

Introduction 

What is No Hands?

No Hands is a user input simulation tool. Its applications include automating Graphical User Interface testing and driving GUI benchmarks. It is well-suited to any task where fast, reliable user input on a graphical user interface is required.

Test Automation

Automated testing is preferable to manual testing mainly because manual testing is more time consuming and error prone. The following benefits are gained by replacing the human in front of the computer with an automated test script:

- rapid and reliable test execution on many platforms
- test execution is more exact and tests more clearly defined
- tests can be easily repeated many times
- test failures are easy to duplicate
- tests may be executed by someone unfamiliar with the software being tested
- more engineering resources become available for test development and the job of software test engineer becomes more interesting and less repetitive

≡ 1

Benchmarking

When used for performance benchmarks, No Hands has the following benefits:

- fastest and most reliable execution possible
- input synchronization based on application's run state, rather than high cost image verification waits or timed sleeps
- low user and CPU time used in the tool itself

What Does No Hands Automate?

No Hands provides the mechanism for simulating the following kinds of user input:

- pointer button press
- pointer button release
- pointer movement
- key press
- key release and includes a number of other features as well:

- ability to launch, connect and interact with multiple applications
- image capture and comparison (at the object level)
- access to widget resources (OLIT and Motif) and object attributes (XView)
- automatic event synchronization
- variable event simulation speed

Functional Environments

No Hands tests can be written against applications which use any one of the following application programming interfaces:

- Motif
- OLIT
- XView
- Xt-only
- Xlib-only

1

Requirements

Before using No Hands, you must first install the XTrap server extension (which is provided with the No Hands distribution). You do not need XTrap if you have OpenWindows V3.2 or earlier (because No Hands can generate events using NeWS.)

Support - "no-hands-support@sun"

If you experience difficulties using No Hands, you are invited to contact the IMPS - TTAP group (Integrated Media Platform Software - Test Tools and Production, SunSoft Inc.) by email at *no-hands-support@sun*. We'd like to hear your comments and suggestions as well. Please understand that our group can only afford to support No Hands for use within our own organization, and so any aid we can give you is necessarily limited.

There is a mailing list for announcements and general questions, *no-hands-interest@sun*, which you can join by emailing a request to *owner-no-hands-interest@sun*.

No Hands v1.0 vs. v1.1

The current release of No Hands is referred to as version 1.1. It has many more features than No Hands v1.0. The original version of No Hands was limited to toolkit testing, because No Hands calls had to be made within the source code of applications under test.

Now, thanks to the implementation of a separated No Hands driver and client processes, applications under test no longer need to be modified when testing them with No Hands. No Hands v1.1 is a superset of the old functionality and backwards compatibility has been maintained with No Hands v1.0. You can read about the v1.0 in a separate document called *No Hands Backward Compatibility Interface* listed in Appendix D, "References".

Competing Technologies

There are a number of other tools on the market that address the need for user event simulation on GUI applications. Please see the *Input Simulation Tools* document listed in Appendix D, "References" for a good comparative analysis.

1

Using No Hands Tests Under TET

No Hands does not provide any reporting mechanism for test results (besides whatever you do with the boolean return values from function calls in your script) because it is only an input simulation tool. It is recommended that you place your tests under TET (The Test Environment Toolkit), or some other test execution harness, and take advantage of the automated test execution and reporting mechanisms available there.

See *The OpenWindows Regression Test Harness and a Guide to Using and Developing Tests Under TET* listed in Appendix D, "References" for more information.

Two Programming Interfaces for No Hands Driver

Users of No Hands may access it using either C or Perl, two full-featured and well-known programming languages. The C interface provides a quick start for those unfamiliar with Perl, and the Perl interface provides the ability to write scripts that don't need to be compiled. As shown in the diagram below, either interface can be used to produce an equivalent No Hands driver (a program that drives user event simulation for No Hands test clients.)

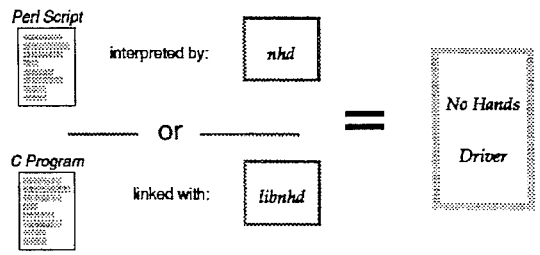

Functionally, the two interfaces are the same. Simply read the chapter on the interface you'd prefer to use, and then look through the chapter on the No Hands driver-side library routines. Both interfaces share the same api, differing only in syntax, so it won't be a hassle if you decide you'd like to switch later on.

1

Clients of the No Hands Driver

On a technical level, No Hands approaches event simulation in a unique way. The No Hands driver (produced using either the C or Perl interface, as diagrammed above) launches applications (clients) and forces them to link with a special client-side No Hands library. This does not alter the way the test clients work except to make them susceptible to commands and queries from the driver.

A No Hands client-side library (there's one for each GUI toolkit) will link itself to any client application which uses a dynamically shared library to access the routines available for its GUI toolkit.

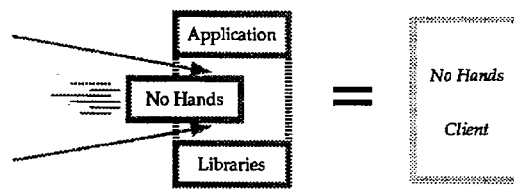

Because it coexists internally with the application's other libraries (most specifically, its GUI toolkit library), the No Hands client-side library has access to a great deal of information about the GUI objects in the application.

The following steps and diagram illustrate how a No Hands driver launches and connects with clients and how they get linked with the right No Hands client-side library at run-time:.

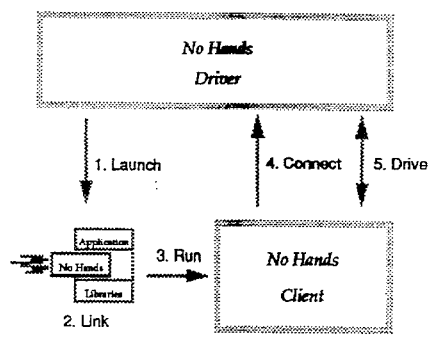

1. No Hands Driver launches Client
   In your Perl script or C program, you specify the name and command line arguments of the client to launch.

2. Client application is linked with a No Hands Client-side Library
   There is a No Hands client-side library specific to each graphical user interface environment. The right library for your client application will be linked to it automatically. The libraries available are:

a. libxd (for Xlib-only applications)

b. libxtd (for Xt-based applications)

c. libxvd (for XView-based applications)

d. libxold (for OLIT-based applications)

e. libxmd (for Motif-based applications)

3. Client application initializes itself and comes up
   This occurs in the normal way for the application. Linking with a No Hands client-side library does not interfere with the normal operation an application.

4. Client connects with No Hands Driver that launched it
   Once all widgets or objects in an application are launched and the application is ready for user input, it connects with the No Hands driver which launched it.

5. Driver does commands and queries
   Your test script (as written in Perl or C) now executes itself over the connection between Driver and Client.

Object Level Referencing

On the driver side, all locations on the display are defined by referring to one of the client's objects. You don't have to use absolute coordinates for button press or keystroke event generation requests. The location and size of every object is available to you, and you normally generate events by referring to an object and specifying that you'd like the action to take place at its center.

In order to have this ability on the driver side, it is necessary to execute a utility called nhquery before writing your test script or program. This utility executes the prospective client application and generates a hierarchy of all the GUI objects within it. The object hierarchy is placed in a header file which you then #include at the top of your script or program. You may then refer to the objects by the names given them in the header file.

If the hierarchical ordering of the GUI objects in the application ever changes, you run nhquery again, capturing the changes in the header file, and your test script will continue to function unmodified.

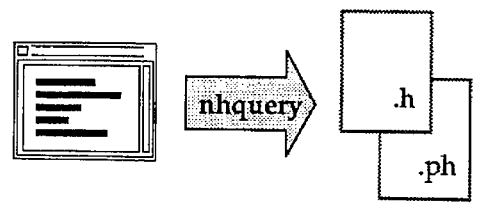

1

Event Simulation in No Hands

Once a driver and client are hooked up, your test script can take control of the client application as if a user were sitting in front of it. When a call is made in your test script to generate an X event on one of the objects in the client application, here is what occurs:

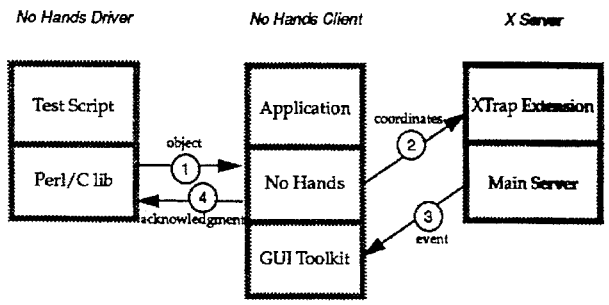

1. No Hands driver-side library generates an event simulation request and the No Hands client-side library receives it.
   Your Perl or C code leads to a common driver-side library routine shared by both the C and Perl interfaces. This routine sends the information about your request to the client. Such information usually consists of what action to perform and which object to perform it on.

On the client-side, the No Hands client-side library routine that handles driver requests is awakened by a signal from the incoming request. It looks up the current coordinates of the object to act upon using routines or resource from GUI toolkit library.

2. No Hands client-side library requests action from server extension
   With the coordinates in hand, the No Hands client-side library can now request that the event be generated by the X server. Event generation in the server is accomplished with the XTrap extension (which you are required to have installed to use No Hands.)

3. X Event sent back to application
   The X event generated in the server is sent back to the application and handled by its GUI toolkit library. The application is unable to distinguish this event from one generated by a user.

4. No Hands client-side library send acknowledgment to driver
   Once the action has taken place and all subsequent reactions to the event have occurred in the application, the No Hands client-side library returns an acknowledgment to the driver and goes dormant, awaiting the next request from the driver.

*Multiple Clients*

Each Perl script or C program written against the No Hands driver-side api is capable of driving any number of client applications. Every application launched by the driver and every application launched by any client connected with the driver will come under its control.

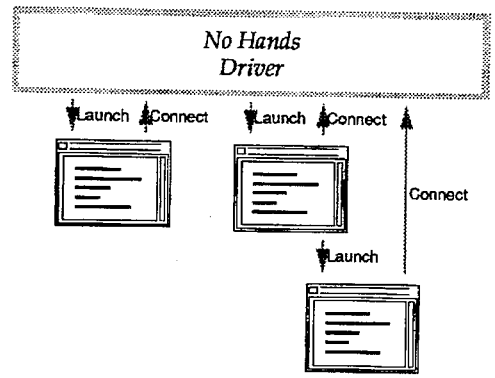

Installation 2

Installing No Hands

Use pkgadd to install the No Hands package onto your test machine or file server. The top level No Hands directory will be placed at /opt/SUNWnhnds and will contain bin, lib, and include directories. You'll need approxiamately 10 Megabytes free in the /opt partition before you begin. Once No Hands is installed, set your NHHOME environment variable to point to the root of the installed tree.

For example, to install the sparc version of No Hands v1.1:

```
% su
Password:
% cd /net/bigblock/export/owl/no_hands_release/NH_v1.1_SPARC
% pkgadd -d `pwd` SUNWnhnds
% setenv NHHOME /opt/SUNWnhnds
```

Or, if you would rather just mount it, and you are within the Eng domain, try the following directory, which always has the most recently built version:

```
% setenv NHHOME /net/ow-earth/export/owl/NH_SPARC
```

Alternatively, if you are using an Intel machine running an early version of Solaris 2.4, use this:

```
% setenv NHHOME /net/ow-earth/export/owl/NH_X86
```

Setting up Your Environment

These are the steps you must take after installation before you can execute any No Hands scripts:

1. Set the NHHOME environment variable
   You should add something like the following line (depending upon the location of your copy of No Hands) to your .cshrc file:

```
   setenv NHHOME /net/ow-earth/export/owl/NH_SPARC
   ```

2. Add $(NHHOME)/lib to your LD_LIBRARY_PATH
   Your tests need to be able to find the No Hands libraries so they can dynamically link with them. Add this somewhere near the end of your .cshrc file:

```
   setenv LD_LIBRARY_PATH
   ${LD_LIBRARY_PATH}:${NHHOME}/lib
   ```

Note – This step is not necessary if your No Hands installation is located in /opt/SUNWnhnds on the machine where will be executing scripts, because this is the default location.

3. Add $(NHHOME)/bin to your path
   There are several utilities in the No Hands installation that you will want to be able to run from the command line. Add the following line to your .cshrc file:

```
   set path = ($path ${NHHOME}/bin)
   ```

4. Apply ld Patch 100257-05
   If your execution platform is running SunOS 4.x, you'll need a patch for the linker/loader, *ld*. We have provided a copy of this SunOS patch and a script to install it for you. Simply execute this script as *root*:

```
   ${NHHOME}/bin/kvm
   ```

Note – This script also gives read permission of the /dev/mem, /dev/kmem, and /dev/drum files to all users, a necessary evil. Do not do this on a machine where system security is an important issue.

2≣

5. Install the XTrap extension (if running OW V3.3 or later)
On machines with versions of OpenWindows earlier than V3.3, No Hands uses NeWS to generate events. On machines with OW V3.3 or later the XTrap extension must be installed.

There is a script called install_xtrap in the $(NHHOME}/bin directory that will install the XTrap server extension on your machine if run as *root* (on the machine where test application windows will be displayed.) You must have the NHHOME environment variable set before running this script.

```
% su root
Password:
% $(NHHOME}/bin/install_xtrap
```

Note – The XTrap server extension is loaded when OpenWindows starts up. If you are already running OpenWindows, you must exit and restart it before No Hands event simulation calls will function.

C Interface 3

This chapter describes how to use the No Hands driver-side library (libnhd) for creating C test programs. A No Hands driver is a process separate from the client applications that controls what user input simulations occur on them.

≡ 3

C Tests are Linked with libnhd

The C interface for making a driver process differs from the Perl interface in that your tests are compiled and linked with the driver-side library libnhd, rather than interpreted by the modified Perl interpreter nhd.

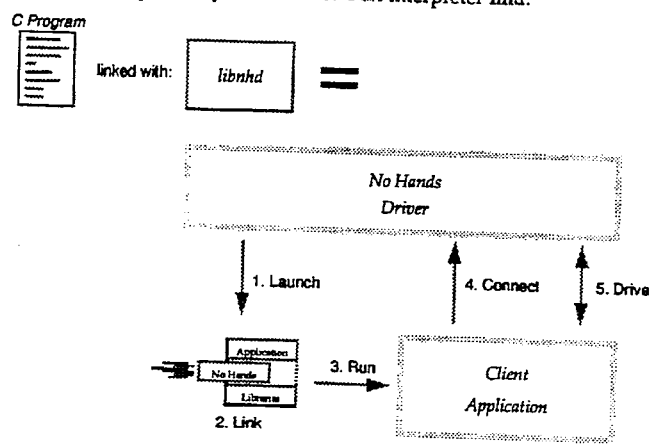

Components of a C Interface Test

A No Hands test written in C consists of four main sections:

1. Hierarchical Header Files
2. Launching of Applications and Initialization
3. User Input Simulation
4. Test Result Verification Each of these parts will be discussed in its own section in this chapter. For more detailed explanations of the No Hands api available to you, see Chapter 6, "Library Routine Reference," for a complete listing.

3

*Hierarchy Header Files*

On the driver side, all display locations in the client are defined by referring to one of the client's objects. You never need to use absolute coordinates for user input simulation requests. And, although the location and size of every object is available to you, you generally generate events merely by referring to the object and noting that you'd like the action to take place in the center.

In order to have this ability on the driver side, it is necessary to execute a utility called nhquery before writing your test program. This utility executes the prospective client application and generates a hierarchy of all the GUI objects within it. The object hierarchy is placed in a header file which you then include at the top of your program. You may refer to the objects by the names given them in the header file (macros, with names resembling the labels or names objects have in the application.)

If the hierarchical ordering of the GUI objects in the application ever changes, you simply run nhquery again, capturing the changes in the header file, and recompiling your test program

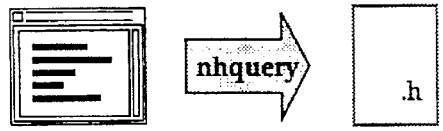

Here are the steps you should take to generate such a header file for the application you are testing (let's use clock as an example.)

1. Make sure you have followed all No Hands installation procedures
   See Chapter 2, "Installation," for how to do this if you have not already done so. The variables NHHOME, LD_LIBRARY_PATH, and path all need to be correctly defined in your environment.

2. Run nhquery
   ```
   % nhquery
   ```

3. Enter application name and where save header file
   ```
   Enter the name of the program: clock
   Enter the name of the output file (use .h or .ph suffix): clock.h
   Connected.
   ```

*C Interface*

≡3

4. Enter options to dump all objects and quit
   ```
   Enter capture option ("h" for help): a
   Dump succeeded
   Enter capture option ("h" for help): q
   Fixing duplicates...done
   ```

5. Take a look at header file produced for object names you can use
   ```
   % more clock.h
   /* Do not edit this file - it was generated by nhquery */
   #define Clock_Icon_unnamed_001       "Icon:1"
   #define Clock_Fram_clock_V3_3_Alph   "Frame_base:1"
   #define Clock_Canv_clock_V3_3_Alph   "Frame_base:1:Canvas:1"
   #define Clock_Icon_unnamed_002       "Icon:2"
   ```

That was a very simple application with few objects instantiated to start with. If you plan to drive user input on more than just the application's initial set of objects, you need to bring up whatever popups or other windows you are planning to use before the hierarchy is dumped to the header file (do this between steps 3 and 4 above), as in the following example:

```
% nhquery
Enter the name of the program: clock
Enter the name of the output file (use .h or .ph suffix): clock.h
nhquery: overwrite "clock.h" (y/n)? y
Connected.
<this is when you bring up the properties sheet>
Enter capture option ("h" for help): a
Dump succeeded
Enter capture option ("h" for help): q
Fixing duplicates...done
% more clock.h
/* Do not edit this file - it was generated by nhquery */
#define Clock_Menu_unnamed_001              "Server:2:Choice Menu:1"
#define Clock_Item_unnamed                  "Server:2:Choice Menu:1:Menu_item:1"
#define Clock_Icon_unnamed_001              "Icon:1"
#define Clock_Fram_clock_V3_3_Alph          "Frame_base:1"
#define Clock_Canv_clock_V3_3_Alph          "Frame_base:1:Canvas:1"
#define Clock_Fram_Clock_Propertie          "Frame_base:1:Frame_cmd:1"
#define Clock_Pane_Clock_Propertie_001      "Frame_base:1:Frame_cmd:1:Panel:1"
#define Clock_Pane_Clock_Propertie_002      "Frame_base:1:Frame_cmd:1:Panel:2"
#define Clock_Choi_Clock_Face               "Frame_base:1:Frame_cmd:1:Panel:2:Choice Item:1"
#define Clock_Choi_Icon_display             "Frame_base:1:Frame_cmd:1:Panel:2:Choice Item:2"
#define Clock_Choi_Digital_display          "Frame_base:1:Frame_cmd:1:Panel:2:Choice Item:3"
#define Clock_Choi_Display_options          "Frame_base:1:Frame_cmd:1:Panel:2:Choice Item:4"
#define Clock_Mesg_b1                       "Frame_base:1:Frame_cmd:1:Panel:2:Message Item:1"
#define Clock_Choi_Timezone                 "Frame_base:1:Frame_cmd:1:Panel:2:Choice Item:5"
#define Clock_Mesg_b2                       "Frame_base:1:Frame_cmd:1:Panel:2:Message Item:2"
#define Clock_Choi_Stopwatch                "Frame_base:1:Frame_cmd:1:Panel:2:Choice Item:6"
#define Clock_Mesg_b3                       "Frame_base:1:Frame_cmd:1:Panel:2:Message Item:3"
#define Clock_Mesg_Alarm                    "Frame_base:1:Frame_cmd:1:Panel:2:Message Item:4"
#define Clock_Text_Alarm_command            "Frame_base:1:Frame_cmd:1:Panel:2:Text Item:1"
#define Clock_Choi_Repeat                   "Frame_base:1:Frame_cmd:1:Panel:2:Choice Item:7"
#define Clock_Mesg_b4                       "Frame_base:1:Frame_cmd:1:Panel:2:Message Item:5"
#define Clock_Text_Hourly_command           "Frame_base:1:Frame_cmd:1:Panel:2:Text Item:2"
#define Clock_Mesg_b5                       "Frame_base:1:Frame_cmd:1:Panel:2:Message Item:6"
```

```
#define Clock_Bttn_Apply              "Frame_base:1:Frame_cmd:1:Panel:2:Button Item:1"
#define Clock_Choi_unnamed_001        "Frame_base:1:Frame_cmd:1:Panel:2:Choice Item:8"
#define Clock_Choi_unnamed_002        "Frame_base:1:Frame_cmd:1:Panel:2:Choice Item:9"
#define Clock_Menu_unnamed_002        "Frame_base:1:Frame_cmd:1:Panel:2:Choice
Item:9:Command Menu:1"
<many more items dealing with timezone choices omitted>
#define Clock_Text_unnamed_001        "Frame_base:1:Frame_cmd:1:Panel:2:Text Item:3"
#define Clock_Text_unnamed_002        "Frame_base:1:Frame_cmd:1:Panel:2:Text Item:4"
#define Clock_Nume_Hr                 "Frame_base:1:Frame_cmd:1:Panel:2:Numeric Text
Item:1"
#define Clock_Text_unnamed_003        "Frame_base:1:Frame_cmd:1:Panel:2:Text Item:5"
#define Clock_Nume_Min                "Frame_base:1:Frame_cmd:1:Panel:2:Numeric Text
Item:2"
#define Clock_Bttn_Save_as_Default    "Frame_base:1:Frame_cmd:1:Panel:2:Button Item:2"
#define Clock_Bttn_Reset              "Frame_base:1:Frame_cmd:1:Panel:2:Button Item:3"
#define Clock_Icon_unnamed_002        "Icon:2"
#define Clock_Menu_Clock              "Command Menu:1"
#define Clock_Item_Clock              "Command Menu:1:Menu_item:1"
#define Clock_Item_Properties         "Command Menu:1:Menu_item:2"
```

As you can see, it will take some practice to be able to pick out the objects you'd like to perform actions on in the larger applications. The names for objects are based on the name of the header file, the type of object, and any labels or text that belongs to the object. The above examples were from an XView application and the header file will look somewhat different for an OLIT or Motif application (most notably the strings on the right will be different because of the different names for objects/widgets in each toolkit.)

You must include the header file generated by nhquery in your C file, as well as the No Hands driver-side library include file:
```
#include <nhd.h>
#include "clock.h"
```

If you are planning to use the NhKeyEvent routine, you'll also need the keysym definitions from Xlib:
```
#include <X11/keysym.h>
```

If your test program launches any XView applications, and you would like to use the NhGetResources or NhSetResources routines, you'll also need these header files:
```
#include <xview/xview.h>
#include <xview/panel.h>
```

And the same deal for OLIT applications when you wish to use NhGetResources or NhSetResources, you'll need these include files:
```
#include <X11/StringDefs.h>
#include <Xol/OlStrings.h>
```

And for Motif applications, be sure to include these in the same situation:
```
#include <X11/StringDefs.h>
#include <Xm/XmStrDefs.h>
```

Include all include files from all toolkits when doing a test where applications from all three toolkits are launched.

Launching Applications

Before executing any of the No Hands action routines that simulate user inputs, you must first launch at least one test application (using the NhLaunchAndConnect call.) You may launch more than one application if you wish. Be sure to store the application handles returned by NhLaunchAndConnect. These handles are required by every No Hands action call in order to specify which application to act upon.

The application you'd like to test is launched by the driver when you issue a NhLaunchAndConnect call like the following:
```
NHHandle ap;
ap = NhLaunchAndConnect("clock +W1");
```

There are other initialization steps you may wish to take as well, like slowing down the speed of mouse movements so that you can watch your test more easily:
```
NhSetDelay(ap, 10);
```

User Input Simulation

At this point, you are free to make user input simulation requests on objects in any application you have brought up. To bring up the properties worksheet from the clock application demonstrated above, you would call for a right button press and release in the middle of the clock face, and then a left button press and release on the "Properties" item in the menu that pops up:
```
NhButtonEvent(ap, "Frame_base:1", Button3, NHClick, NHCenter, NHCenter);
NhButtonEvent(ap, Clock_Item_Properties, Button1, NHClick, NHCenter, NHCenter);
```

For referring to the object in the first action, you may have noted that I chose to use the real hierarchical description string, rather than the macro Clock_Fram_clock_V3_3_Alph. I did this because the name of the base window contains the version number of my local copy of OpenWindows. In the second action, the name of the macro is better (and the hierarchy string longer), so I used the macro, which you should do whenever possible.

Test Result Verification

No Hands provides two ways to verify that your user inputs produced the right results: image comparison and resource comparison. Resource comparison is preferable whenever practical because it saves time and disk space. Image comparisons always require that a correct master image be on file before running the tests.

Here's how you'd get the text contained in the "Alarm Command" textfield of the clock's properties worksheet, for example:

```
#include <xview/xview.h>
#include <xview/panel.h>
...
int number;
char *resource;
NhGetResources(ap, Clock_Text_Alarm_command, NhStr(PANEL_VALUE),
"String", &resource, NULL);
printf("text is %s\n", resource);
free(resource);
```

The NhStr function converts a number (which XView attributes happen to be) to a string that you won't have to free (never use NhStr more than 15 times in the same function call, however.) Resource names and types are always strings.

```
NhGetResources(ap, Clock_Choi_Clock_Face, NhStr(PANEL_VALUE), "Int",
&number, NULL);
printf("Which choice selected = %d\n", number);
```

To do an image comparison, which is sometimes the only way to verify something, do the following:

```
char *filename;
filename = NhMakeImageName(ap, "Frame_base:1", "clock", NhStr(1),
NULL);
NhImage(ap, "Frame_base:1", filename, NHEnv);
/* don't free filename, NhMakeImageName uses a static buffer */
```

"clock" is the name of the test and 1 is the test purpose number (which must be passed as a string because you may also use names instead of numbers for test purposes.) The use of the NHEnv directive will allow to run your test one time

3 with the NH_SAVE_IMAGES environment variable set to generate good master images for each test purpose. Use the "sxpm" utility to look at images generated in this manner.

Wrapup

There are no further actions you need to take before exiting your test. When your test program exits, No Hands will automatically close its connection with each test client and make the test client exit.

Look in ${NHHOME}/doc/samples for the on-line source of the example files in this chapter (clocktest.c and clock.h). Please see Appendix A, "Samples - C", for more examples of C interface test writing.

Perl Interface 
The Perl and C interfaces share the same No Hands driver-side library api. Perl test scripts are interpreted by the program nhd, instead of being linked with the driver-side library libnhd (as C tests are.)

≣ 4
Perl Scripts are Interpreted by nhd
A No Hands driver is a process separate from the client applications that controls what user input simulations occur on them. When using the Perl interface to No Hands, the driver process is formed by the combination of your Perl script and nhd, a modified Perl interpreter.
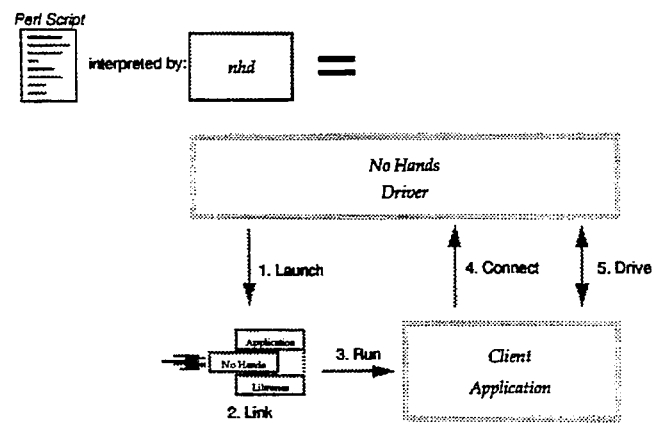

4

An Example of How Perl Differs from C

All of the standard No Hands library routines are described in Chapter 6, "Library Routine Reference," and are used exactly the same way in both interfaces, with only syntactical differences and some differences in the use of variable types.

*Table 4-1*  No Hands Programming Interface Comparison

| Interface | Sample Code |
|---|---|
| C | #include <nhd.h><br><br>NHHandle ap;<br>NHObject mypanel;<br>ap = NHLaunchAndConnect("imagetool");<br>mypanel = "Frame_base:1:Panel:1"<br>NhWaitMap(ap, mypanel); |
| Perl | require "nhd.ph";<br><br>$ap = &NhLaunchAndConnect("imagetool");<br>$mypanel = "Frame_base:1:Panel:1";<br>&NhWaitMap($ap, $mypanel); |

Components of a Perl Interface Test

A No Hands test written in Perl consists of four main sections:

1. Hierarchical Header Files

2. Launching of Applications and Initialization

3. User Input Simulation

4. Test Result Verification

Each of these parts will be discussed in its own section in this chapter. For more detailed explanations of the No Hands api available to you, see Chapter 6, "Library Routine Reference," for a complete listing.

4

Making Perl Scripts Self-Executing

Before anything else in your Perl scripts, you must place something like the following lines at the top in order to insure that the No Hands driver nhd will be called up to interpret the script. Don't forget to chmod your tests to make them executable, as well.

```
eval 'exec $NHHOME/bin/nhd -S $0 ${1+"$@"}'
if 0;

# Sample Perl Interface Test

<the rest of your script continues here>
```

Hierarchy Header Files

On the driver side, all display locations in the client are defined by referring to one of the client's objects. You never need to use absolute coordinates for user input simulation requests. And, although the location and size of every object is available to you, you generally generate events merely by referring to the object and noting that you'd like the action to take place in the center.

In order to have this ability on the driver side, it is necessary to execute a utility called nhquery before writing your test program. This utility executes the prospective client application and generates a hierarchy of all the GUI objects within it. The object hierarchy is placed in a header file which you then include at the top of your script. You may refer to the objects by the names given them in the header file (macros, with names resembling the labels or names objects have in the application.)

If the hierarchical ordering of the GUI objects in the application ever changes, you simply run nhquery again, capturing the changes in the header file, and recompiling your test program

Here are the steps you should take to generate such a header file for the application you are testing (let's use clock as an example.)

1. Make sure you have followed all No Hands installation procedures
   See Chapter 2, "Installation," for how to do this if you have not already done so. The variables NHHOME, LD_LIBRARY_PATH, and path all need to be correctly defined in your environment.

2. Run nhquery
   % *nhquery*

3. Enter application name and where save header file
   ```
   Enter the name of the program: clock
   Enter the name of the output file (use .h or .ph suffix): clock.ph
   Connected.
   ```

4. Enter options to dump all objects and quit
   ```
   Enter capture option ("h" for help): a
   Dump succeeded
   Enter capture option ("h" for help): q
   Fixing duplicates...done
   ```

5. Take a look at header file produced for object names you can use
   ```
   % more clock.ph
   # Do not edit this file - it was generated by nhquery
   %clock = (
       'Icon_unnamed 001',      'Icon:1',
       'Fram_clock V3.3 Alph',  'Frame_base:1',
       'Canv_clock V3.3 Alph',  'Frame_base:1:Canvas:1',
       'Icon_unnamed 002',      'Icon:2',
   );

1;
   ```

That was a very simple application with few objects instantiated to start with. If you plan to drive user input on more than just the application's initial set of objects, you need to bring up whatever popups or other windows you are planning to use before the hierarchy is dumped to the header file (do this between steps 3 and 4 above), as in the following example:
```
% nhquery
Enter the name of the program: clock
Enter the name of the output file (use .h or .ph suffix): clock.ph
nhquery: overwrite "clock.ph" (y/n)? y
Connected.
<this is when you bring up the properties sheet>
Enter capture option ("h" for help): a
Dump succeeded
Enter capture option ("h" for help): q
```

≣4

```
Fixing duplicates...done
% more clock.h
# Do not edit this file - it was generated by nhquery
%clock = (
    'Menu_unnamed 001',           'Server:2:Choice Menu:1',
    'Item_unnamed',               'Server:2:Choice Menu:1:Menu_item:1',
    'Icon_unnamed 001',           'Icon:1',
    'Fram_clock V3.3 Alph',       'Frame_base:1',
    'Canv_clock V3.3 Alph',       'Frame_base:1:Canvas:1',
    'Fram_Clock Propertie',       'Frame_base:1:Frame_cmd:1',
    'Pane_Clock Propertie 001',   'Frame_base:1:Frame_cmd:1:Panel:1',
    'Pane_Clock Propertie 002',   'Frame_base:1:Frame_cmd:1:Panel:2',
    'Choi_Clock Face:',           'Frame_base:1:Frame_cmd:1:Panel:2:Choice Item:1',
    'Choi_Icon display:',         'Frame_base:1:Frame_cmd:1:Panel:2:Choice Item:2',
    'Choi_Digital display',       'Frame_base:1:Frame_cmd:1:Panel:2:Choice Item:3',
    'Choi_Display options',       'Frame_base:1:Frame_cmd:1:Panel:2:Choice Item:4',
    'Mesg_b1',                    'Frame_base:1:Frame_cmd:1:Panel:2:Message Item:1',
    'Choi_Timezone:',             'Frame_base:1:Frame_cmd:1:Panel:2:Choice Item:5',
    'Mesg_b2',                    'Frame_base:1:Frame_cmd:1:Panel:2:Message Item:2',
    'Choi_Stopwatch:',            'Frame_base:1:Frame_cmd:1:Panel:2:Choice Item:6',
    'Mesg_b3',                    'Frame_base:1:Frame_cmd:1:Panel:2:Message Item:3',
    'Mesg_Alarm:',                'Frame_base:1:Frame_cmd:1:Panel:2:Message Item:4',
    'Text_Alarm command:',        'Frame_base:1:Frame_cmd:1:Panel:2:Text Item:1',
    'Choi_Repeat:',               'Frame_base:1:Frame_cmd:1:Panel:2:Choice Item:7',
    'Mesg_b4',                    'Frame_base:1:Frame_cmd:1:Panel:2:Message Item:5',
    'Text_Hourly command:',       'Frame_base:1:Frame_cmd:1:Panel:2:Text Item:2',
    'Mesg_b5',                    'Frame_base:1:Frame_cmd:1:Panel:2:Message Item:6',
    'Bttn_Apply',                 'Frame_base:1:Frame_cmd:1:Panel:2:Button Item:1',
    'Choi_unnamed 001',           'Frame_base:1:Frame_cmd:1:Panel:2:Choice Item:8',
    'Choi_unnamed 002',           'Frame_base:1:Frame_cmd:1:Panel:2:Choice Item:9',
    'Menu_unnamed 002',           'Frame_base:1:Frame_cmd:1:Panel:2:Choice Item:9:Command
Menu:1',
    <lots of menu item objects for different timezones omitted>
    'Text_unnamed 001',           'Frame_base:1:Frame_cmd:1:Panel:2:Text Item:3',
    'Text_unnamed 002',           'Frame_base:1:Frame_cmd:1:Panel:2:Text Item:4',
    'Nume_Hr:',                   'Frame_base:1:Frame_cmd:1:Panel:2:Numeric Text Item:1',
    'Text_unnamed 003',           'Frame_base:1:Frame_cmd:1:Panel:2:Text Item:5',
    'Nume_Min:',                  'Frame_base:1:Frame_cmd:1:Panel:2:Numeric Text Item:2',
    'Bttn_Save as Default',       'Frame_base:1:Frame_cmd:1:Panel:2:Button Item:2',
    'Bttn_Reset',                 'Frame_base:1:Frame_cmd:1:Panel:2:Button Item:3',
    'Icon_unnamed 002',           'Icon:2',
    'Menu_Clock',                 'Command Menu:1',
    'Item_Clock',                 'Command Menu:1:Menu_item:1',
    'Item_Properties...',         'Command Menu:1:Menu_item:2',
);
```

As you can see, it will take some practice to be able to pick out the objects you'd like to perform actions on in the larger applications. The names for objects are placed into an associative array given the name of the header file. The keys in the array based on the type of object and any labels or text that belongs to the object. The above examples were from an XView application and the header file will look somewhat different for an OLIT or Motif application (most notably the strings on the right will be different because of the different names for objects/widgets in each toolkit.)

You must include the header file generated by nhquery at the top of your Perl script, as well as the No Hands driver-side library include file:
```
require "nhd.ph";
require "clock.ph";
```

If you are planning to use the NhKeyEvent routine, you'll also need the keysym definitions from Xlib, which we've converted to a Perl header for you:
```
require "X11/keysym.ph";
```

If your test program launches any XView applications, and you would like to use the NhGetResources or NhSetResources routines, you'll also need this header file:
```
require "xvtypes.ph";
```

The same goes for OLIT applications when you wish to use NhGetResources or NhSetResources, you'll need these include files:
```
require "X11/StringDefs.ph";
require "Xol/OlStrings.ph";
```

And for Motif applications, be sure to include these in the same situation:
```
require "X11/StringDefs.ph";
require "Xm/XmStrDefs.ph";
```

Include all include files from all toolkits when doing a test where applications from all three toolkits are launched.

Launching Applications

Before executing any of the No Hands action routines that simulate user inputs, you must first launch at least one test application (using the NhLaunchAndConnect call.) You may launch more than one application if you wish. Be sure to store the application handles returned by NhLaunchAndConnect. These handles are required by every No Hands action call in order to specify which application to act upon.

The application you'd like to test is launched by the driver when you issue a NhLaunchAndConnect call like the following:
```
$ap = &NhLaunchAndConnect("clock +Wi");
```

There are other initialization steps you may wish to take as well, like slowing down the speed of mouse movements so that you can watch your test more easily:
```
&NhSetDelay($ap, 10);
```

4

User Input Simulation

At this point, you are free to make user input simulation requests on objects in any application you have brought up. To bring up the properties worksheet from the clock application demonstrated above, you would call for a right button press and release in the middle of the clock face, and then a left button press and release on the "Properties" item in the menu that pops up:

```
$Base = "Frame_base:1";
$Props = $clock{'Item_Properties...'};
&NhButtonEvent($ap, $Base, &Button3, &NHClick, &NHCenter, &NHCenter);
&NhButtonEvent($ap, $Props, &Button1, &NHClick, &NHCenter, &NHCenter);
```

For referring to the object in the first action, you may have noted that I chose to use the real hierarchical description string, rather than the one in the associative array under the key "Fram_clock V3.3 Alph." I did this because the name of the base window contains the version number of my local copy of OpenWindows. In the second action, the name of the key is better (and the hierarchy string longer), so I used the associative array key, which you should do whenever possible.

Verifying Test Results

No Hands provides two ways to verify that your user inputs produced the right results: image comparison and resource comparison. Resource comparison is preferable whenever practical because it saves time and disk space. Image comparisons always require that a correct master image be on file before running the tests.

Here's how you'd get the text contained in the "Alarm Command" textfield of the clock's properties worksheet, for example:

```
require "xvtypes.ph";
...
$Alarm_Text = $clock{'Text_Alarm command:'};
&NhGetResources($ap, $Alarm_Text, &PANEL_VALUE, "String", $resource);
print "text is $resource\n";
```

In the Perl interface, resource names and types are always strings, but it really doesn't matter in Perl, because you just use scalars.

```
$Clock_Choice = $clock{'Choi_Clock Face:'};
&NhGetResources($ap, $Clock_Choice, &PANEL_VALUE, "Int", $number);
print "Which choice selected = $number\n";
```

4

To do an image comparison, which is sometimes the only way to verify something, do the following:

```
$filename = &NhMakeImageName($ap, $Base, "clock", 1, "");
&NhImage($ap, $Base, $filename, &NHEnv);
```

"clock" is the name of the test and 1 is the test purpose number (which is automatically converted to a string by the Perl interpreter. You may also use names instead of numbers for test purposes.) The use of the &NHEnv directive will allow to run your test one time with the NH_SAVE_IMAGES environment variable set to generate good master images for each test purpose. Use the "sxpm" utility to look at images generated in this manner.

Wrapup

There are no further actions you need to take before the end of your script. Closing connections is not required, because all connections are closed automatically once the test script has exited. All client applications are forced to exit at that time as well.

Look in ${NHHOME}/doc/samples for the on-line source of the example files in this chapter (clocktest.perl and clock.ph). See Appendix B, "Samples - Perl" for more ideas on how to write No Hands Perl Scripts.

Library Routine Groupings 5

This chapter describes the different classes of routines available from the library. A full description of each routine is given in the next chapter where the functions are listed in alphabetical order.

Routines Available Only in the Driver Side Library

The routines listed below are specific to the No Hands Perl and C External Interfaces and are not available from the C Internal Interface (meaning they aren't available for insertion into application source code.) Most of these routines are related to launching, matching, or closing connections, so they wouldn't make sense for use from within a client application anyway.

Table 5-1  Driver Side Library Calls

| Function Name | Purpose |
| --- | --- |
| NhLaunchAndConnect | launches client application, returns app handle |
| NhLaunchNoConnect | launches client application |
| NhMatchConnection | establishes connection with child application |
| NhPrintConnections | prints current connections available |
| NhCloseConnection | closes connection |
| NhCloseAllConnections | closes all connections |
| NhWaitExit | waits for application to exit |
| NhSetTimeoutHandler | sets function to handle timeouts |
| NhGetTimeoutHandler | gets function that currently handles timeouts |

5

*Table 5-1  Driver Side Library Calls*

| Function Name | Purpose |
|---|---|
| NhSetWarningHandler | sets function to handle warnings |
| NhGetWarningHandler | gets function that currently handles warnings |
| NhSetErrorHandler | sets function to handle errors |
| NhGetErrorHandler | gets function that currently handles errors |
| NhSetExitHandler | sets function to get called on exit |
| NhGetExitHandler | gets function currently called on exit |
| NhSetTimeout | sets general timeout |
| NhGetTimeout | gets current timeout setting |
| NhData | specifies the sizes of buffers for data transfers |
| NhAllocateData | transfers data from driver to client |
| NhRetrieveData | transfers data from client to driver |
| NhMalloc | allocates memory with client memory space |
| NhFree | frees area created by NhMalloc or NhAllocateData |
| NhPid | returns the process id of a client |
| NhCommandLine | returns the command line of a client |

Initialization and Utility Routines

The routines described in this section are for use during setup or are of general utility. These routines are available in all interfaces, the External Perl and C Interfaces as well as the Internal C Interface.

*Table 5-2  Initialization and Utility Routines*

| Function Name | Purpose |
|---|---|
| NhSetDelay | sets the speed of cursor motion |
| NhGetDelay | gets the current speed of cursor motion |
| NhSetErrorLevel | sets the behavior in error or warning situations |
| NhGetErrorLevel | gets the current error behavior level |
| NhError | generates and error message |
| NhSync | forces a client synchronization |
| NhWaitMap | waits for an object to be mapped |
| NhWaitUnmap | waits for an object to become unmapped |
| NhPutEnv | sets an environment variable within client |
| NhGetEnv | gets an environment variable from within client |

5

Table 5-2 Initialization and Utility Routines

| Function Name | Purpose |
| --- | --- |
| NhSetXInput | sets a mode that can get around client thread block |
| NhGetXInput | gets the mode flag for X input looping |
| NhSetEventHandling | sets a mode concerning immediate event handling |
| NhGetEventHandling | gets the mode flag for event handling |
| NhBatchBegin | begins a batch of events to be generated together |
| NhBatchEnd | ends a batch of events to be generated together |

Information Gathering Routines

The following routines gather information about objects. The first few are general, but some are more specific and will not work for all objects. These routines are available in all interfaces, the External Perl and C Interfaces as well as the Internal C Interface. When used within an Internal C Interface test program, however, be sure not to use the first argument (the application Handle argument) with any of these routines.

Table 5-3 Information Gathering Routines

| Function Name | Purpose |
| --- | --- |
| NhRootBox | gets object's bounding box on root window |
| NhRootCenter | gets coordinates of object's center on root window |
| NhFindCursor | returns coordinates of current pointer location |
| NhGetCount | returns number (n) of items in an object |
| NhGetViewInfo | returns first item displayed and viewing range |
| NhGetResources | gets the value(s) of an object's resource(s) |
| NhSetResources | sets the value(s) of an object's resources(s) |

Event Generation Routines

The routines described in this section are the basis of all X event simulation. There are no calls of lower level available. These routines are available in all interfaces, the External Perl and C Interfaces as well as the Internal C Interface.

Table 5-4 Event Generation Routines

| Function Name | Purpose |
| --- | --- |
| NhButtonEvent | generates a mouse button event |

*Library Routine Groupings*

5

*Table 5-4  Event Generation Routines*

| Function Name | Purpose |
|---|---|
| NhMotionEvent | generates mouse motion events and moves pointer |
| NhKeyEvent | generates a key event |
| NhStringEvent | generates a series of key events |

Objects Within Objects

The following table describes the argument type *ObjectType*, introduced here for use within the NhLookupComponent routine. Don't forget that all constants must be proceeded by an ampersand (&) when used in the Perl interface. These routines are available in all interfaces, the External Perl and C Interfaces as well as the Internal C Interface.

*Table 5-5  ObjectType Listing for Object Within Object Lookup*

| ObjectType | Objects that might contain this kind of subobject |
|---|---|
| NHHScrollbar | Scrolling Lists and Text Subwindows |
| NHVScrollbar | Scrolling Lists and Text Subwindows |
| NHMenu | Windows (not XView), Scrolling Lists, Scrollbars, Text Subwindows, Menu Buttons, Panel Items, and Menu Items |
| NHTextField | Sliders (XView) |

The following routines are for finding objects that are related to or contained within other objects, like the scrollbar object that lives in a scrolling list object, for example. All object lookup routines have the word *Lookup* in the name of the lookup function and all return an object (or NULL in the case of failure.)

*Table 5-6  Routines for Finding Objects Within Objects*

| Function Name | Purpose |
|---|---|
| NhLookupComponent | finds a sub-object that is a component of an object |
| NhLookupNth | finds the nth sub-object of an object |

Object Component Location

The following table describes the possible values one may give for the argument type PartType. This argument type is introduced here for use in object component location finding routines, and *PartType* is used in function descriptions in the next chapter. Don't forget that all constants must be proceeded by an ampersand (&) when used in the Perl interface.

*Table 5-7* PartType Listing for Object Component Finding

| PartType | Objects that might contain this kind of subpart |
|---|---|
| NHNone | All objects - this PartType refers to the object as a whole, so NhFindComponentXY gets you the center of the entire object, and NhFindComponentBox gets you the width and height of the entire object (and x and y are returned as zero.) |
| NHArrowUp | Vertical Scrollbars and Numeric Fields - this refers to the little arrow box that increments/moves up the numericfield/scrollbar. With NhFindComponentBox you get the x and y coordinate of the upperleft corner of the arrow box subpart and the width and height. With NhFindComponentXY you get the center of the arrow box. |
| NHArrowDown | Vertical Scrollbars and Numeric Fields - this refers to the little arrow box that decrements/moves down the numericfield/scrollbar. |
| NHArrowLeft | Horizontal Scrollbars - arrow box that moves scrollbar left. Text and Numeric Fields - left arrow box that is used for scrolling text/numbers once they overflow the field space |
| NHArrowRight | Horizontal Scrollbars - arrow box that moves scrollbar right. Text and Numeric Fields - right arrow box that is used for scrolling text/numbers once they overflow the field space |
| NHAnchorUp | Vertical Scrollbars and Sliders - box at the top of the cable which causes elevator to move all the way to the top (only XView and OLIT have anchors/end boxes on scrollbars and sliders) |
| NHAnchorDown | Vertical Scrollbars and Sliders - box at the bottom of the cable which causes elevator to move all the way to the bottom (only XView and OLIT have anchors/end boxes on scrollbars and sliders) |

5

*Table 5-7*  PartType Listing for Object Component Finding

| PartType | Objects that might contain this kind of subpart |
|---|---|
| NHAnchorLeft | Horizontal Scrollbars and Sliders - box at the left of the cable which causes elevator to move all the way to the left (only XView and OLIT have anchors/end boxes on scrollbars and sliders) |
| NHAnchorRight | Horizontal Scrollbars and Sliders - box at the right of the cable which causes elevator to move all the way to the right (only XView and OLIT have anchors/end boxes on scrollbars and sliders) |
| NHCableUp | Vertical Scrollbars and Sliders - area between the drag box and the top edge of the scrollbar/slider where a page up can effectively be done |
| NHCableDown | Vertical Scrollbars and Sliders - area between the drag box and the bottom edge of the scrollbar/slider where a page down can effectively be done |
| NHCableLeft | Horizontal Scrollbars and Sliders - area between the drag box and the left edge of the scrollbar/slider where a page left can effectively be done |
| NHCableRight | Horizontal Scrollbars and Sliders - area between the drag box and the right edge of the scrollbar/slider where a page right can effectively be done |
| NHDragBox | Vertical and Horizontal Scrollbars and Sliders - the elevator of the scrollbar/slider from which it may be dragged |
| NHCheckBox | CheckBoxes - the actual box where a the action of checking a checkbox can be done (OLIT and Motif only, XView uses Choices for checkboxes, so use the NhFindNthXY for checking checkboxes in XView) |
| NHList | Scrolling Lists - the window within which the list of scrolled items is displayed |
| NHTitle | Scrolling Lists and Menus - the area within which the title is displayed |
| NHTextBox | Textfields and Numericfields - the area with which text or numerals actually appear. This area does not include any scrolling arrow boxes that may have appeared on either side of the field. |

These routines are for locating parts of an object, like the left scroll arrow of a textfield, for example. These routines return (by reference) the bounding box of the given subpart within the object given. All coordinates are relative to the upperleft corner of the object containing the subpart, so any actions done on subparts should be done to the object itself, using the subpart's bounding box to determine the coordinates or area.

The actual return value of each finder function is True if the object subpart was found, or False if it was not. The caller is responsible for checking the return value and reporting errors, unless the error level is currently set to *NHExit* (which it is by default.)

*Table 5-8* Object Component Locator Calls

| Function Name | Purpose |
|---|---|
| NhFindComponentXY | returns the coords of the center of a component |
| NhFindComponentBox | returns the bounding box of a component |

Many objects have something which the concept of an *nth subpart* applies to. The following routines help you find the coordinates and sizes of these subparts.

*Table 5-9* Object Nth Component Locator Calls

| Function Name | Purpose |
|---|---|
| NhFindNthXY | returns coords of the center of the nth component |
| NhFindNthBox | returns the bounding box of the nth component |

*Image Routines*

The NhImage and NhImageRegion routines are for saving or comparing images. Use the environment variable NH_SAVE_IMAGES to define whether saving or comparing goes on in these routines. When the NH_SAVE_IMAGES environment variable is not set or is set to "False", image comparisons will be made. When the NH_SAVE_IMAGES environment variable is set to anything at all (except "False"), images will be stored in files.

Use the NhMakeImageName routine to create names for the image files you wish to use in comparisons. This routine uses the NhGetLocale, NhGetDepth, and NhGetImageFileSuffix routines to create a name for your image file, helping you manage sets of images from differing locales and image depths (bw or color.)

5

The NH_COLORBLIND environment variable can also come in handy. See the description of NhSetColorMode for more information on how to make image comparisons more resistant to future changes in the colors in your graphical environment.

Two more environment variables make it possible to place master image files and image comparison results in two different directories. The NH_MASTERS and NH_RESULTS environment variables name the directory paths to the master image file directory and the image results directory, respectfully. If these environment variables are not set, the relative search path for image filenames begins from the current directory, '.'. When, however, an absolute pathname for an image file is given in NhImage or NhImageRegion, the NH_MASTERS and NH_RESULTS pointers are ignored.

In all of the above cases, environment variables must be set within the client application. It is not sufficient to change the environment only within the driver-side script or program if the client has already been launched. These environment variables, to be effective, must be set in one of the following ways:

1. set the environment variable on the command line before running the No Hands test script or program (the environment variable value will be passed on to every test client and descendant of the test program.)

2. set the environment variable within your test program before calling NhLaunchAndConnect (the environment variable value will be passed on to all subsequent clients and descendants of the test program.)

3. set the environment variable within the test client after it's already launched using the NhPutEnv routine.

*Table 5-10* Image Routines

| Function Name | Purpose |
| --- | --- |
| NhMakeImageName | creates filenames for image files |
| NhImage | saves or compares the image of an object |
| NhImageRegion | saves or compares image of a region of an object |
| NhGetLocale | gets the current locale |
| NhGetDepth | gets an object's display bit-depth |
| NhSetImageFileSuffix | sets the filename suffix for image filenames |
| NhGetImageFileSuffix | gets the current image file name suffix |
| NhSetColorMode | sets whether image comparisons are color blind |

*Table 5-10* Image Routines

| Function Name | Purpose |
|---|---|
| NhGetColorMode | gets current color comparison mode |
| NhSetPixelTolerance | determines how well images must match |
| NhGetPixelTolerance | gets the image comparison tolerance setting |

Routine Use Summary

The following tables provide summary of the situations where each routine can be used. A type of object is described and then all the routines that can be used on that type of object are listed.

*Table 5-11* Routines that do not require an object

| | |
|---|---|
| NhAllocateData | NhMalloc |
| NhBatchBegin | NhMatchConnection |
| NhBatchEnd | NhPid |
| NhCloseAllConnections | NhPrintConnections |
| NhCloseConnection | NhRetrieveData |
| NhCommandLine | NhSetDelay |
| NhError | NhSetErrorLevel |
| NhFree | NhSetErrorHandler |
| NhGetDelay | NhSetEventHandling |
| NhGetErrorHandler | NhSetExitHandler |
| NhGetErrorLevel | NhSetTimeoutHandler |
| NhGetEventHandling | NhSetWarningHandler |
| NhGetExitHandler | NhSetXInput |
| NhGetTimeoutHandler | NhSync |
| NhGetWarningHandler | NhVersionNumber |
| NhGetXInput | NhVersionString |
| NhLaunchAndConnect | NhWaitExit |
| NhLaunchNoConnect | |

Table 5-12 Routines that work on all objects

| | |
|---|---|
| NhButtonEvent | NhImageRegion |
| NhDumpChildren | NhKeyEvent |
| NhGetDepth | NhMakeImageName |
| NhGetLocale | NhMotionEvent |
| NhFillRegion | NhRootBox |
| NhFindComponentBox | NhRootCenter |
| NhFindComponentXY | NhStringEvent |
| NhFindCursor | NhWaitMap |
| NhImage | NhWaitUnmap |

Table 5-13 Routines that work only on particular objects

| Object Type(s) | Routines that work for this kind of Object |
|---|---|
| Scrolling Lists | NhFindNthXY<br>NhFindNthBox<br>NhLookupNth<br>NhGetViewInfo<br>NhGetCount |
| Menus, Settings, Choices, CheckBoxes | NhFindNthXY<br>NhFindNthBox<br>NhLookupNth<br>NhGetCount |

Symbol Summary

The following table lists all of the constants that are relevant to the above routines and aren't already described in the ObjectType or PartType tables. Whereas all No Hands routines begin with "Nh", note that constants begin with "NH". We hope this doesn't cause too much confusion, but it does help keep the two name spaces differentiated.

Table 5-14 General Use Constants

| Constant | Use |
|---|---|
| NHCenter | NHCenter is a convenience argument and can be substituted for the x or y coordinate in any call to NhButtonEvent, NhMotionEvent, NhKeyEvent, or NhStringEvent. When used, NHCenter refers to the midpoint between the edges of an object. For example, in an object that is 10 pixels wide and 60 pixels high, using NHCenter for x is equivalent to using 5, and for y it's equivalent to using 30. If NHCenter is substituted for both x and y coordinates, the center of the object is acted upon. |
| NHCurrent | Like NHCenter, NHCurrent can be substituted for the x or y coordinate in any call to an event routine that requires an object and coordinates. When used, NHCurrent refers to the current cursor location, whether that be the x or y coordinate in the argument list where the substitution is made. NHCurrent is efficient/convenient when doing several actions at the same location, only the first action need accurately specify the location. |
| NHRoot | NHRoot can be substituted nearly anywhere an Object argument is called for. It refers to the Root Window of the default screen and display (the one your application opened, according to the value passed in the XOpenDisplay call, or the value of the DISPLAY environment variable if NULL was specified in the XOpenDisplay call.) NHRoot should be used with coordinates collected by NhRootCenter or NhRootBox. |
| NHPress | NHPress is one of the actions that be performed by a mouse button or key. It is one of the choices for the action in the arguments to the NhButtonEvent, NhKeyEvent, and NhStringEvent routines. NHPress is used when a button or key press alone is desired, without an accompanying release in the same location. |
| NHRelease | Like NHPress, NHRelease is a key or button action specifier. NHRelease is used when only a button or key release is desired (the key or button press already having been done, perhaps in a different location.) |

Table 5-14 General Use Constants

| Constant | Use |
|---|---|
| NHClick | Like NHPress, NHClick is a key or button action specifier. NHClick is the most commonly used of the three action available for key and button events. NHClick is used when both a press and release of a button or key are desired in the same location. Do not use this action specifier for repetitive clicking. For double clicking, you must use NHClickN(2) (NHClick is described below.) If you don't, the second click may not occur within the short time required for a double click. |
| NHClickN(n) | This is a macro rather than a constant. Like NHClick above, this called for key or buttons events using both press and release, but this macro allows you to specify multiple presses and releases of a button or key. The parameter n specifies how many times the button or key should be pressed and released. NHClickN(2) should be used for double clicking, NHClickN(3) for triple clicking, etc. |
| NHExit | NHExit is the most unforgiving error reporting level. All fatal No Hands errors and warnings will result in an error message and an exit. When this error level has been set with NhSetErrorLevel, it is not necessary to check the success result of routines that return one. Any routine that does not succeed will print a warning message and exit instead of returning with failure code. This is the default error level. |
| NHWarn | NHWarn is a more forgiving error reporting level than NHExit. The caller takes responsibility for checking the success codes of routines that return them. Such routines will still print warning messages when not successful, but won't exit. Fatal errors will still cause an exit. |
| NHIgnore | NHIgnore is the most forgiving error reporting level and should only be used once tests are fully functional and then only if completion of test scripts is more important than error reporting. Warning messages are not printed at all. Only fatal errors are printed and they still cause an exit. |

*Table 5-14* General Use Constants

| Constant | Use |
|---|---|
| NHSave | When used as the directive in a call to NhImage or NhImageRegion, this constant specifies that an image should be saved to the filename given among the parameters. |
| NHCompare | When used as the directive in a call to NhImage or NhImageRegion, this constant specifies that the image or region should be compared to the one on file under the filename given among the parameters. |
| NHEnv | When used as the directive in a call to NhImage or NhImageRegion, this constant specifies that whether the environment variable NH_SAVE_IMAGES is set or not should whether the image is saved or compared. |

Library Routine Reference 6

The Perl and C Interfaces share the same programming interface as far as the routine names are concerned. In order to save space and repetition, the available programming interfaces are described here in the language independent format shown in the table below. Don't forget that all function calls must be proceeded by an ampersand (&) when using Perl.

When used in the External C and Perl interfaces, all routines require an application handle as the first argument. This argument is shown shaded in the function call descriptions below to signify that it is not required when using No Hands calls *within* a test program (as in toolkit testing.)

*Table 6-1* Function Description Format

| Return Type | Function Name |
|---|---|
| Arg Type | Argument Description (shaded arguments are required only when this routine is called via a driver-side interface) |
| Arg Type | Argument Description (unshaded arguments are required by calls through all interfaces) |

| Description of function side-effects and possible return values. |
|---|

| | Programming example for driver-side C interface. |
|---|---|
| | Programming example for driver-side Perl interface (this example may differ in function from the one for the C interface above in order to show more than one example of how function is useful.) |

47

6

There are several different variables types that may appear in the Return Type and Arg Type fields above. The table below lists the symbolic argument types that may be used in the api descriptions. For each symbolic type the table shows the actual type used what is expected under the C and Perl interfaces.

*Table 6-2  Return Values and Argument Types*

| Arg Type | Interface | Actual | Description |
|---|---|---|---|
| Handle | Internal C | int | Not used by internal C interface calls. |
|  | External Perl and C | int | File descriptor handle which uniquely refers to one of the applications which has been launched from a Perl test script. |
| Object | Internal C | varies | Graphical Interface Object (the actual type depends upon the GUI toolkit in use. Objects are of the type *Widget* in OLIT and Motif, *Xv_object* in XView, and *Window* in Xlib.) The special constant *NHRoot*, which refers to the Root Window, may be used instead of a regular toolkit object. |
|  | External Perl and C | string | Graphical Interface Object (it's a string which depends upon the Hierarchical relationship of the object to its ancestors and peers) or the constant *NHRoot* (or *&NHRoot* in Perl), which refers to the Root Window. |
| Button | C | int | Mouse Button - use one of the following constants: *Button1, Button2, Button3, Button4,* or *Button5*. |
|  | Perl | int | Mouse Button - use one of the following constants: *&Button1, &Button2, &Button3, &Button4,* or *&Button5*. |
| Action | C | int | An action to take with a key or mouse button, either a button press, a button release, or both a press and a release - use one of the following constants: *NHPress, NHRelease,* or *NHClick*. |
|  | Perl | int | An action to take with a key or mouse button - use one of the following constants: *&NHPress, &NHRelease,* or *&NHClick*. |

6

Table 6-2  Return Values and Argument Types

| Arg Type | Interface | Actual | Description |
|---|---|---|---|
| Coord | C | int | An x or y coordinate relative to the upperleft corner of a given Object. Instead of a number, the constant NHCenter can be used to signify either x or y coordinate from the center of the object, and NHCurrent can be used to signify the coordinate of the current pointer position. |
| | Perl | int | Same as above, except the constants are referred to as &NHCenter and &NHCurrent. |
| String | C | char* | a simple string. |
| | Perl | string | a simple string. |
| Success | C | int | Whether a routine succeeded - True or False. |
| | Perl | int | Whether a routine succeeded - &True or &False. |
| ErrorLevel | C | int | A level of error handling, as set by NhSetErrorLevel, use NHExit, NHWarn, or NHIgnore. |
| | Perl | int | A level of error handling, as set by NhSetErrorLevel, use &NHExit, &NHWarn, or &NHIgnore. |
| Directive | C | int | What to do within the NHImage and NhImageRegion routines, whether to save the image to a file (NHSave), compare the image with one on file (NHCompare), or look to the environment variable NH_SAVE_IMAGES for what to do with the image (NHEnv). |

*Library Routine Reference*

≡ 6

*Table 6-2* Return Values and Argument Types

| Arg Type | Interface | Actual | Description |
|---|---|---|---|
| | Perl | int | Same as above, except, use &*NHSave*, &*NHCompare*, or &*NHEnv*. |
| ColorMode | C | int | What kind of image comparisons to make whenever an NhImage or NhImageRegion call is made (see the NhSetColorMode routine description.) Use *NHEnv* to base color mode on the NH_COLORMODE environment variable, use *NHFull* for full color comparisons, and use *NHBlind* for color blind comparisons. |
| | Perl | int | Save as above, except use &*NHEnv*, &*NHFull*, and &*NHBlind*. |

6 ≡

NhAllocateData

| Pointer | NhAllocateData |
|---|---|
| Handle | Application to which to pass data |
| DataType | The type of data ("String", "Int", or NhData(size), size is the number of bytes of space to allocate with the client process) |
| void* | Pointer to the data (in driver process) which is to be passed to the client |

This function allocates a memory area or buffer within the client process and passes data across the driver-client connection to the client (similar to what NhMalloc does except that NhMalloc does not initialize the memory area reserved by passing in any data.) A pointer is returned to you which you may use in subseqent calls that require this data in the client's memory space, like in NhXvGet, NhSetResources, or NhFunction. NULL is returned if the malloc operation was not successful within the client. Use the NhFree call to free memory allocated in the client with NhAllocateData. NhRetrieveData provides the same functionality in reverse, transferring information from the client to the driver.

```
NHHandle ap;
char *local_buffer, *remote_buffer;
...
remote_buffer = NhAllocateData(ap, "String", "Hello World");
local_buffer = NhRetrieveData(ap, "String", remote_buffer);
printf("String passed in and out of client: %s\n", local_buffer);
...
free(local_buffer);
NhFree(ap, remote_buffer);
```

```
$remote_buffer = &NhAllocateData($ap, "String", "Hello World");
$local_buffer = &NhRetrieveData($ap, "String", $remote_buffer);
print "String passed in and out of client: $local_buffer\n";
...
&NhFree($ap, $remote_buffer);
```

*Library Routine Reference*

≡6

NhBatchBegin

| Success | NhBatchBegin |
|---|---|
| Handle | Application |

You shouldn't try to use this routine until you run into a problem you cannot overcome with NhSetXInput or NhSetEventHandling.

Sometimes NhSetEventHandling or NhSetXInput is not enough to overcome thread-blocking problems in the client during a particular sequence of No Hands simulation requests. In these rare cases, surround the offending sequence with an NhBatchBegin and NhBatchEnd. In a batch request, all X events are generated (with no synchronization at all) and not handled until the call to NhBatchEnd.

```c
NhBatchBegin(ap);
NhButtonEvent(ap, sbar, Button1, NHPress, x1, y1);
NhButtonEvent(ap, sbar, Button1, NHRelease, x2, y2);
NhBatchEnd(ap);
```

```perl
&NhBatchBegin($ap);
&NhButtonEvent($ap, $slider, &Button1, &NHPress, $x1, $y1);
&NhButtonEvent($ap, $slider, &Button1, &NHRelease, $x2, $y2);
&NhBatchEnd($ap);
```

NhBatchEnd

| Success | NhBatchEnd |
|---------|------------|
| Handle  | Application |

See NhBatchBegin (above.)

```c
NhBatchBegin(ap);
NhButtonEvent(ap, sbar, Button1, NHPress, x1, y1);
NhButtonEvent(ap, sbar, Button1, NHRelease, x2, y2);
NhBatchEnd(ap);
```

```perl
&NhBatchBegin($ap);
&NhButtonEvent($ap, $slider, &Button1, &NHPress, $x1, $y1);
&NhButtonEvent($ap, $slider, &Button1, &NHRelease, $x2, $y2);
&NhBatchEnd($ap);
```

≡ 6

NhButtonEvent

| Success | NhButtonEvent | |
|---|---|---|
| Handle | Application (which contains the object given below) | |
| Object | Object where mouse button event is to occur | |
| Button | Which mouse button (*Button1*, *Button2*, etc.) | |
| Action | Which event is to simulate (*NHPress*, *NHRelease*, *NHClick*, or *NHClickN(n)*, see Table 5-14 on page 43 for an explanation of these constants.) | |
| Coord | The x coordinate (relative to upperleft corner of object) | |
| Coord | The y coordinate (relative to upperleft corner of object) | |

This function is the main one for simulating mouse button presses and releases. The pointer will move to the coordinates given (relative to upperleft corner of the object) and a button press, release, or click will be simulated there. For repetitive clicking (e.g. double and triple clicks), be sure to use NHClickN(n) for the action argument rather than using multiple calls with a single click NHClick action.

| C | NhButtonEvent(ap, mybutton, Button1, NHPress, NHCenter, NHCenter); |
|---|---|
| Perl | &NhButtonEvent($ap, $mybutton, &Button1, &NHPress, &NHCenter, &NHCenter); |

6

NhCloseAllConnections

| Success | NhCloseAllConnections |
|---|---|
| None | This routine does not require any arguments |

Closes all connections that are currently open, causing all of the applications under test to exit. This is a routine that could be used at the end of a testing script, although it is not necessary to do so, because the driver automatically closes all connections when the test script exits. Use it if you wish to close all current connections before opening some new ones. This call is only available from the external C and Perl interfaces. It is not available for insertion within client application source code (as in toolkit testing.)

| C | NhCloseAllConnections(); |
|---|---|
| Perl | &NhCloseAllConnections(); |

≡ 6

NhCloseConnection

| Success | NhCloseConnection |
|---|---|
| Handle | Application with which to close connection |

Closes the connection with the given application, causing it to perform an exit(0). It is not generally necessary to make this call. All existing connections will be closed when the driver exits. This call is only available from the external C and Perl interfaces. It is not available for insertion within client application source code (as in toolkit testing.)

| C | NhCloseConnection(ap); |
|---|---|
| Perl | &NhCloseConnection($ap); |

NhCommandLine

| String | NhCommandLine |
|--------|---------------|
| Handle | Application |

Returns the command line that invoked the given client application. This routine is available only from the driver-side interfaces. This call is essentially how your script can access the information printed by the NhPrintConnections call.

```
NHHandle ap;
char *cmd_line;
...
cmd_line = NhCommandLine(ap);
...
free(cmd_line);
```

```
$cmd_line = &NhCommandLine($ap);
```

≡6

NhData

| Constant | NhData |
|---|---|
| int | size of a requested data buffer |

This function is for use within the argument lists of routines that transfer data from the client process to the driver process (NhRetrieveData or NhGetResources) and signifies a buffer the size of the number of bytes given as the argument to this function. The return value is a constant that will be understood by the data retrieval routines.

```
C   NHHandle ap;
    void *remote_buffer;
    ...
    NhRetrieveData(ap, NhData(1500), remote_buffer);
```

```
Perl  &NhRetrieveData($ap, &NhData(1500), $remote_buffer);
```

NhDisplay

| Display* | NhDisplay |
|---|---|
| Handle | Application |

This function returns the internal display pointer for the client application given as the only argument. The display pointer thus returned is very useful with the NhFunction call, with which you can call any of the Xlib or toolkit calls available in shared libraries with which the client application is linked. The display pointer returned cannot be used within the driver script, it is only for use within the client using the NhFunction call. Also, see the NhWindow function.

```
NHHandle ap;
Display *display;
...
display = NhDisplay(ap);
```
```
$display = &NhDisplay($ap);
```

≡6

NhDumpChildren

| Success | NhDumpChildren |
|---|---|
| Handle | Application |
| Object | Parent object from which to base object dump (use NHRoot to dump all objects within an application, for XView applications, NHRoot is the only option currently supported for object dumping) |
| String | Filename of file to which to dump object names |

This routine is used within the nhquery script in the $\{NHHOME\}/bin directory to dump all of the objects under a particular application object into a file. The raw file is then manipulated by the fixdups script to create C or Perl sytle header files.

| C | NhDumpChildren(ap, NHRoot, "objfile.orig"); |
|---|---|
| Perl | &NhDumpChildren($ap, &NHRoot, "objfile.orig"); |

NhError.

| Success | NhError |
|---|---|
| Handle | Application |
| String | warning message or error description string |

This function allows you to write additional No Hands-like functions and include warning messages that act like the real thing. For fatal errors, just do an exit() after calling NhError. Depending upon the current error level, a call to NhError alone will do the following:
  NHExit: issue the message and exit
  NHWarn: issue message only
  NHIgnore: no action is taken

| | |
|---|---|
| | NhError(ap, "Could not find button menu"); |
| | &NhError(Sap, "Cannot popup the window"); |

≡ 6

NhFindComponentBox

| Success | NhFindComponentBox |
|---|---|
| Handle | Application (which contains the object given below) |
| Object | Any Object that has a spatial representation on the screen |
| PartType | what kind of subpart to look for |
| int* | x - the x coordinate of the subpart's center (returned here by reference) |
| int* | y - the y coordinate of the subpart's center (returned here by reference) |
| int* | width - the width (in pixels) of the subpart (returned here by reference) |
| int* | height - the height (in pixels) of the subpart (returned here by reference) |

This function returns by reference the bounding box of the subpart in the object given. This function is particularly useful for determining limited areas for image capture and comparison. The return value of this function indicates success and is True if the object exists and the coordinates returned by reference are accurate. False is returned if the object doesn't have a window or space in a parent window (i.e. if there is no location that can be defined as the center of the object on your screen.) A fatal error will occur if an invalid object is given.

```
C:  NhFindComponentBox(ap, mysbar, NHCableUp, &x, &y, &width, &height);
    success = NhImageRegion(ap, mysbar, "upcable.xpm", x, y, width, height);
    if (success) fprintf("Image save/coomparison succeeded\n");

Perl: $success = &NhFindComponentBox($ap, $myslider, &NHDragBox, $x, $y,
       $width, $height);
      if ($success) {
        $x = $x + $width / 2;
        $y = $y + $height / 2;
        &NhButtonevent($ap, $myslider, &Button1, &NHPress, $x, $y);
        &NhButtonevent($ap, $myslider, &Button1, &NHRelease, $x, $y - 10);
      }
      else {
        &NhError($ap, "Couldn't find dragbox of slider");
      }
```

*No Hands—March 1994*

NhFindComponentXY

| Success | NhFindComponentXY |
|---|---|
| Handle | Application (which contains the object given below) |
| Object | Any Object that has a spatial representation on the screen |
| PartType | what kind of subpart to look for |
| int* | x - the x coordinate of the subpart's center (returned here by reference) |
| int* | y - the y coordinate of the subpart's center (returned here by reference) |

This function returns by reference the coordinates of the center of the subpart in the object given. The return value of this function indicates success and is True if the object exists and the coordinates returned by reference are accurate. False is returned if the object doesn't have a window or space in a parent window (i.e. if there is no location that can be defined as the center of the object on your screen.) A fatal error will occur if an invalid object is given.

```
success = NhFindComponentXY(ap, myscrollbar, NHArrowUp, &x, &y);
if (success) {
    NhButtonEvent(ap, myscrollbar, Button1, NHClick, x, y);
}
else {
    NhError(ap, "Couldn't find up arrow in scrollbar");
}
```

```
$success = &NhFindComponentXY($ap, $myslider, &NHDragBox, $x, $y);
if ($success) {
    &NhButtonevent($ap, $myslider, &Button1, &NHPress, $x, $y);
    &NhButtonevent($ap, $myslider, &Button1, &NHRelease, $x, $y - 10);
}
else {
    &NhError(ap, "Couldn't find dragbox of slider");
}
```

*Library Routine Reference*

≡ 6

NhFindCursor

| Success | NhFindCursor |
|---|---|
| Handle | Application (which contains the object given below) |
| Object | Object relative to which you would like coordinates for the current position of the pointer |
| int* | x - The x coordinate, relative to the upperleft corner of the object (returned here by reference) of the current pointer location |
| int* | y - The y coordinate, relative to the upperleft corner of the object (returned here by reference) of the current pointer location |

This function returns the current location of the pointer. If the object you supply is NHRoot, then you will receive absolute root window coordinates of the current pointer location, otherwise the coordinates you receive will be relative to the upperleft corner of the object given. The example below demonstrates how to use this function at the end of a test to return the pointer to its original location before the test began.

```
int x, y;
NHHandle ap;
...
ap = NhLaunchAndConnect("imagetool");
NhFindCursor(ap, NHRoot, &x, &y);
...
<all tests done here>
...
NhMotionEvent(ap, NHRoot, x, y);
```

```
$ap = &NhLaunchAndConnect("imagetool");
&NhFindCursor($ap, &NHRoot, $x, $y);
...
<all tests done here>
...
&NhMotionEvent($ap, &NHRoot, $x, $y);
```

6

NhFindNthBox

| Success | NhFindNthBox |
|---|---|
| Handle | Application (which contains the object given below) |
| Object | Scrolling List, Menu, Setting, or Choice you are performing this operation on |
| int | n - which subpart of the object |
| int* | x - the x coordinate of the upperleft corner of the nth subpart (returned here by reference) |
| int* | y - the y coordinate of the upperleft corner of the nth subpart (returned here by reference) |

This function returns by reference the coordinates (relative to the upperleft corner of the object given) of the upperleft corner the nth subpart and the width and height of the object given. See the definition of NhFindNthXY for what the coordinates of the "nth subpart" mean for each of the kinds of objects this routine can operate on. The return value of this function indicates success and is True if the subpart exists and the coordinates and dimensions returned by reference are accurate. False is returned if the subpart does not exist. A fatal error will occur if this find was attempted on an object this operation is not specified to work for.

```
NhFindNthBox(ap, myscrollinglist, 0, &x, &y, &width, &height);
```
```
&NhFindNthBox($ap, $myscrollinglist, 3, $x, $y, $width, $height);
$x = $x + $width / 2;
$y = $y + $height / 2;
&NhButtonEvent($ap, $myscrollinglist, &Button1, &NHClick, $x, $y);
```

*Library Routine Reference*

☰ 6

NhFindNthXY

| Success | NhFindNthXY |
|---|---|
| Handle | Application (which contains the object given below) |
| Object | Scrolling List, Menu, Setting, or Choice you are performing this operation on |
| int | n - which subpart of the object |
| int* | x - the x coordinate of the center of the nth subpart (returned here by reference) |
| int* | y - the y coordinate of the center of the nth subpart (returned here by reference) |

This function returns by reference the coordinates (relative to the upperleft corner of the object given) of the center of the nth subpart of the object given. The values for n may count from either 0 or 1, depending on the GUI toolkit and type of widget in question. Here's what the coordinates of the "nth subpart" mean for each of the kinds of objects this routine can operate on:
    Scrolling List - the center of the nth *visible* item in the list
    Menu - the center of the nth *visible* item in the menu
    Setting/Choice - the center of the nth item among the choices, counting from the left, across (and then down to the next row if it's two dimensional)
The return value of this function indicates success and is True if the subpart exists and the coordinates returned by reference are accurate. False is returned if the subpart does not exist. A fatal error will occur if this find was attempted on an object this operation is not specified to work for.

```
NhFindNthXY(ap, myscrollinglist, 0, &x, &y);
&NhFindNthXY($ap, $myscrollinglist, 3, $x, $y);
&NhButtonEvent($ap, $myscrollinglist, &Button1, &NHClick, $x, $y);
```

*No Hands—March 1994*

NhFree

| Success | NhFree |
|---------|--------|
| Handle | Application |
| Pointer | A pointer to the memory within the connected client application that you wish to free |

This function frees memory in a client application that you allocated with an NhMalloc call. Do not use this function to free memory within the driver process, use the regular "free" call for that. See the definition of NhMalloc on page 99 for more information.

```
NHHandle ap;
char *remote_pointer;
...
remote_pointer = NhMalloc(ap, 1500);
...
NhFree(ap, remote_pointer);
```

```
$remote_pointer = &NhMalloc($ap, 1500);
...
&NhFree($ap, $remote_pointer);
```

6

NhFunction

| Varies | NhFunction |
|---|---|
| Handle | Application |
| String | Name of library function |
| String | Name of library |
| int | Number of arguments to follow this one (between 0 and 25, this argument is required only in the C interface, because Perl is capable of counting the arguments for you) |
| ... | additional optional arguments |

This is a very powerful function. It is only available from the driver-side interfaces and it allows you to cause the calling of any library function *from within the client application*. The function must exist within a shared library that you can name. If not linked to your client application already, the shared library will be linked to it and the function you specify will be called by the client application. In this way you can get additional functionality out of the driver-client link and are not limited merely to calls which we have implemented for you (like NhXtMoveWidget, NhXmGetFocusWidget, NhXtMapWidget, and so forth.) The return value is whatever the function within the client returns after the call is complete. There is a maximum limit of 25 optional arguments to the NhFunction call. See also the information on NhSymbol, NhPointerToObject, and NhObjectToPointer calls.

```
NHHandle ap;
NHObject shell;
void *widget;
...
widget = NhObjectToPointer(ap, shell);
NhFunction(ap, "XtMoveWidget", "libXt.so", 3, widget, 20, 20);
```

```
$widget = &NhObjectToPointer($ap, $shell);
&NhFunction($ap, "XtMoveWidget", "libXt.so", $widget, 20, 20);
```

NhGetColorMode

| int | NhGetColorMode |
|---|---|
| Handle | Application |

Returns the current color mode set for image comparisons within the given application. Color mode can be either NHEnv, NHFull, or NHBlind. See the description of NhSetColorMode above.

| C | color_mode = NhGetColorMode(ap); |
|---|---|
| Perl | $color_mode = &NhGetColorMode($ap); |

≣ 6

NhGetCount

| int | NhGetCount |
|---|---|
| Handle | Application (which contains the object given below) |
| Object | Any Object that has a concept of n items |

| This routine returns the number of subobjects or items within the given object. |||
|---|---|---|
| C | count = NhGetCount(ap, mymenu); |
| Perl | $count = &NhGetCount($ap, $myscrollinglist); |

NhGetDelay

| int | NhGetDelay |
|---|---|
| Handle | Application |

Returns the current delay value last set by the NhSetDelay function. This function is useful when you wish to change the execution speed temporarily, and restore the old value with NhSetDelay afterwards.

```
delay = NhGetDelay(ap);
NhSetDelay(ap, 9);
...
NhSetDelay(ap, delay);
```

```
$delay = &NhGetDelay($ap);
&NhSetDelay($ap, 9);
...
&NhSetDelay($ap, $delay);
```

≡6

NhGetDepth

| int | NhGetDepth |
|---|---|
| Handle | Application (which contains the object given below) |
| Object | The object currently displayed that you might be planning to take an image of and that you'd like the depth of |

This routine returns the bit depth of the visual of the window the object given lives in. NhMakeImageName uses this routine to determine whether images are in color or black and white (placing "bw" in the name if bit depth = 1.) Typically, the bit depth, if it's more than 1 does not have much of an effect on the image file, which is stored in a bit-depth independent format (X Pixmap Format.)

| C | depth = NhGetDepth(ap, myscrollbar); |
|---|---|
| Perl | $depth = &NhGetDepth(ap, $myslider); |

NhGetEnv

| String | NhGetEnv |
|--------|----------|
| Handle | Application |
| String | Environment variable name |

This function is used to get the value of an environment variable in a No Hands client application. The client application's environment variables may differ from those available on the driver-side. This routine returns a pointer to a string which you are responsible for freeing when you are done with it.

| C | `printf("NH_MASTERS is set to %s\n", NhGetEnv(ap, "NH_MASTERS");` |
|-------|---|
| Perl | `print "NH_MASTERS is set to ", &NhGetEnv($ap, "NH_MASTERS"), "\n";` |

≡ 6

| NhGetErrorHandler | |
|---|---|
| NhHandlerType | NhGetErrorHandler |
| None | This function does not require any arguments. |
| This call returns a pointer to the function currently set to handle fatal errors (in the Perl interface, this is a string containing the name of the function to call.) This call is only available from the external C and Perl interfaces. It is not available for insertion within client application source code (as in toolkit testing.) | |
| C | NhHandlerType handler;<br>...<br>handler = NhGetErrorHandler(); |
| Perl | $handler = NhGetErrorHandler(); |

NhGetErrorLevel

| ErrorLevel | NhGetErrorLevel |
|---|---|
| Handle | Application |

Returns the current error level in effect. Possible error levels are NHExit, NHWarn, and NHIgnore. See Table 5-14 on page 43 for descriptions of these error levels. The default error level is NHExit if you didn't set one with NhSetErrorLevel.

```
level = NhGetErrorLevel(ap);
NhSetErrorLevel(ap, NHIgnore);
...
NhSetErrorLevel(ap, level);
```

```
$level = &NhGetErrorLevel($ap);
&NhSetErrorLevel($ap, &NHIgnore);
...
&NhSetErrorLevel($ap, $level);
```

NhGetEventHandling

| int | NhGetEventHandling |
|---|---|
| Handle | Application |

Returns non-zero if event handling in the client during No Hands simulation calls is enabled (see the NhSetEventHandling routine, the default is mode is on.)

| C | flag = NhGetEventHandling(ap); |
| Perl | $flag = &NhGetEventHandling($ap); |

NhGetExitHandler

| NhHandlerType | NhGetExitHandler |
|---|---|
| None | This function does not require any arguments. |

This call returns a pointer to the function currently set to be called right before the driver exits (in the Perl interface, this is a string containing the name of the function to call.) This call is only available from the external C and Perl interfaces. It is not available for insertion within client application source code (as in toolkit testing.)

| | |
|---|---|
| C | NhHandlerType handler;<br>...<br>handler = NhGetExitHandler(); |
| Perl | Shandler = NhGetExitHandler(); |

≡ 6

NhGetImageFileSuffix

| String | NhGetImageFileSuffix |
|---|---|
| Handle | Application |

Returns the current image filename suffix for a given application. This is the suffix that is placed on the end of every image filename generated by the NhMakeImageName routine. By default, the suffix is ".xpm.Z" and can be changed by calling NhSetImageFileSuffix.

| C | file_suffix = NhGetImageFileSuffix(ap); |
|---|---|
| Perl | $file_suffix = &NhGetImageFileSuffix($ap); |

NhGetLocale

| String | NhGetLocale |
|---|---|
| Handle | Application (which contains the object given below) |

Returns the locale the application given is running under. This routine is used by NhMakeImageName to determine whether to place the locale into the image name (it won't do anything when the locale returned is "C".) The locale returned is gleaned from the LC_MESSAGES part of the general locale, in order to keep it simple. Setting other parts of your locale will not affect the return value of NhGetLocale.

| C | locale = NhGetLocale(ap); |
|---|---|
| Perl | $locale = &NhGetLocale($ap); |

≣ 6

NhGetPixelTolerance

| int | NhGetPixelTolerance |
|---|---|
| Handle | Application |

Retrieves the current pixel tolerance value set for image comparisons within an application. See the description of NhSetPixelTolerance above.

| C | pixel_tolerance = NhGetPixelTolerance(ap); |
|---|---|
| Perl | $pixel_tolerance = &NhGetPixelTolerance($ap); |

NhGetSelection

| String | NhGetSelection |
|---|---|
| Handle | Application (must not be the one which owns the selection) |
| int | Property - an atom describing which selection to get (usually either XA_PRIMARY or XA_SECONDARY) |

This function is useful for retrieving the primary or secondary selection off of the X server. This function assumes that the selection is a XA_STRING type. If it is not, the selection will fail. If non-string selection types are desired, a new function will have to be written to support this (see bugid 1157551.)

WARNING: NhGetSelection will HANG if the selection is owned by the same application that is requesting the selection! This is an artifact of the way that selections work. The application owning the selection can't process the request for the selection because it is waiting for a reply to the selection request. A tiny X application called *xconnect* has been added to the ${NHHOME}/bin directory for this purpose. All it does is connect to the X server, it is very simple and looks like this:

```
main()
{
    Display *display;
    XEvent event;
    display = XOpenDisplay(NULL);
    for(;;) XNextEvent(display, &event);
}
```

Incidentally, *xconnect* could also be used for generating events on the root window by using the NHRoot object (the only object this application will recognize.)

*Library Routine Reference*

≡ 6

```c
/* See the Perl example below for a more complete example */
...
NHHandle xc;
char *selection;
...
selection = NhGetSelection(xc, XA_PRIMARY);
free(selection);
```

```perl
require 'nhd.ph';
require 'X11/Xatom.ph';
require 'X11/keysym.ph';

$ap = &NhLaunchAndConnect("textedit /etc/system");
$xc = &NhLaunchAndConnect("xconnect");

$textsw = 'Frame_base:1:Textsw:1';
&NhSetDelay($ap, 10);

# Create a Primary selection
&NhButtonEvent($ap, $textsw, &Button1, &NHPress, 10, 10);
&NhButtonEvent($ap, $textsw, &Button1, &NHRelease, 100, 180);

# Create a Secondary selection
&NhKeyEvent($ap, $textsw, &XK_L8, &NHPress, 10, 200);
&NhButtonEvent($ap, $textsw, &Button1, &NHPress, 10, 200);
&NhButtonEvent($ap, $textsw, &Button1, &NHRelease, 100, 420);

# This command would hang if I used $ap instead of $xc here
$selection = &NhGetSelection($xc, &XA_PRIMARY);
print "primary:\n$selection\n";

# This command would also hang if I used $ap instead of $xc
$selection = &NhGetSelection($xc, &XA_SECONDARY);
print "secondary:\n$selection\n";

&NhKeyEvent($ap, $textsw, &XK_L8, &NHRelease, &NHCurrent, &NHCurrent);
```

6 ≡

NhGetResources

| Success | NhGetResources |
|---|---|
| Handle | Application (which contains the object given below) |
| Object | Any Object that has a concept of n items |
| String | The name of the resource you are interested in getting |
| String | The type of the resource you are getting ("String" or "Int" are all that are supported at this time) |
| char**/int* | The pointer to a variable that can receive the value of the resource. In the Perl, a regular scalar variable will suffice for this. |
| ... | The above three arguments can be repeated for as many different resources on the same object that you would like to get in one operation. |
| NULL | This variable argument list must be NULL terminated in the C interface by making the final argument NULL. If you get the wrong number of arguments to this routine (anything not a multiple of 3) then a SEGV signal will occur in your test client. In the Perl interface, this argument is not required (or desired), as Perl will count the number of arguments and NULL terminate them before passing them on to the underlying C library layer. |

This routine returns by reference useful resource information from the object you name. It takes a variable number of arguments (NULL terminated in the C interface) and so can get any reasonable number of resources in one operation (I wouldn't recommend trying to do more than 10 in one operation.) Unlike the event generation routines, there is no implict NhWaitMap call made before seeking a resource. You must call NhWaitMap explicitly if you need to be sure of the object being displayed before the resource query is made. If you ask for a resource that is not valid on the object you've given, NULL (in the C interface) or an empty string (in the Perl interface) will be returned.

*Library Routine Reference* 83

≡ 6

```c
#include <xview/xview.h>
#include <xview/panel.h>
...
int number;
char *resource;
NhGetResources(ap, myslider,
  NhStr(PANEL_VALUE), "Int", &number,
  NULL);
printf("slider value = %d\n", number);

NhGetResources(ap, mytextfield,
  NhStr(PANEL_VALUE), "String", &resource,
  NULL);
if (resource) {
  printf("textfield contains = %s\n", resource);
  free(resource);
}
```

```perl
require "xvtypes.ph";
...
&NhGetResources($ap, $myslider,
  &PANEL_VALUE, "Int", $number);
print STDOUT "slider value = $number\n";
```

NhGetTimeout

| int | NhGetTimeout |
|---|---|
| None | This function does not require any arguments. |

This routine returns the current value (in seconds) of the length of the general timeout. The length of the general timeout is 30 seconds by default and can be set with the NhSetTimeout routine. This call is only available from the external C and Perl interfaces. It is not available for insertion within client application source code (as in toolkit testing.)

| C | timeout_length = NhGetTimeout(); |
|---|---|
| Perl | $timeout_length = &NhSetTimeout(); |

≡6

NhGetTimeoutHandler

| NhHandlerType | NhGetTimeoutHandler |
|---|---|
| None | This function does not require any arguments. |

This call returns a pointer to the function currently set to handle timeout errors (in the Perl interface, this is a string containing the name of the function to call.) This call is only available from the external C and Perl interfaces. It is not available for insertion within client application source code (as in toolkit testing.)

| | |
|---|---|
| C | `NhHandlerType handler;`<br>`...`<br>`handler = NhGetTimeoutHandler();` |
| Perl | `$handler = NhGetTimeoutHandler();` |

6

NhGetViewInfo

| Success | NhGetViewInfo |
|---|---|
| Handle | Application (which contains the object given below) |
| Object | Any Object that has a concept of n items |
| int* | first - the n of the first item displayed |
| int* | range - the number of items displayed at once |

This routine returns by reference useful information about Scrolling Lists, how many items are displayed in the scrolling list window and the n of the first one displayed.

| C | success = NhGetViewInfo(ap, myscrollinglist, &first, &range); |
|---|---|
| Perl | $success = &NhGetViewInfo($ap, $myscrollinglist, $first, $range); |

≣ 6

NhGetWarningHandler

| NhHandlerType | NhGetWarningHandler |
|---|---|
| None | This function does not require any arguments. |

This call returns a pointer to the function currently set to handle warnings (in the Perl interface, this is a string containing the name of the function to call.) This call is only available from the external C and Perl interfaces. It is not available for insertion within client application source code (as in toolkit testing.)

| C | NhHandlerType handler;<br>....<br>handler = NhGetWarningHandler(); |
|---|---|
| Perl | $handler = NhGetWarningHandler(); |

6

NhGetXInput

| int | NhGetXInput |
|---|---|
| Handle | Application |

| Returns non-zero if the XInput mode is enabled (see the NhSetXInput routine.) |||
|---|---|---|
| C | flag = NhGetXInput(ap); ||
| Perl | $flag = &NhGetXInput($ap); ||

≣ 6

NhImage

| Success | NhImage |
|---|---|
| Handle | Application (which contains the object given below) |
| Object | Any object currently displayed |
| String | Filename - the name of the file that either contains the image to compare against or is the file into which the image should be stored. If .Z is used as a suffix in the filename, then the image will be stored compressed (takes more time but less space.) |
| Directive | Whether to save an image (NHSave), compare with one on file (NHCompare), or look to the NH_SAVE_IMAGES environment variable for the answer (NHEnv) |

When NHEnv is given as the directive, the current value of the NH_SAVE_IMAGES environment variable determines the action take by this routine. If the NH_SAVE_IMAGES environment variable is set to anything but "False",
    an attempt is made to save the image of the object in the filename given and this function returns True if the attempt was successful, or
otherwise when NH_SAVE_IMAGES is not set or is "False",
    an attempt is made to load the image in the file into memory and compare it to the image of the object. True is returned if the load was successful and the two images match each other perfectly.
If the suffix of the filename given ends with ".Z" then image saves and compares will operate under the assumption that the image file is or is to be compressed. Image file compression saves a great deal of disk space, but takes about twice as long to process. By default, the filenames received from NhMakeImageName result in image file compression.

```
filename = NhMakeImageName(ap, mycanvas, "canvas", NhStr(1), NULL);
success = NhImage(ap, mycanvas, filename, NHEnv);
```

```
$filename = &NhMakeImageName($ap, $myslider, "slider", 1, "");
$success = &NhImage($ap, $myslider, $filename, &NHEnv);
```

NhImageRegion

| Success | NhImageRegion |
|---|---|
| Handle | Application (which contains the object given below) |
| Object | A currently displayed-on-the-screen Object |
| String | Filename - the name of the file that either contains the image to compare against or is the file into which the image should be stored. If .Z is used as a suffix in the filename, then the image will be stored compressed (takes more time but less space.) |
| Directive | Whether to save an image (NHSave), compare with one on file (NHCompare), or look to the NH_SAVE_IMAGES environment variable for the answer (NHEnv) |
| Coord | x - the x coordinate of the upperleft corner of the area in the object to save/compare as an image (image is limited to only a region of the object) |
| Coord | y - the x coordinate of the upperleft corner of the area in the object to save/compare as an image |
| int | width - the width, in pixels, of the area to make into an image |
| int | height - the height, in pixels, of the area to make into an image |

When NHEnv is given as the directive, the current value of the NH_SAVE_IMAGES environment variable determines the action take by this routine. If the NH_SAVE_IMAGES environment variable is set to anything but "False",
    an attempt is made to save the image of a region of the object in the filename
    given and this function returns True if the attempt was successful, or
otherwise when NH_SAVE_IMAGES is not set or is "False",
    an attempt is made to load the image in the file into memory and compare it to
    the image of the region of the object. True is returned if the load was successful
    and the two images match each other perfectly.
If the suffix of the filename given ends with ".Z" then image saves and compares will operate under the assumption that the image file is or is to be compressed. Image file compression saves a great deal of disk space, but takes about twice as long to process. By default, the filenames received from NhMakeImageName result in image file compression.

| C | filename = NhMakeImageName(ap, mycanvas, "canvas", NhStr(1), NULL); success = NhImageRegion(ap, mycanvas, filename, NHEnv, 5, 5, 10, 50); |
|---|---|
| Perl | $filename = &NhMakeImageName($ap, $myslider, "slider", 1, ""); $success = &NhImageRegion($ap, $myslider, $filename, NHEnv, 0, 50, 10, 5); |

NhKeyEvent

| void | NhKeyEvent |
|---|---|
| Handle | Application (which contains the object given below) |
| Object | Object where mouse button event is to occur |
| int | KeySym - which key to press, look in the <X11/keysymdef.h> header file for a list of available keysyms (use the lower-case keysyms for letters rather than the upper-case ones, as they work more reliably) |
| Action | Which event is to simulate (*NHPress*, *NHRelease*, or *NHClick*) |
| Coord | The x coordinate (relative to upperleft corner of object) |
| Coord | The y coordinate (relative to upperleft corner of object) |

This function moves the cursor to the given coordinates and performs a keyboard event simulation there (a key press, release, or press and release.) To perform operations where the Shift, Control, or some other key must be held down, first do a *NHPress* with the Control or Shift key, do your key operation with *NHClick*, and then use *NHRelease* to let up the Control or Shift key, as demonstrated in the C programming example below.

| C | ```
#include <X11/keysym.h>
...
NhKeyEvent(ap, mytext, XK_Control_L, NHPress, NHCenter, NHCenter);
NhKeyEvent(ap, mytext, XK_Tab, NHClick, NHCurrent, NHCurrent);
NhKeyEvent(ap, mytext, XK_Control_L, NHRelease, NHCurrent, NHCurrent);
``` |
|---|---|
| Perl | ```
require "X11/keysym.ph";
...
&NhKeyEvent($ap, $mytext, &XK_space, &NHClick, &NHCenter, &NHCenter);
``` |

≡6

NhLaunchAndConnect

| Handle | NhLaunchAndConnect |
|---|---|
| String | The command line with which to launch test application |

This routine executes the string given in the current environment to launch an application, links the application with the correct No Hands client-side library (according to the GUI toolkit the application uses), waits for it to connect back with this driver, and returns an application handle. Store the application handle returned, as you'll need it in any No Hands action calls you wish to perform on the test application. If a connection is not possible with the application before the general timeout expires, 0 is returned. Do not use I/O redirection or pipe symbols in the command-line string argument to this function. This call is only available from the external C and Perl interfaces. It is not available for insertion within client application source code (as in toolkit testing.)

| C | NHHandle ap;<br>ap = NhLaunchAndConnect("filemgr -Wi"); |
|---|---|
| Perl | $ap = &NhLaunchAndConnect("imagetool -Wp 40 50"); |

NhLaunchNoConnect

| Success | NhLaunchNoConnect |
|---|---|
| String | The command line with which to launch test application |

This routine executes the string given in the current environment to launch an application, but does not return a connection handle to the application. Use this for launching applications you do not care to drive user event simulation upon. Applications launched this way may still connect with this driver, but you'll have to use NhMatchConnection to get a handle on them. Do not use I/O redirection or pipe symbols in the command-line string argument to this function. This call is only available from the external C and Perl interfaces. It is not available for insertion within client application source code (as in toolkit testing.)

| C | NhLaunchNoConnect("/bin/date"); |
|---|---|
| Perl | &NhLaunchNoConnect("/bin/ls -l"); |

≡6

NhLookupComponent

| Object | NhLookupComponent |
|---|---|
| Handle | Application (which contains the object given below) |
| Object | Object which contains one or more subobjects |
| ObjectType | what kind of subobject to look for |

This function returns a subobject of an object. The following subobjects are available:
- NHHScrollbar - horizontal scrollbars are sometimes available within Text Subwindow objects
- NHVScrollbar - vertical scrollbars are usually available within Scrolling List and Text Subwindow objects
- NHMenu - menus are often available from Windows (not in XView), Scrolling Lists, Scrollbars, Text Subwindows, Menu Buttons, Panel Items, and Menu Items
- NHTextField - XView sliders often have textfields associated with them This routine returns NULL when there is no object of the type requested under the object given (returns a string with zero length rather than NULL in the Perl interface.)

| C | NHObject vscrollbar;<br>...<br>vscrollbar = NhLookupComponent(ap, myscrlist, NHVScrollbar); |
|---|---|
| Perl | $menu = &NhLookupComponent($ap, $mywindow, &NHMenu); |

NhLookupNth

| Object | NhLookupNth |
|---|---|
| Handle | Application (which contains the object given below) |
| Object | Panel or Menu Object which contains ordered subobjects |
| int | n - which subobject to look up |

This function returns the Nth subobject of the given object. This routine returns NULL when there is no object n under the object given (returns a string with zero length rather than NULL in the Perl interface.) Whether the counting of n begins from 0 or 1 depends upon the toolkit and widget the lookup is taking place in. Basically, the n count here will be the same as it is in the underlying toolkit.

| C | menubutton3 = NhLookupNth(ap, mymenu, 3); |
|---|---|
| Perl | $menubutton3 = &NhLookupNth($ap, $mymenu, 3); |

≡6

NhMakeImageName

| String | NhMakeImageName |
|--------|-----------------|
| Handle | Application (which contains the object given below) |
| Object | The object currently displayed that you are planning to take an image of (this is needed to pass on to the NhGetDepth routine internally) |
| String | Testname - generally this is a one word name for your test program (use the name of the driver test script without the .c or .perl suffix, for example) |
| String | Test purpose - this is the name or number (converted to a string) of the test purpose this image is a test for in your test script |
| String | Subpart - when a single test purpose requires more than one image for verification, this is the place where you give the name of this subpart of the test purpose's tests. Just use NULL (or an empty string, in the case of Perl) here when there is only one image per test purpose. |

Use the NhMakeImageName routine to create names for the image files you wish to use in comparisons. This routine uses the NhGetLocale and NhGetDepth routines, as well as your argument parameters, to create a name for your image file. It appends the value from NHGetImageFileSuffix on as well. This routine helps you manage sets of images from differing locales and image depths (bw or color.) The default value from NHGetImageFileSuffix is "xpm.Z"

```
filename = NhMakeImageName(ap, mycanvas, "canvas", NhStr(1), NULL);
/* the above would return the string "canvas_tp1.xpm.Z" on a color machine
in the C locale. In Japanese locale it would be "canvas_1_ja.Z" */
```

```
$filename = &NhMakeImageName($ap, $myslider, "slider1", 5, "anchor");
# on a machine with a monochrome display, the above would return the
# string "slider1_5_anchor_bwxpm.Z", and in French locale it would
# become "slider_5_anchor_fr_bwxpm.Z"
```

*No Hands—March 1994*

NhMalloc

| Pointer | NhMalloc |
|---|---|
| Handle | Application (in which to create a buffer) |
| Int | Number of bytes of space to allocate with the client process |

When using the NhXvGet or NhFunction calls it may be necessary to first allocate a memory area or buffer within the client process to use during the operation. It is important to note that this call does not allocate space within the driver process, that is a completely different matter, and you would call "malloc" to do so within a C interface program. A pointer is returned to you which you may use in subseqent calls that affect the client's memory space, like in NhXvGet, NhSetResources, or NhFunction. NULL is returned if the malloc operation was not successful within the client. Use the NhFree call to free memory allocated in the client with NhMalloc.

| C | See the example in Table 7-3 on page 149. |
|---|---|
| Perl | See the example in Table 7-4 on page 150. |

≡ 6

| NhMatchConnection | |
|---|---|
| Handle | NhMatchConnection |
| String | A regular expression to match against the command lines of all applications to which the driver has connections |

This routine searches through the current list of connections and returns the first connection whose command line matches the regular expression given as an argument (a straight substring check is done before the regular expression algorithms are called in case you pass a verbatum command line and it contains special characters that would otherwise be misunderstood in a regular expression.) This routine is useful for finding and connecting to applications that weren't launched directly by the driver. If, for example, one of the applications you launched launches another, the only way to execute No Hands actions on the indirectly-launched child is to match the command line of the connection via this routine. Zero is returned if no match can be made before the general timeout expires (only if you've set up your own timeout handling routine, this is normally considered a fatal error.) This call is only available from the external C and Perl interfaces. It is not available for insertion within client application source code (as in toolkit testing.)

| C | NHHandle ap;<br>ap = NhMatchConnection("imagetool -tooltalk"); |
|---|---|
| Perl | $ap = &NhMatchConnection("filemgr"); |

6 ≡

NhMotionEvent

| Success | NhMotionEvent | |
|---|---|---|
| Handle | Application (which contains the object given below) | |
| Object | Object (to which coordinates below are relative) | |
| Coord | The x coordinate (relative to upperleft corner of object) | |
| Coord | The y coordinate (relative to upperleft corner of object) | |

This function moves the mouse pointer to the coordinate given. Instances where you will need to call this function are few, since the mouse will automatically be moved before any button, key, or string event is generated using one of the other routines in this section.

| C | NhMotionEvent(ap, mypanel, 64, 10); |
|---|---|
| Perl | &NhMotionEvent($ap, $mycanvas, &NHCenter, 67); |

≡ 6

| Success | NhObjectToPointer |
|---|---|
| Handle | Application |
| Object | Object to convert to a client-side pointer |
| \multicolumn{2}{l}{This function converts a driver-side hierarchical name object to a client-side widget pointer (or object pointer in XView.) used in conjuction with NhFunction, this allows you to make function calls within the client on any object you know the name of on the driver-side.} | |

```
C     NHHandle ap;
      NHObject button;
      void *widget_pointer;
      ...
      widget_pointer = NhObjectToPointer(ap, button);
      NhFunction(ap, "XtUnmapWidget", "libXt.so", 1, widget_pointer);

Perl  $widget_pointer = &NhObjectToPointer($ap, $button);
      &NhFunction($ap, "XtUnmapWidget", "libXt.so", $widget_pointer);
```

NhPid

| int | NhPid |
|---|---|
| Handle | Application |

This function returns the process id of the client. It can be useful for script in which you'd like to do manipulations on the client using the process id (like sending signals via the UNIX kill command for example.) This call may only be used from driver-side interfaces.

```
NHHandle ap;
int client_pid;
...
client_pid = NhPid(ap);
```

```
$client_pid = &NhPid($ap);
```

NhPointerToObject

| Success | NhPointerToObject |
|---|---|
| Handle | Application |
| Pointer | Client-side pointer to convert to a driver-side object |

This function converts a client-side widget pointer (or object pointer in XView) to a driver-side hierarchical object name. When used in conjuction with NhFunction, this allows you to to return values that are widgets and convert them to objects you can address in driver-side scripts.

C
```
NHHandle ap;
NHObject shell, button;
void *shell_widget_pointer;
void *button_widget_pointer
...
shell_widget_pointer = NhObjectToPointer(ap, shell);
button_widget_pointer = NhFunction(ap, "XtNameToWidget", "libXt.so", 2,
shell_widget_pointer, "*filebutton");
button = NhPointerToObject(ap, button_widget_pointer);
...
NhButtonEvent(ap, button, Button1, NHClick, NHCenter, NHCenter);
```

Perl
```
$shell_widget_pointer = &NhObjectToPointer($ap, $shell);
$button_widget_pointer = &NhFunction($ap, "XtNameToWidget",
"libXt.so", $shell_widget_pointer, "*filebutton");
$button = &NhPointerToObject($ap, $button_widget_pointer);
...
&NhButtonEvent($ap, $button, &Button1, &NHClick, &NHCenter,
&NHCenter);
```

NhPrintConnections

| Success | NhPrintConnections |
|---------|--------------------|
| None | This routine does not require any arguments |

Prints a list of all the current connections to stdout. This can be useful for debugging a script that has connections to multiple applications and you are having trouble succeeding with NhMatchConnection. This call is only available from the external C and Perl interfaces. It is not available for insertion within client application source code (as in toolkit testing.) To get the information printed by this call in a form in which it may used within the test script itself (and not just for your debugging), use the NhCommandLine and NhPid calls.

| C | NhPrintConnections(); |
|---|----------------------|
| Perl | &NhPrintConnections0; |

NhPutEnv

| Success | NhPutEnv |
|---|---|
| Handle | Application |
| String | Environment name and value - this is a string you would like placed into the application's environment. You must use a string of the form "name=value" in order to affect the environment variable called by "name." |

This function can be used to change one of the environment variables seen inside a No Hands client process. It is the only way to effect environment variables such as NH_MASTERS and NH_RESULTS if they were not specified before test execution began.

```
NhPutEnv(ap, "NH_RESULTS=/usr/images/savedir");
&NhPutEnv($ap, "NH_RESULTS=/usr/images/savedir");
```

NhRetrieveData

| Pointer | NhRetrieveData |
|---|---|
| Handle | Application from which to retrieve data |
| DataType | Type of data to retrieve ("String", "Int", or NhData(size)) |
| Pointer | Pointer valid within the client application's memory space that points to the data to retrieve |

This function results in a transfer of data across the connection between client and driver. The pointer you give as an argument must be valid within the client's memory space (as is an address aquired by the use of NhXvGet, NhMalloc, or NhFunction.) The data there is transferred into the driver's memory space into a buffer automatically set up for you. A pointer to the local (driver-side destination) buffer is returned to you.

| | |
|---|---|
| C | See the example in Table 7-3 on page 149. |
| Perl | See the example in Table 7-4 on page 150. |

≡ 6

NhRootBox

| Success | NhRootBox |
|---|---|
| Handle | Application (which contains the object given below) |
| Object | Object whose root window coordinates and bounding box you seek |
| int* | x - The root window x coordinate of the upperleft corner of the object (returned here by reference) |
| int* | y - The root window y coordinate of the upperleft corner of the object (returned here by reference) |
| int* | width - The width of the object (in pixels, returned here by reference) |
| int* | height - The height of the object (in pixels, returned here by reference) |

This function is the most basic one available for figuring out the location and size of an object's area on the display. The return values are in root window coordinates. With this function, for example, you could find the location of a drag box in the source application in root window coordinates and then execute the action using the destination application's *NHRoot* object over the source's drag box (see the Perl programming example below.)

| C | NhRootBox(ap, mypanel, &x, &y, &width, &height); |
|---|---|
| Perl | &NhRootBox($src_ap, $Drag_Box_Item, $x, $y, $width, $height);<br>$src_x = $x + $width / 2;<br>$src_y = $y + $height / 2;<br>&NhRootBox($dst_ap, $Drag_Box_Item, $x, $y, $width, $height);<br>$dst_x = $x + $width / 2;<br>$dst_y = $y + $height / 2;<br>&NhButtonEvent($dst_ap, &NHRoot, &Button1, &NHPress, $src_x, $src_y);<br>&NhButtonEvent($dst_ap, &NHRoot, &Button1, &NHRelease, $dst_x, $dst_y); |

NhRootCenter

| void | NhRootCenter | |
|---|---|---|
| Handle | Application (which contains the object given below) | |
| Object | Object whose center root window coordinates you seek | |
| int* | x - The root window x coordinate of the center of the object (returned here by reference) | |
| int* | y - The root window y coordinate of the center of the object (returned here by reference) | |

This routine is a convenience function built on NhRootBox. The return values are in root window coordinates. With this function, for example, you can find the location of the drag box in the source application in root window coordinates and then execute the action with the destination application's *NHRoot* object over the source's drag box (see the Perl programming example below.) Notice that the example below is somewhat simpler compared to the same thing done with NhRootBox above.

| C | NhRootCenter(ap, mypanel, &x, &y); |
|---|---|
| Perl | &NhRootCenter($src_ap, $Drag_Box_Item, $src_x, $src_y);<br>&NhRootCenter($dst_ap, $Drag_Box_Item, $dst_x, $dst_y);<br>&NhButtonEvent($dst_ap, &NHRoot, &Button1, &NHPress, $src_x, $src_y);<br>&NhButtonEvent($dst_ap, &NHRoot, &Button1, &NHRelease, $dst_x, $dst_y); |

*Library Routine Reference*

≡ 6

NhSetColorMode

| int | NhSetColorMode |
|---|---|
| Handle | Application (in which to effect a change of color mode) |
| ColorMode | new color mode - NHEnv, NHFull, or NHBlind |

This routine sets the image color comparison mode for a given application, returning the old value as it does so. By default, the color mode for an application is NHEnv, which results in the application checking for the presence of the NH_COLORBLIND environment variable before every image comparison. If the NH_COLORBLIND environment variable is found to exist in the environment, and is not set to "False", then image comparisons will occur in colorblind mode, as described below. The other two color modes are NHFull and NHBlind. NHFull results in exacting image comparisons in NhImage and NhImageRegion calls, and all image colors must match precisely. This is also the behavior when the color mode is NHEnv and the NH_COLORBLIND environment variable is not set.

When the color mode is NHBlind (or NHEnv with NH_COLORBLIND set), image comparisons made with NhImage and NhImageRegion are blind to color differences between a master image file and the image from a current object. This means that a three color image saved under a windowing environment using black, white, and red, can match without failure to the same live image currently rendered in grey, green, and blue. Image comparison failures will still occur under either of following two conditions, (1) the images are actually different in the way they look (and would have failed under the same colorings as well anyway), or (2) two or more colors map to the same color in either of the images (e.g. image 1 is black, white, and red; image 2 is grey, green, and green.)

The return value of this routine is whatever the color mode was before the call.

| | old_color_mode = NhSetColorMode(ap, NHBlind); |
|---|---|
| | $old_color_mode = &NhSetColorMode($ap, &NHBlind); |

No Hands—March 1994

NhSetDelay

| int | NhSetDelay |
|---|---|
| Handle | Application |
| int | Delay value - this setting affects how quickly the mouse pointer will move from object to object during testing. The default value, if you don't set it for your application with this function, is 0 (no delay.) As you use positive integers farther from zero, the delay increases, and 10 is a good value, for example, for slowing down tests enough to watch them. The absolute values of negative values are taken to be the exact number of discrete mouse movements you'd like when moving between objects. |

This function can be used to slow down event generation to a point where observers will be able to discern what is occurring in the test. Delay 0 causes all movement between action spots to be skipped, and when used the cursor will appear to jump directly from position to position. Delay 5 is recommended if you want tests to run quickly but still have mouse movements that are discernible. Delay 10 is slow enough for demos, but too slow for test development or execution. The return value of this routine is whatever delay was set before the call.

An environment variable called NH_DELAY can be used to set the initial default delay of client applications. The default is normally 0 but will become whatever NH_DELAY is set to at startup time (it must be an integer.) Once NhSetDelay is called within a test script, however, the setting of the NH_DELAY variable setting is no longer important. NhSetDelay calls override any previous setting of the delay value.

| C | old_delay = NhSetDelay(ap, 5); |
|---|---|
| Perl | $old_delay = &NhSetDelay($ap, 5); |

*Library Routine Reference*

NhSetErrorHandler

| NhHandlerType | NhSetErrorHandler |
|---|---|
| NhHandlerType | This argument defines the function to call in your own driver side test script or program when a fatal error occurs in a No Hands action on one of the driver's clients. In the external C interface, this is a function pointer (NhHandlerType.) In the Perl interface, this is a string and is the name of the function to call. |

This call sets a routine of yours to call when a fatal error occurs on an action in one of the driver's client applications. Your handling routine will be passed the string the default handler would have printed. A fatal error is always fatal for the client it occurs upon even when you have a handler set. To return to the use of the default handler, use NULL as an argument (in the Perl interface, use an empty string.) This call is only available from the external C and Perl interfaces. It is not available for insertion within client application source code (as in toolkit testing.) The return value of this routine is whatever error handler was set before the call.

```c
#include <nhd.h>
...
static void my_handler(char *msg)
{
  fprintf(stderr, "%s\n", msg);
}
...
NhSetErrorHandler((NhHandlerType) my_handler);
```

```perl
sub my_handler {
  local($msg) = @_;
  print STDERR "$msg\n";
}
...
&NhSetErrorHandler("my_handler");
```

NhSetErrorLevel

| int | NhSetErrorLevel |
|---|---|
| Handle | Application |
| ErrorLevel | The level of error reporting desired |

Sets the error level for the reporting of warnings. Possible error levels are NHExit, NHWarn, and NHIgnore. See Table 5-14 on page 43 for descriptions of these error levels. The default error level is NHExit if you don't set one. The return value of this routine is whatever the error level was before the call.

| C | NhSetErrorLevel(ap, NHWarn); |
|---|---|
| Perl | &NhSetErrorLevel($ap, &NHIgnore); |

NhSetEventHandling

| int | NhSetEventHandling |
|---|---|
| Handle | Application |
| int | True (non-zero) to turn mode on, False to turn it off. Default is on. |

You shouldn't try to use this routine until you run into a problem you can't deal with by the ordinary means.

Event Handling is the term we use to describe the empty of the X event queue that occurs inside your application whenever a No Hands event simulation request is made. In normal operation, this mode is on, and causes a No Hands client to perform event handling within each simulation call before it returns an acknowledgment to the driver. In some cases, such as in the dragging of OLIT sliders and scrollbars, the event handling will cause the client to hang and never return an acknowledgment to the driver. To get around this problem, use this call to turn event handling off before dragging an OLIT slider or scrollbar, then use it again to turn event handling back on.

The return value of this routine is whatever mode event handling was in before the call was made.

```
NhSetEventHandling(ap, 0);
NhButtonEvent(ap, sbar, Button1, NHPress, x1, y1);
NhButtonEvent(ap, sbar, Button1, NHRelease, x2, y2);
NhSetEventHandling(ap, 1);
```

```
&NhSetEventHandling($ap, 0);
&NhButtonEvent($ap, $sbar, &Button1, &NHPress, $x1, $y1);
&NhButtonEvent($ap, $sbar, &Button1, &NHRelease, $x2, $y2);
&NhSetEventHandling($ap, 1);
```

6

NhSetExitHandler

| NhHandlerType | NhSetExitHandler |
|---|---|
| NhHandlerType | This argument defines the function to call in your own driver side test script or program when the final exit of your script occurs. In the external C interface, this is a function pointer (NhHandlerType.) In the Perl interface, this is a string and is the name of the function to call. |

This call sets a routine of yours to call when your driver is about to exit. Your handling routine will be passed exit status the program was going to exit with. To return to the use of the default handler, use NULL as an argument (in the Perl interface, use an empty string.) This call is only available from the external C and Perl interfaces. It is not available for insertion within client application source code (as in toolkit testing.) The return value of this routine is whatever exit handler was set before the call.

C
```
#include <nhd.h>
...
static void my_handler(int status)
{
  fprintf(stderr, "%d\n", status);
}
...
NhSetExitHandler((NhHandlerType) my_handler);
```

Perl
```
sub my_handler {
    local($status) = @_;
    print STDERR "$status\n";
}
...
&NhSetExitHandler("my_handler");
```

*Library Routine Reference*

≡ 6

NhSetImageFileSuffix

| String | NhSetImageFileSuffix |
|---|---|
| Handle | Application |
| String | new general image file suffix |

Sets the current image filename suffix in an application and returns the previous value. This is the suffix that is placed on the end of every image filename generated by the NhMakeImageName routine for the given application. By default, the suffix is ".xpm.Z" if it isn't changed by calling NhSetImageFileSuffix. If the suffix ends with ".Z" then image names from NhMakeImageName, when used with NhImage or NhImageRegion to save images will result in compressed image files. Image file compression saves a great deal of disk space, but takes perhaps twice as long. The return value of this routine is whatever the suffix was before the call.

| C | old_file_suffix = NhSetImageFileSuffix(ap, ".xpm"); |
|---|---|
| Perl | $old_file_suffix = &NhGetImageFileSuffix($ap, ".xpm"); |

NhSetPixelTolerance

| int | NhSetPixelTolerance |
|---|---|
| Handle | Application (in which to effect a change of pixel tolerance) |
| int | number of pixels of tolerance |

This routine sets the acceptable number of non-matching pixels in future image comparisons made with NhImage or NhImageRegion within a particular application. The default is 0, meaning that all pixels in an image comparison must match for that comparison to be called successful unless you make this call and change the tolerance. Changing the pixel tolerance is useful when you want to make an image comparison knowing that some pixels will not match, but not caring about a little discrepancy between the master and live images. The return value of this routine is whatever the tolerance was set to before this call.

```
C   old_pixel_tolerance = NhSetPixelTolerance(ap, 10);
    success = NhImage(ap, fuzzy_canvas, filename, NHEnv);
    (void) NhSetPixelTolerance(ap, old_pixel_tolerance);

Perl $old_pixel_tolerance = &NhSetPixelTolerance($ap, 10);
    $success = &NhImage($ap, $fuzzy_canvas, $filename, &NHEnv);
    &NhSetPixelTolerance($ap, $old_pixel_tolerance);
```

*Library Routine Reference*

≡ 6

NhSetResources

| Success | NhSetResources |
|---|---|
| Handle | Application (which contains the object given below) |
| Object | Any Object that has resources you'd like to set |
| String | The name of the resource to set |
| String | The type of the resource to set ("String" and "Int" are the only two types currently supported.) |
| char*/int | The value to which you'd like to set the resource |
| ... | The last three arguments can be repeated for as many resources you'd like to set on this object in one operation. |
| NULL | This routine has a variable number of arguments and in the C interface, the last one has to be NULL. If you give the wrong number of arguments to this routine (anything not a multiple of 3) then a SEGV signal will occur in your test client. In the Perl interface, this argument is not required (or desired), as Perl will count the number of arguments and NULL terminate them before passing them on to the underlying C library layer. |

6 ≡

You may use this routine to set resources in a client application. This is not really a fair testing function, since you are setting resources from within the application itself (something the user cannot do), but it can be useful. Be warned that the objects in an application do not necessarily react in the same way if you substitute setting a resource for a real user input event action. The C interface and Perl interface are a little different in their use of strings and integers. Using this routine is a little more natural, as far as the arguments are concerned, in the Perl interface. All integers in the C interface must be converted to strings and back. In the Perl interface, that is unnecessary because Perl does it for you. Unlike the event generation routines, there is no implicit NhWaitMap call made before seting a resource. You must call NhWaitMap explicitly if you need to be sure of the object being displayed before the resource setting is made.

Warning: when setting a Float type resource from the C interface, you need to pass the address of the float rather than the float directly. It doesn't work correctly when you try to pass it straight through because va_args inside of NhSetResources gets confused.

This is the intuitive, but WRONG way:

```
float fval = 0.3;
NhSetResources(ap, obj, "randomSize", "Float", fval, NULL);
```

This is the CORRECT way:

```
float fval = 0.3;
NhSetResources(ap, obj, "randomSize", "Float", &fval, NULL);
```

| C | ```
#include <xview/xview.h>
#include <xview/panel.h>
...
NhSetResources(ap, myslider,
    NhStr(PANEL_VALUE), "Int", 35,
    NULL);

/* the following is a useful way to empty textfields */
NhSetResources(ap, mytextfield,
    NhStr(PANEL_VALUE), "String", "",
    NULL);
``` |
|---|---|
| Perl | ```
require "xvtypes.ph";
...
&NhSetResources($ap, $myslider,
    &PANEL_VALUE, "Int", 35);
``` |

*Library Routine Reference*   119

NhSetTimeout

| int | NhSetTimeout |
|---|---|
| int | The number of seconds to wait before timing out on any No Hands action call between driver and client. |

After sending each No Hands action request to a client, the driver will wait up to the number of seconds the general timeout is set to (the default is 30 seconds) for an acknowledgment from the client. The acknowledgment from the client comes when the action is complete and the client is ready to on to the next request. This function can be used to change the timeout time. It is not recommended that you set this value too low, because timeouts are always fatal for the client involved. On an especially slow operation, you may wish to set this value higher temporarily. If the value is too high, however, you will have to wait an inordinately long time for mistakes you make in scripting to result in timeouts while you are developing tests. This call is only available from the external C and Perl interfaces. It is not available for insertion within client application source code (as in toolkit testing.) The return value of this routine is whatever the timeout was set to before the call.

An environment variable called NH_TIMEOUT can be used to set the initial default timeout of the driver. The default is normally 30 but will become whatever NH_TIMEOUT is set to at startup time (it must be an integer.) Once NhSetTimeout is called within the driver's test script, however, the setting of the NH_TIMEOUT variable setting is no longer important. NhSetTimeout calls override any previous setting of the timeout value.

```
NhSetTimeout(60);
&NhSetTimeout(60);
```

6

NhSetTimeoutHandler

| NhHandlerType | NhSetTimeoutHandler |
|---|---|
| NhHandlerType | This argument defines the function to call in your own driver side test script or program when a timeout occurs in a No Hands action on one of the driver's clients. In the external C interface, this is a function pointer (NhHandlerType.) In the Perl interface, this is a string and is the name of the function to call. |

This call sets a routine of yours to call when a timeout occurs on an action in one of the driver's client applications. Your handling routine will be passed the string the default handler would have printed. A timeout error is always fatal for the client it occurs upon. To return to the use of the default handler, use NULL as an argument (in the Perl interface, use an empty string.) This call is only available from the external C and Perl interfaces. It is not available for insertion within client application source code (as in toolkit testing.) The return value of this routine is whatever timeout handler was set before the call.

C:
```c
#include <nhd.h>
...
static void my_handler(char *msg)
{
    fprintf(stderr, "%s\n", msg);
}
...
NhSetTimeoutHandler((NhHandlerType) my_handler);
```

Perl:
```perl
sub my_handler {
    local($msg) = @_;
    print STDERR "$msg\n";
}
...
&NhSetTimeoutHandler("my_handler");
```

≡ 6

NhSetWarningHandler

| NhHandlerType | NhSetWarningHandler |
|---|---|
| NhHandlerType | This argument defines the function to call in your own driver side test script or program when a warning occurs in a No Hands action on one of the driver's clients. In the external C interface, this is a function pointer (NhHandlerType.) In the Perl interface, this is a string and is the name of the function to call. |

This call sets a routine of yours to call when a warning occurs on an action in one of the driver's client applications. Your handling routine will be passed the string the default handler would have printed. To return to the use of the default handler, use NULL as an argument (in the Perl interface, use an empty string.) This call is only available from the external C and Perl interfaces. It is not available for insertion within client application source code (as in toolkit testing.) The return value of this routine is whatever warning handler was set before the call.

C:
```c
#include <nhd.h>
...
static void my_handler(char *msg)
{
    fprintf(stderr, "%s\n", msg);
}
...
NhSetWarningHandler((NhHandlerType) my_handler);
```

Perl:
```perl
sub my_handler {
    local($msg) = @_;
    print STDERR "$msg\n";
}
...
&NhSetWarningHandler("my_handler");
```

NhSetXInput

| int | NhSetXInput |
|---|---|
| Handle | Application |
| int | True (non-zero) to turn mode on, False to turn it off |

Use this routine to get around Notices and other thread-blocking widgets/objects. You shouldn't try to use this routine until you run into a problem.

This mode enabling routine is for use in very special situations. In certain cases with each GUI toolkit there are actions you can request that will block the internal thread of the client application. XView notices are an example of this. When the internal thread of the application is blocked in a custom X input loop inside the toolkit's code (as happens when an XView notice is up), it will not return an acknowledgment on any further action calls back to the driver before the general timeout expires (in fact, it *never* will.)

To overcome this problem, the No Hands client-side library has a special operating mode (XInput enabled) which will allow No Hands calls to make it through the thread block (and this is the only way you are ever going to manage to press a button inside of a notice popup in an XView application.) To turn on this mode use this call, NhSetXInput with a non-zero argument.

This mode is disabled by default, because it reduces the efficiency of No Hands and can have unpredictable effects in other situations. The mode should be disabled as soon as the notice is gone.

The return value of this routine is whatever the mode was before the call.

```
NhSetXInput(ap, 1);
/* press the button to make notice popup come up */
NhButtonEvent(ap, popup_button, Button1, NHClick, NHCenter, NHCenter);
/* dismiss the notice popup */
NhButtonEvent(ap, dismiss_button, Button1, NHClick, NHCenter, NHCenter);
NhSetXInput(ap, 0);
```

```
&NhSetXInput($ap, 1);
... similar to above ...
&NhSetXInput($ap, 0);
```

NhStr

| String | NhStr |
|---|---|
| int | integer to convert to a string |

This function is for use within the argument lists of routines *in the C interface* that require strings as arguments where an integer is an often used form of data. The return value is a statically allocated string that the caller does not need to free. NhStr may be used up to 15 times in one function call argument list (it has a rotating array of statically allocated strings.)

```
filename = NhMakeImageName(ap, widget, "testname", NhStr(1), NULL);
# NhStr is not available or necessary in the Perl interface
# Also, NULL is represented by an empty string in Perl.

$filename = &NhMakeImageName($ap, $widget, "testname", 1, "");
```

6 ≡

NhStringEvent

| Success | NhStringEvent |
|---------|---------------|
| Handle  | Application (which contains the object given below) |
| Object  | Object where mouse button event is to occur |
| String  | String to type (simulates characters in order in string) |
| Action  | Which event is to simulate for each character (typically *NHClick* is the best one to use, since *NHPress* or *NHRelease* alone will not have the effect usually desired) |
| Coord   | The x coordinate (relative to upperleft corner of object) |
| Coord   | The y coordinate (relative to upperleft corner of object) |

This function is convenient for typing strings into textfields and the like. It knows the keysyms to use for most printable characters but may not work for the more esoteric keys. Use NhKeyEvent instead for unusual or unprintable characters.

| C    | NhStringEvent(ap, mytextfield, "Hello World", NHClick, NHCenter, NHCenter); |
|------|-----------------------------------------------------------------------------|
| Perl | &NhStringEvent($ap, $mytextfield, "Wash Me", &NHClick, &NHCurrent, &NHCurrent); |

*Library Routine Reference*

6

NhSymbol

| Varies | NhSymbol |
|---|---|
| Handle | Application |
| String | Symbol name |
| String | Library name |

This function allows you to look up symbols out of a shared library. The symbols returned may be used in calls within the client that you generate with the NhFunction call. The return value of this call varies with the type of symbol returned.

| C | `NHHandle ap;`<br>`void *widget_class;`<br>`...`<br>`widget_class = NhSymbol(ap, "xmPushButtonWidgetClass", "libXm.so");` |
|---|---|
| Perl | `$widget_class = &NhSymbol($ap, "xmPushButtonWidgetClass", "libXm.so");` |

≡ 6

NhVersionNumber

| double | NhVersionNumber |
|---|---|
| None | No arguments are required. |

This function returns the version number of your No Hands installation. It is a decimal consisting of the major and minor version numbers (e.g. 1.1).

| C | printf("Version Number: %f\n", NhVersionNumber()); |
|---|---|
| Perl | print "Version Number: " . &NhVersionNumber() . "\n"; |

NhVersionString

| String | NhVersionString |
|---|---|
| None | No arguments are required. |

This function returns the version name of your No Hands installation.

| | |
|---|---|
| | `printf("Version Name: %s\n", NhVersionString());` |
| Perl | `print "Version Name: " . &NhVersionString() . "\n";` |

NhWaitExit

| Success | NhWaitExit |
|---|---|
| Handle | Application handle |

This routine waits for a client application to exit and then returns success if and when it does. Zero is returned if this function times out. This routine is useful for situations where you've exited an application either by a simulated user action or NhCloseConnection and you are waiting for it to actually disappear so that you can get at the windows underneath it. If the error level is NHExit (which is the default), an the client application does not exit before the general timeout expires, the timeout error that is generated will cause your test script to exit. This call is only available from the external C and Perl interfaces. It is not available for insertion within client application source code (as in toolkit testing.)

| C | NhWaitExit(ap); |
|---|---|
| Perl | &NhWaitExit($ap); |

NhWaitMap

| Success | NhWaitMap |
|---------|-----------|
| Handle  | Application |
| Object  | Object to wait for |

This function blocks until the specified object is both instantiated and mapped. If already mapped, this routine returns immediately. This routine might be necessary for keeping test sections synchronized with object availability. You'd want to use this routine when waiting for popup windows to appear, for example. You rarely need to use this call, however, since it is done internally before any other action on an object is undertaken. If the object waited for doesn't come up before the general timeout, then 0 is returned.

```
int did_come_up;
...
did_come_up = NhWaitMap(ap, mypopup);
```

```
&NhButtonEvent($ap, $mymenu, &Button1, &NHClick, $item_x, $item_y);
&NhWaitMap($ap, $mypopup);
&NhImage($ap, $mypopup, "PoppedUpImage.dat");
```

6

NhWaitUnmap

| Success | NhWaitUnmap |
|---|---|
| Handle | Application |
| Object | Object to wait for disappearance of |

This function blocks until the specified object is becomes unmapped. If already unmapped, this routine returns immediately. This routine is very useful for keeping test sections synchronized. You'll want to use this routine when waiting for popup window to go away, for example, so that you can get at something underneath it.

| C | NhWaitUnmap(ap, mypopup); |
|---|---|
| Perl | &NhWaitUnmap($ap, $mypopup); |

NhWindow

| Window | NhWindow |
|--------|----------|
| Handle | Application |
| Object | Object whose Widow ID to get |

This function returns the window id of the window that contains a given application object. The window id thus returned is very useful with the NhFunction call, with which you can call any of the Xlib or toolkit calls available in shared libraries with which the client application is linked. Also, see the NhDisplay function.

| C | NHHandle ap;<br>Window window;<br>...<br>window = NhWindow(ap); |
|---|---|
| Perl | $window = &NhWindow($ap); |

≡ 6

NhXmGetFocusWidget

| Object | NhXmGetFocusWidget |
|---|---|
| Handle | Application handle |
| Object | Parental Widget |

This routine causes XmGetFocusWidget to be called within the client Motif application specified (this will not work for XView or OLIT applications.) It can be useful for finding out which widget has focus.

```
NHHandle ap;
NHObject shell, which;
...
which = NhXmGetFocusWidget(ap, shell);
```

```
$which = &NhXmGetFocusWidget($ap, $shell);
```

6≡

NhXmProcessTraversal

| int | NhXmProcessTraversal |
|---|---|
| Handle | Application handle |
| Object | Widget |
| int | Direction |

This routine causes XmProcessTraversal to be called within the client Motif application specified (this will not work for XView or OLIT applications.) It can be useful for traversing focus maps.

| C | NHHandle ap;<br>NHObject shell;<br>...<br>NhXmProcessTraversal(ap, shell); |
|---|---|
| Perl | &NhXmProcessTraversal($ap, $shell); |

≡ 6

NhXtIsManaged

| int | NhXtIsManaged |
|---|---|
| Handle | Application handle |
| Object | Object within client Xt application |

This routine lets you determine whether an Xt widget within an Xt-based client application (this will not work for XView) is currently managed or not. The return value is a boolean and this is just like doing an XtIsManaged call with the client application itself.

```
C:  NHHandle ap;
    NHObject menu;
    ...
    if (NhXtIsManaged(ap, menu)) {
        ...
    }
```

```
Perl:  if (&NhXtIsManaged($ap, $menu)) {
           ...
       }
```

6

NhXtNameToWidget

| Object | NhXtNameToWidget |
|--------|------------------|
| Handle | Application handle |
| Object | Object from which to descend from to look for descendants with the naming given in the next argument |
| String | An Xt-style widget naming string (see the Xt manual description of XtNameToWidget) using * and . characters to establish a relationship with the parent object given in the previous argument. |

This routine lets you look up an Xt widget (this will not work for XView) using the naming style you would normally use with XtNameToWidget. The Object you give as the second argument is used as the root of the widget tree to search for a widget that matches the name given as the third argument. The return value is the widget that matches the given name. If no such widget can be found, then NULL is returned (or an empty string, in the Perl interface.)

| C | NHHandle ap;<br>NHObject shell, button;<br>...<br>button = NhXtNameToWidget(ap, shell, "*filebutton"); |
|---|---|
| Perl | $button = &NhXtNameToWidget($ap, $shell, "*filebutton"); |

*Library Routine Reference*

6

NhXtMapWidget

| void | NhXtMapWidget |
|---|---|
| Handle | Application handle |
| Object | Object to map |

This routine causes XtMapWidget to be called within the client Xt application specified (this will not work for XView applications.) It can be useful for forcing the mapping of widgets.

| C | NHHandle ap;<br>NHObject shell;<br>...<br>NhXtMapWidget(ap, shell); |
|---|---|
| Perl | &NhXtMapWidget($ap, $shell); |

NhXtMoveWidget

| void | NhXtMoveWidget |
|---|---|
| Handle | Application handle |
| Object | Object to move |
| int | x coordinate to move to in the parent of the object |
| int | y coordinate to move to in the parent of the object |

This routine causes XtMoveWidget to be called within the client Xt application specified (this will not work for XView applications.) It can be useful for moving application shell widgets (and thus the top level window of the application) quickly and easily (without having to do a window-manager dependent drag operation.)

```
C    NHHandle ap;
     NHObject shell;
     ...
     NhXtMoveWidget(ap, shell, 10, 10);
```

```
Perl   &NhXtMoveWidget($ap, $shell, 10, 10);
```

≡6

NhXtResizeWidget

| void | NhXtResizeWidget |
|---|---|
| Handle | Application handle |
| Object | Object to resize |
| int | new width |
| int | new height |
| int | new border width |

This routine causes XtResizeWidget to be called within the client Xt application specified (this will not work for XView applications.) It can be useful for resizing application shell widgets (and thus the top level window of the application) quickly and easily (without having to do a window-manager dependent drag operation.)

| C | NHHandle ap;<br>NHObject shell;<br>....<br>NhXtResizeWidget(ap, shell, 400, 200, 1); |
|---|---|
| Perl | &NhXtResizeWidget($ap, $shell, 400, 200, 1); |

NhXtUnmapWidget

| void | NhXtUnmapWidget |
|---|---|
| Handle | Application handle |
| Object | Object to map |

This routine causes XtUnmapWidget to be called within the client Xt application specified (this will not work for XView applications.) It can be useful for forcing the unmapping of widgets.

| C | NHHandle ap;<br>NHObject shell;<br>...<br>NhXtUnmapWidget(ap, shell); |
|---|---|
| Perl | &NhXtUnmapWidget($ap, $shell); |

≡ 6

NhXvGet

| Varies | NhXvGet |
|---|---|
| Handle | Application handle |
| Object | Object from which to query attribute |
| Attribute | XView attribute name (this is a constant from xvtypes.ph or from the <xview/panel.h> or other include files) |
| ... | other arguments (up to 3 more) can vary depending upon the attribute given (see the XView manual for information on attributes and how to use them in an xv_get() call) |

This routine allows a driver script to perform an xv_get call within a connected XView application. It can be used with XView applications in place of an NhGetResources call. In some cases an NhXvGet call can do things an NhGetResources call cannot (such as when there are a variable number of additional arguments that must be given after an attribute name.) NhGetResources does not allow any arguments except for the attribute name. A total of six arguments are allowed to be used with this call, any more will be ignored. The return value is whatever xv_get() would have returned in the same situation.

```
#include <xview/panel.h>
NHHandle ap;
NHObject scrolling_list;
char *row_name;
...
row_name = NhXvGet(ap, scrolling_list, PANEL_LIST_STRING, 4);
```

```
require "xvtypes.ph";
...
$row_name = &NhXvGet($ap, $scrolling_list, &PANEL_LIST_STRING, 4);
```

Advanced Topics/Trouble-shooting 7

This chapter details some of the steps that have to be taken to guarantee the right results under certain circumstances. This is necessary because of the non-uniformity between the different GUI toolkits supported. Using No Hands in conjunction with a test execution harness like TET (Test Environment Toolkit) or in differing operating system environments can also complicate matters.

System Calls and Environment

This section details some of the peculiarities of interactions between certain systems calls, the UNIX environment, and No Hands.

Why an Application Might Not Connect

There are a number of reasons why a client application might fail to connect back to the driver that launched it. Most of these reasons are related to the operating system environment you are in:

1. Client initialization took too long.

If the client application takes more time to start up (the time between its launch and when the first window appears) than the default timeout value, then a timeout will occur before the connection can be established and the driver script will exit. See "NhSetTimeout" on page 120.

2. Client launched was a wrapper and not a binary.

If a script is using the NhMatchConnection call (see "NhMatchConnection" on page 100) to connect with a connection previously launched with NhLaunchNoConnect (see "NhLaunchNoConnect" on page 95) then a non-binary application (like a shell script) can confuse the script about the real application it should be connecting to, which may have a different name than the shell-script wrapper. The nhquery utility sometimes encounters this difficulty.

3. Client's binary was not linked using shared libraries.

In order for No Hands to establish the correct linkage within a client application, that application must be linked with shared libraries, not static libraries. It must be share-linked with libX11.so, libXt.so, libXol.so, libXm.so, or libxview.so. You can use the 'ldd' command to check which shared libraries an application has been linked with.

4. Client's binary is linked to more than one toolkit library.

If a client's binary was linked to more than one of the toolkit libraries (libxview.so, libXol.so, or libXm.so) than No Hands will not know which of its special toolkit-specific libraries to load. Link application binaries with only one GUI toolkit when building them.

5. Client's binary is setuid.

Try an 'ls -l' on the client binary. If the permissions on the file are '-r-xr-sr-x' then the binary is setuid. Because of security measures taken within the operating system, No Hands cannot connect with such a program. Use the 'chmod' command to make the file non-setuid, or use 'cp' to move it to another location (it will usually become non-setuid during the copy procedure.)

6. Client's binary is not readable.

No Hands cannot connect with an application run from a binary to which you do not have read access. Try an 'ls -l' on the client binary, if the permissions on the file are '—x--x--x' then the binary is executable but not readable and No Hands cannot connect to it. Use the 'chmod' command to make the binary readable.

7

Sleep

Using the sleep() system call does not always do what you expect within a No Hands script. If a new client has recently been launched and a SIGPOLL signal comes in indicating the request for connection between driver and client while the script is within the sleep call, it will terminate prematurely. This is the normal behavior of sleep() under these circumstances. Here's an excerpt from the man page for sleep:

"The current process is suspended from execution for the number of seconds specified by the argument. The actual suspension time may be less than that requested because any caught signal will terminate the sleep() following execution of that signal's catching routine..."

We cannot change the behavior of the No Hands driver, as it is absolutely necessary to catch the incoming connections from every new client, so we decided that this behavior would just have to be documented.

Since, you will be unable to use a sleep() call effectively in a No Hands script when a new client has just been launched, you should use NhMatchConnection and NhWaitExit instead of sleep() if you need to wait until a subprocess (such as the pagecounter process launched by imagetool) has been launched and subsequently completed its work and exited.

Environment Variables

There are a number of environment variables that the No Hands driver passes on to its clients when they are launched. These variables should always be set *before* clients are launched, either by setting them on the command line before running the driver, or by setting them within the script before launching any clients. Setting environment variables within the driver *after* launching clients

≡ 7 will have no effect. If you need client environment variables changed within the client after launch, use the NhPutEnv function. Here's a run down of the available environment variables:

*Table 7-1*   No Hands Environment Variables

| Environment Variable | What It Does |
|---|---|
| NHHOME | Contains the name of the directory that is root of the No Hands installed tree, see "Setting up Your Environment" on page 12 |
| LD_LIBRARY_PATH | Contains the directories where libraries can be found (this does not need to contain ${NHHOME}/lib if No Hands is installed at /opt/SUNWnhnds), see "Setting up Your Environment" on page 12 |
| MOTIFHOME | Contains the name of the directory that is the root of the Motif installation tree (this only needs to be set when building No Hands itself and not when developing or running tests or benchmarks based on No Hands) |
| NH_DELAY | See "NhSetDelay" on page 111 |
| NH_TIMEOUT | See "NhSetTimeout" on page 120 |
| NH_COLORBLIND | See "NhSetColorMode" on page 110 |
| NH_MASTERS | See "Image Routines" on page 39 |
| NH_RESULTS | See "Image Routines" on page 39 |

XView

This section details some of the peculiarities of interaction between No Hands and XView.

Busy Windows

Because of a peculiarity in XView, No Hands is unable to get coordinate or other information out a window belonging to an XView application that is busy. The busy state is typically indicated visually by a grey stippling of the window's titlebar.

You should not attempt to make any queries on busy windows when using the nhquery utility (the queries will fail), nor should any test script try to generate events for a busy window (the test script will hang.) This is not a serious limitation, however, because even if No Hands were able to generate such events, the correct behavior for XView is to ignore them.

Object Attributes

There is a lot of useful information contained within XView objects. Here is a useful table of the names of certain attributes and the kinds of XView objects for which they are useful. See "Test Result Verification" on page 21 for an example of using NhGetResources in the C interface, or see "Verifying Test Results" on page 30 for an example of using NhGetResources in the Perl interface.

Table 7-2  Useful XView Object Attributes

| XView Object(s) | Attribute | Type | Comments |
|---|---|---|---|
| Exclusive Choice and Abbreviated Choice | PANEL_VALUE | Int | This attribute is the item in the exclusive which is currently selected and is 0 if the first item is selected, 1 if the second is selected, etc. |
| Non-exclusive Choice and Checkbox Choice | PANEL_VALUE | Int | For non-exclusive choices, more than one of the choices can be selected at the same time, so the value in this attribute is a bit mask of the selected choices. A value of 5, for example (binary representation is 0101), would indicate the first and third choices are selected. |
| Text Item | PANEL_VALUE | String | This is the text displayed above the long underline in a single-line textfield. |
| Numeric Item | PANEL_VALUE | Int | The value displayed above the underline in a numeric field. |

*Table 7-2* Useful XView Object Attributes

| XView Object(s) | Attribute | Type | Comments |
|---|---|---|---|
| Text Item and Numeric Item | PANEL_LABEL_STRING | String | The label displayed on the left of the underline. |
| Scrolling List | PANEL_LIST_STRING | String | Getting the text of one of the lines in a scrolling list requires the use of the NhXvGet call described on page 130. You have to specify which list item you are interested in, and that requires an extra argument (NhGetResources does not allow you to give extra arguments.) |
| Text Subwindow | TEXTSW_INSERTION_POINT | Int | This is where the insertion point is in the text subwindow. Its value is zero when the cursor is positioned before the first character in the window. |
| Text Subwindow | TEXTSW_CONTENTS | See below | Getting this attribute requires that a special buffer be set aside. See the examples below. |

Some objects, such as Text Subwindows, have attributes that cannot be retrieved with NhGetResources because they have unusual retrieval interfaces with the xv_get() routine in XView. Follow the example below to get the textual contents of a Text Subwindow object.

Table 7-3  Getting Text Subwindow Contents - C Interface (this example is from the test program $[NHHOME]/test/external/C/xview/nhtextsw.c)

```c
#include <xview/xview.h>
#include <xview/panel.h>
#include <xview/textsw.h>
include <nhd.h> main(int argc, char **argv)
{
  NHHandle ap;
  char *local_buffer, *remote_buffer;

ap = NhLaunchAndConnect("textedit nhtextsw.txt");
  NhWaitMap(ap, "Frame_base:1");

remote_buffer = NhMalloc(ap, 2000);
  NhXvGet(ap, "Frame_base:1:Textsw:1", TEXTSW_CONTENTS, 0,
      remote_buffer, 2000);
  local_buffer = NhRetrieveData(ap, "String", remote_buffer);
  printf("Buffer Contents:\n%s\n", local_buffer);

free(local_buffer);
  NhFree(ap, remote_buffer);
}
```

7

Table 7-4  Getting Text Subwindow Contents - Perl Interface (this example is from the test program $(NHHOME)/test/external/perl/xview/nhtextsw.perl)

```
eval 'exec $NHHOME/bin/nhd -S $0 ${1+"$@"}'
if 0;

require "nhd.ph";
require "xvtypes.ph";

$ap = &NhLaunchAndConnect("textedit nhtextsw.txt");

&NhWaitMap($ap, "Frame_base:1");

$remote_buffer = &NhMalloc($ap, 2000);
&NhXvGet($ap, "Frame_base:1:Textsw:1", &TEXTSW_CONTENTS, 0,
    $remote_buffer, 2000);
$local_buffer = &NhRetrieveData($ap, "String", $remote_buffer);
print "Buffer Contents:\n$local_buffer\n";

&NhFree($ap, $remote_buffer);
```

OLIT

This section details some of the peculiarities of using No Hands on OLIT applications.

Textedit Widget Selection

Dragging the cursor within an OLIT Textedit widget will not work via the intuitive NHPress and NHRelease events you might try with the NhButtonEvent call. This is because of the widget callback synchronization feature of No Hands (No Hands scripts may not advance until widget callbacks are complete.) When you start a drag operation the OLIT toolkit starts a busy-wait polling loop within the Textedit widget's code. This callback never returns, which causes your No Hands script to hang.

In order to effect the dragging selection of text within an OLIT Textedit widget, you must drive the event from a different client application. For an example of how to do this, look in the sample test
${NHHOME}/test/external/C/olit/nhtextedit.c. You may use the xconnect program (see "NhGetSelection" on page 81) as a simple second client if you wish.

7

Widget Resources

There is a lot of useful information contained within OLIT widgets. Here is a useful table of the names of certain resources and the kinds of OLIT widgets for which they are useful. If you try to retrieve a resource from a widget for which that resource does not exist, you'll get NULL (in the C interface) or an empty string (in the Perl interface.) See "Test Result Verification" on page 21 for an example of using NhGetResources in the C interface, or see "Verifying Test Results" on page 30 for an example of using NhGetResources in the Perl interface to retrieve the values of widget resources.

*Table 7-5* Useful OLIT Widget Resources

| OLIT Widgets(s) | Resource | Type | Comments |
|---|---|---|---|
| Textfield | XtNstring | String | This is the text displayed above the long underline in a single-line textfield widget. |
| Textedit | <no name> | String | Getting the textual contents of a single or multi-line textedit widget requires the use of the NhFunction call because there is no resource that returns these contents. See the example below. |

≡ 7

Some objects, such as Textedit widgets, use toolkit utility functions for retrieving certain information from widgets. There are no equivalent resources, so you must use the NhFunction call in your script to call the toolkit utility function. Follow the example below to get the textual contents of a Textedit widget.

*Table 7-6* Getting Textedit Widget Contents - C Interface (this example is from the test program $(NHHOME)/test/external/C/olit/nhgetcontents.c)

```
/* Example call:    str = textexit_contents(ap, text); */ char *textexit_contents(int conn, char *widg_name)
{
  int start, end;
  char *contents;
  char *buf;
  void *widg, *ptr1, *ptr2;

/* Convert the widget to a pointer */
  widg = NhObjectToPointer(conn, widg_name);

/* Find out how many characters are in the textedit */
  start = 0;
  ptr1 = NhMalloc(conn, 4);
  NhFunction(conn, "OlTextEditGetLastPosition", "libXol.so", 2,
          widg, ptr1);
  ptr2 = NhRetrieveData(conn, NhData(4), ptr1);
  NhFree(conn, ptr1);
  end = *(int *)ptr2;

/* Get the text in the textedit */
  ptr1 = NhMalloc(conn, 4);
  NhFunction(conn, "OlTextEditReadSubString", "libXol.so", 4,
          widg, ptr1, start, end);
  ptr2 = NhRetrieveData(conn, NhData(4), ptr1);
  NhFree(conn, ptr1);
  buf = *(char **)ptr2;

contents = NhRetrieveData(conn, "String", buf);
  return(contents);
}
```

*Table 7-7* Getting Textedit Widget Contents - Perl Interface (this example is from the test program $(NHHOME)/test/external/perl/olit/nhgetcontents.perl)

```perl
# Example call:   $str = &textedit_contents($ap, $textedit);

sub textedit_contents {
  local($conn, $widg_name) = @_;
  local($widg, $start, $end, $ptr, $buf, $contents);

# Convert the widget to a pointer
  $widg = &NhObjectToPointer($conn, $widg_name);

# Find out how many characters are in the textedit
  $start = 0;
  $ptr = &NhMalloc($conn, 4);
  $bool = &NhFunction($conn, "OlTextEditGetLastPosition",
"libXol.so", $widg, $ptr);
  $end = &NhRetrieveData($conn, &NhData(4), $ptr);
  $end = unpack("I", $end);
  &NhFree($conn, $ptr);

# Get the text in the textedit
  $ptr = &NhMalloc($conn, 4);
  &NhFunction($conn, "OlTextEditReadSubString", "libXol.so",
          $widg, $ptr, $start, $end);
  $buf = &NhRetrieveData($conn, &NhData(4), $ptr);
  $buf = unpack("I", $buf);
  &NhFree($conn, $ptr);

$contents = &NhRetrieveData($conn, "String", $buf);
  $contents;
}
```

Motif

This section details some of the peculiarities of Motif.

Widget Resources

There is a lot of useful information contained within Motif widgets. Here is a useful table of the names of a few resources and the kinds of Motif widgets for which they are useful. See "Test Result Verification" on page 21 for an example

7 of using NhGetResources in the C interface, or see "Verifying Test Results" on page 30 for an example of using NhGetResources in the Perl interface to retrieve the values of widget resources.

*Table 7-8  Useful Motif Widget Resources*

| Motif Widgets(s) | Resource | Type | Comments |
|---|---|---|---|
| Button | XmNlabelString | XmString | The textual label in a button. |

TET

This section details some of the peculiarities of the interaction between No Hands and the test execution harness called TET (Test Environment Toolkit) and shows you how to successfully steer around them.

Interference With SIGPOLL

A crucial step to take when installing No Hands tests into the TET harness is to insure that TET does not interfere with the setting of the signal handler for signal 22 (SIGPOLL, or sometimes called SIGIO.) Left to its own devices, TET *will* interfere with this signal, and when TET is interfering with this signal you will find that processes launched by clients of the No Hands driver (2nd generation clients) will not be able to connect back to the driver.

To rectify this problem, make sure that signal 22 is listed among those that TET will leave alone during the execution of your tests. You can do this by seeing that the following line is in your TET execution configuration file (often called tetexec.cfg and pointed to by the $TET_CONFIG environment variable):

TET_SIG_LEAVE=22

Make sure that signal 22 is not also listed in another line having to do with signals in the configuration file. Once you've done this, the SIGPOLL signals the driver is expecting from newly launched clients will be handled properly within your TET/No Hands test programs.

Samples - C 

This appendix contains code examples written for the C External Interface. The samples listed in this appendix are in the ${NHHOME}/doc/samples directory in case you'd like to copy from them or run them yourself. If you need more examples than you see here, look within the No Hands self-test suite for more. C External Interface self-tests are under the ${NHHOME}/test/external/C directory.

XView Sliders

The nhslider.c test program launches the slider client program and performs various actions on the sliders within it. This program shows examples of the use of the following No Hands routines:

- NhLaunchAndConnect
- NhSetDelay
- NhFindComponentXY
- NhFindComponentBox
- NhFindNthXY
- NhLookupComponent
- NhGetResources
- NhSetResources
- NhFindCursor
- NhButtonEvent
- NhMotionEvent
- NhKeyEvent
- NhStringEvent

≡A
___ nhslider.h

```
/* Do not edit this file - it was generated by nhquery */
#define Nhslider_Icon_unnamed              "Server:2:Screen:1:Window:1:Icon:1"
#define Nhslider_Fram_unnamed              "Frame_base:1"
#define Nhslider_Pane_unnamed              "Frame_base:1:Panel:1"
#define Nhslider_Text_unnamed_001          "Frame_base:1:Panel:1:Text Item:1"
#define Nhslider_Slid_Brightness_001       "Frame_base:1:Panel:1:Slider Item:1"
#define Nhslider_Text_unnamed_002          "Frame_base:1:Panel:1:Text Item:2"
#define Nhslider_Slid_Brightness_002       "Frame_base:1:Panel:1:Slider Item:2"
``` nhslider.c

```
#include <X11/keysym.h>
#include <xview/xview.h>
#include <xview/panel.h>
#include <nhd.h>
#include "nhslider.h"

/*
 * The ways resources are collected in this example are valid only for
 * XView-based applications.
 */ static void print_slider_value(NHHandle ap, NHObject slider)
{
    int number;

NhGetResources(ap, slider,
            NhStr(PANEL_VALUE), "Int", &number,
            NULL);
    printf("slider value = %d\n", number);
} main(int argc, char **argv)
{
    NHHandle ap;
    NHObject textfield, hslider, vslider;
    int cursor_x, cursor_y;
    int x, y, width, height, x2, y2;
    char *resource;

printf("Action: launch slider application\n");
    ap = NhLaunchAndConnect("slider");

/* set up convenience variables to point to objects listed in header file */
    hslider = Nhslider_Slid_Brightness_001;
    vslider = Nhslider_Slid_Brightness_002;
    printf("actual hslider name: %s\n", hslider);
    printf("actual vslider name: %s\n", vslider);

printf("Action: reduce speed of test so it may be observed\n");
    NhSetDelay(ap, 10);

printf("Action: use NhFindCursor to get cursor location before starting\n");
    NhFindCursor(ap, NHRoot, &cursor_x, &cursor_y);
    printf("cursor starting location x=%d y=%d\n", cursor_x, cursor_y);

printf("Action: get textfield that belongs to vertical slider\n");
    textfield = NhLookupComponent(ap, vslider, NHTextField);

if (textfield) {
        printf("Action: get current value of vertical slider's textfield\n");
        NhGetResources(ap, textfield,
                NhStr(PANEL_VALUE), "String", &resource,
```

```
        NULL);
    printf("slider textfield resource = %s\n", resource);
    free(resource);

printf("Action: put cursor at end of text in textfield\n");
    NhFindComponentBox(ap, textfield, NHTextBox, &x, &y, &width, &height);
    NhButtonEvent(ap, textfield, Button1, NHClick, (x + width - 1), (y + 1));

printf("Action: backspace over old value and type a new one\n");
    NhKeyEvent(ap, textfield, XK_BackSpace, NHClickN(2), NHCurrent, NHCurrent);
    NhStringEvent(ap, textfield, "20\n", NHClick, NHCurrent, NHCurrent);
    print_slider_value(ap, vslider);

printf("Action: clear textfield by using resource setting\n");
    NhSetResources(ap, textfield,
            NhStr(PANEL_VALUE), "String", "",
        NULL);

printf("Action: put cursor at end of text in textfield\n");
    NhFindComponentBox(ap, textfield, NHTextBox, &x, &y, &width, &height);
    NhButtonEvent(ap, textfield, Button1, NHClick, (x + width - 1), (y + 1));

printf("Action: type a new slider value\n");
    NhStringEvent(ap, textfield, "50\n", NHClick, NHCurrent, NHCurrent);
    print_slider_value(ap, vslider);
} printf("Action: NhFindComponentXY - find vertical slider NHCableDown\n");
NhFindComponentXY(ap, vslider, NHCableDown, &x, &y);
NhButtonEvent(ap, vslider, Button1, NHClick, x, y);
print_slider_value(ap, vslider);

printf("Action: NhFindComponentXY - find horizontal slider NHAnchorLeft\n");
NhFindComponentXY(ap, hslider, NHAnchorLeft, &x, &y);
NhButtonEvent(ap, hslider, Button1, NHClick, x, y);
print_slider_value(ap, hslider);

printf("Action: move horizontal slider to value 30\n");
NhFindComponentXY(ap, hslider, NHDragBox, &x, &y);
NhFindNthXY(ap, hslider, 30, &x2, &y2);
NhButtonEvent(ap, hslider, Button1, NHPress, x, y);
NhButtonEvent(ap, hslider, Button1, NHRelease, x2, y2);
print_slider_value(ap, hslider);

printf("Action: place cursor back in location it was before test began\n");
NhMotionEvent(ap, NHRoot, cursor_x, cursor_y);
}
```

Samples - Perl     B

This appendix contains code examples written for the Perl External Interface. The samples listed in this appendix are in the ${NHHOME}/doc/samples directory in case you'd like to copy from them or run them yourself. If you need more examples than you see here, look within the No Hands self-test suite for more. Perl External Interface self-tests are under the ${NHHOME}/test/external/perl directory.

XView Textfields

The nhtextfield.perl script launches the textfield client and does operations on one of the textfields within it. This test script has examples of:

- NhLaunchAndConnect
- NhMakeImageName
- NhImage
- NhGetResources
- NhButtonEvent
- NhStringEvent
- NhFindComponentBox nhtextfield.ph

```
# Do not edit this file - it was generated by nhquery
%nhtextfield = (
    'Icon_unnamed',         'Server:2:Screen:1:Window:1:Icon:1',
    'Fram_textfield',       'Frame_base:1',
    'Pane_textfield',       'Frame_base:1:Panel:1',
    'Text_Textfield  1:',   'Frame_base:1:Panel:1:Text Item:1',
```

```
            'Text_Textfield 2:',        'Frame_base:1:Panel:1:Text Item:2',
            'Text_Textfield 3:',        'Frame_base:1:Panel:1:Text Item:3',
            'Text_Textfield 4:',        'Frame_base:1:Panel:1:Text Item:4',
            'Text_Textfield 5:',        'Frame_base:1:Panel:1:Text Item:5',
            'Text_Textfield 6:',        'Frame_base:1:Panel:1:Text Item:6',
        );

1;
``` nhtextfield.perl

```
#!/bin/sh

#       Copyright (C) 1993  Sun Microsystems, Inc
#               All rights reserved.
#           Notice of copyright on this source code
#           product does not indicate publication.

# RESTRICTED RIGHTS LEGEND: Use, duplication, or disclosure by
# the U.S. Government is subject to restrictions as set forth
# in subparagraph (c)(1)(ii) of the Rights in Technical Data
# and Computer Software Clause at DFARS 252.227-7013 (Oct. 1988)
# and FAR 52.227-19 (c) (June 1987).

#    Sun Microsystems, Inc., 2550 Garcia Avenue,
#    Mountain View, California 94043.

# @(#) nhtextfield.perl 1.2 - last change made 01 Nov 1993

# -Required by No Hands-
# Executes the rest of this script using the No Hands driver
eval 'exec $NHHOME/bin/nhd -S $0 ${1+"$@"}'
if 0;

require "nhd.ph";
require "xvtypes.ph";
require "X11/keysym.ph";
require "nhtextfield.ph";

# launch
$ap = &NhLaunchAndConnect("textfield");

# put names from header into more conveniently accessable variable names
$tf1 = $nhtextfield{'Text_Textfield 1:'};

# take an image from textfield and compare it to one on file
$filename = &NhMakeImageName($ap, $tf1, "nhtextfield", 1, "");
if (&NhImage($ap, $tf1, $filename, &NHEnv)) {
    print "PASSED image comparison with $filename\n";
}
else {
    print "FAILED image comparison with $filename\n";
} verification can also be done by looking at current contents of a resource
&NhGetResources($ap, $tf1, &PANEL_VALUE, "String", $resource);
if ($resource eq "1234567890") {
    print "PASSED - Textfield 1 contains: $resource\n";
}
else {
    print "FAILED - Textfield 1 contains: $resource\n";
}
```

```
# empty out the textfield by setting resource to empty string
&NhSetResources(Sap, Stf1, &PANEL_VALUE, "String", "");

# type "Bart" in the now empty text field
&NhButtonEvent(Sap, Stf1, &Button1, &NHClick, &NHCenter, &NHCenter);
&NhStringEvent(Sap, Stf1, "Bart", &NHClick, &NHCurrent, &NHCurrent);
&NhGetResources(Sap, Stf1, &PANEL_VALUE, "String", $resource);
print "Textfield 1 contains: $resource\n";

# put "Hello " in front of string there - producing "Hello Bart"
&NhFindComponentBox(Sap, Stf1, &NHTextBox, $x, $y, $width, $height);
&NhButtonEvent(Sap, Stf1, &Button1, &NHClick, $x + 1, $y + 1);
&NhStringEvent(Sap, Stf1, "Hello ", &NHClick, &NHCurrent, &NHCurrent);
&NhGetResources(Sap, Stf1, &PANEL_VALUE, "String", $resource);
print "Textfield 1 contains: $resource\n";

# place "man" on end of text string - producing "Hello Bartman"
&NhFindComponentBox(Sap, Stf1, &NHTextBox, $x, $y, $width, $height);
&NhButtonEvent(Sap, Stf1, &Button1, &NHClick, $x + $width - 1, $y + 1);
&NhStringEvent(Sap, Stf1, "man", &NHClick, &NHCurrent, &NHCurrent);
&NhGetResources(Sap, Stf1, &PANEL_VALUE, "String", $resource);
print "Textfield 1 contains: $resource\n";

# erase everything with backspaces
&NhFindComponentBox(Sap, Stf1, &NHTextBox, $x, $y, $width, $height);
&NhButtonEvent(Sap, Stf1, &Button1, &NHClick, $x + $width - 1, $y + 1);
&NhKeyEvent(Sap, Stf1, &XK_BackSpace, &NHClickN(13), &NHCurrent, &NHCurrent);
&NhGetResources(Sap, Stf1, &PANEL_VALUE, "String", $resource);
print "Textfield 1 contains: $resource\n";
```

Index

Numerics
0, see counting of n
1, see counting of n

A
absolute coordinates, 7, 8, 17, 26
acknowledgment by client, 10
acknowledgment, client to driver, 114
Action, 48
anchors on scrollbars and sliders, 38
application handle
    as first argument, 47
application handles, 20
Application not connecting, 143
application start up time, 143
application toolkits supported, 2
Arg Type, 48
associative arrays, 30
automated testing benefits, 1

B
batching of request sequences, 52
binaries must be readable, 144
bit depth, 72
bit-depth independent format of
    images, 72
black and white images and filenames, 39
black and white, bit depth, 72
bounding box
    NhFindComponentBox, 62
bounding box of a subpart within an
    object, 39
buffer size allocation, 58
Busy Windows in XView, 146
Button, 48
button press, 43
button press and release, 44
button release, 43

C
C Interface External
    converting strings to ints, 119
    routines available, 33
    routines shared with other
        interfaces, 34, 35, 36
    samples, 155
    string and int differences with
        Perl, 119
C Interface Internal
    no application handles, 47
    routines not available, 33 routines shared with other interfaces, 34, 35, 36
C locale in image naming, 79
cables on sliders and scrollbars, 37
center of a subpart, 63
center of an object, use NHCenter, 43
CheckBoxes
    NhCheckBox, 38
    special routine list, 42
chmod, 26
    to correct connect problems, 144
Choices
    NhFindNthBox, 65
    NhFindNthXY, 66
    special routine list, 42
    two dimensional, 66
    XView checkboxes, 38
client
    links with No Hands library, 5
clock.h, 19, 22
clock.ph, 29, 31
clocktest.c, 22
clocktest.perl, 31
color blind image comparisons, 50
color differences in image comparisons, 110
color display
    image file naming, 98
color images and filenames, 39
colorblind image comparison, 110
ColorMode, 50, 110
compressing image files, 90
compression, 91
Connection difficulties, 143
Control key
    NhKeyEvent, 93
Coord, 49
coordinates, relative to upperleft of object, 39
counting of n, 97
current cursor location, use NHCurrent, 43

D data buffer size specification, 58
data retrieval, 58
default error level, 44, 113
default pixel tolerance, 117
depths and image files, 39
Directive, 49
disk space, 116
DISPLAY environment variable, 43
double clicking, 44
drag and drop example
    NhRootCenter, 109
drag box, cable area around, 38
dragging scrollbars and sliders, 38
driver, 24
    2 ways of building, 4
    library common to C and Perl, 9
    makes client link with No Hands library, 5
    multiple clients, 10
dump all objects, 27
dynamically shared library, 5

E efficiency, 123
elevator, 38
email alias for No Hands, 3
empty string
    use in Perl, 124
end boxes on scrollbars and sliders, 38
Environment Setup, 12
environment variable
    setting them after calling NhLaunchAndConnect, 40
environment variables, 73, 106
    don't set them only within driver, 40
    image related, 39
    in No Hands environment, 145
    NH_COLORBLIND, 110
    NH_COLORMODE, 50
    NH_MASTERS, 40

NH_RESULTS, 40
NH_SAVE_IMAGES, 39, 90, 91
set before launching clients, 145
setting them before calling
 NhLaunchAndConnect, 40
setting them on the command line, 40
setting them within the client, 40
ErrorLevel, 49
eval, 26
Event Handling, 114
Event Simulation, 9
event simulation request, 114
executable but not readable binaries, 144

F fatal errors, 44
filename suffixes, 116
Float type resources, special handling, 119
Frame_base, 20, 30
French locale, 98

G

GUI, 1

H

Handle, 48
hanging client, 114
hierarchical description strings, 20

I image comparison, 30
image comparison directories, 40
image comparison discrepancy limits, 117
image comparisons
 resistance to future color changes, 40
 setting pixel tolerance, 117
image file bit-depth independence, 72
image file suffixes, 116
image routines, 39
images
 saving disk space, 116
 viewing with sxpm, 31
imagetool
 pagecounter subprocess, 145
install_xtrap, 13
Installation, 11
install_xtrap, 13
Int
 used in NhGetResources, 83
 used in NhSetResources, 118

J

Japanese locale, 98

K key press, 43
key press and release, 44
key release, 43
keysym, 29
keysym definitions, 19
keysym.h, 19, 93
keysym.ph, 29, 93
keysyms
 use lower-case ones rather than upper-case, 93

L language independent format, 47
LD_LIBRARY_PATH, 12
 description, 146
ldd, 144
LD_LIBRARY_PATH, 12
libnhd, 23
libX11.so, 144
libxd, 6
libXm.so, 144
libxmd, 6
libXol.so, 144
libxold, 6
libXt.so, 144 libxtd, 6
libxvd, 6
libxview.so, 144
list of scrolled items, 38
locales and image files, 39
localizations, 8
lower-case keysyms, 93
lowest level event calls, 35

M master image files, 30
Menus
    NhFindNthBox, 65
    NhFindNthXY, 66
    NhTitle, 38
    special routine list, 42
midpoint, use NHCenter, 43
monochrome display
    image file naming, 98
Motif
    client-side library, 6
    include files, 20, 29
    interaction with No Hands, 153
    Widget Resources, 153
    XmNlabelString, 154
MOTIFHOME
    description, 146
mouse pointer, 101
multiple button or key presses, 44
Multiple Clients, 10

N n, counting of, 97
negative values for NhSetDelay, 111
NeWS, 3, 13
NH_COLORBLIND, 110
    general usefulness of, 40
NH_COLORBLIND, see also
    NhSetColorMode
NH_COLORMODE, 50
NH_DELAY
    usage affects default before
        NhSetDelay, 111
NH_DELAY, also see NhSetDelay
NH_MASTERS, 40, 106
    example of getting it, 73
    when it is ignored, 40
NH_RESULTS, 40
    example of setting it, 106
    when it is ignored, 40
NH_SAVE_IMAGES, 22, 31, 39, 45, 49, 90
NH_TIMEOUT
    usage affects default before
        NhSetTimeout, 120
NH_TIMEOUT, also see NhSetTimeout
NhAllocateData, 51
NhAnchorDown
    definition, 37
NhAnchorLeft
    definition, 38
NhAnchorRight
    definition, 38
NhAnchorUp
    definition, 37
NHArrowDown
    definition, 37
NHArrowLeft
    definition, 37
NhArrowRight
    definition, 37
NHArrowUp
    definition, 37
NhBatchBegin, 52
NhBatchEnd, 53
NHBlind
    use as a color mode, 50
    use in NhSetColorMode, 110
NhButtonEvent, 54
    example, 20
    example nhslider.c, 155
    example nhtextfield.perl, 159
    NHPress, 43
NHCableDown
    definition, 38

NHCableLeft
    definition, 38
NHCableRight
    definition, 38
NHCableUp
    definition, 38
NHCenter, 49
    definition, 43
NHCheckBox
    definition, 38
NHClick, 48
    definition, 44
    NhButtonEvent, 54
    NhKeyEvent, 93
    NhStringEvent, 125
NHClickN
    definition, 44
NhCloseAllConnections, 55
NhCloseConnection, 56
NhCommandLine, 57
NHCompare, 49
    definition, 45
    NhImage, 90
    NhImageRegion, 91
NHCurrent, 49
    definition, 43
nhd, 23, 24, 26
nhd.h, 19
nhd.ph, 29
NhData, 58
NhDisplay, 59
NHDragBox
    definition, 38
NhDumpChildren, 60
NhEnableXInput
    disabled by default, 123
NHEnv, 49
    as a directive, effect of NH_SAVE_
        IMAGES, 90
    definition, 45
    example, 21, 31
    NH_SAVE_IMAGES environment
        variable, 39

NhImage, 90
NhImageRegion, 91
    use as a color mode, 50
    use in NhSetColorMode, 110
NhError, 61
    example after
        NhFindComponentXY, 63
    example under
        NhFindComponentBox, 62
NHExit, 49
    consequences at NhError call, 61
    consequences on timeout, 130
    definition, 44
    NhSetErrorLevel, 113
    user doesn't need to check success
        values, 39
NhFindComponentBox, 62
    example nhslider.c, 155
    example nhtextfield.perl, 159
    in PartType table, 37
NhFindComponentXY, 63
    example nhslider.c, 155
    in PartType table, 37
NhFindCursor, 64
    example nhslider.c, 155
NhFindNthBox, 65
NhFindNthXY, 66
    example nhslider.c, 155
    finding center of object subpart by
        division, 65
    n count may start from 0 or 1, 66
NhFree, 67
NHFull
    use as a color mode, 50
    use in NhSetColorMode, 110
NhFunction, 68
    example, 102, 104
    using NhObjectToPointer, 102
    using NhPointerToObject, 104
    using NhSymbol, 126
NhGetColorMode, 69
NhGetCount, 70
NhGetDelay, 71
NhGetDepth, 72 used by NhMakeImageName, 39
NhGetEnv, 73
NhGetErrorHandler, 74
NhGetErrorLevel, 75
NhGetEventHandling, 76
NhGetExitHandler, 77
NHGetImageFileSuffix
  default value, 98
NhGetImageFileSuffix, 78
  used by NhMakeImageName, 39
NhGetLocale, 79
  C locale, 79
  used by NhMakeImageName, 39
NhGetPixelTolerance, 80
NhGetResources, 83
  being sure object is displayed if
    important, 83
  example, 21, 30
  example nhslider.c, 155
  example nhtextfield.perl, 159
  include file to use, 19
  include files, 29
  reasonable limit in variable argument
    list, 83
  use of NhData, 58
  XView, 147
NhGetSelection, 81
NhGetTimeout, 85
  default is 30 seconds, 85
NhGetTimeoutHandler, 86
NhGetViewInfo, 87
NhGetWarningHandler, 88
NhGetXInput, 89
NHHandle, 94
  example, 20, 25
NhHandlerType, 88, 115, 122
NHHOME
  description, 146
NHHScrollbar, 36
  NhLookupComponent, 96
NHIgnore, 49
  consequences at NhError call, 61
  definition, 44

NhSetErrorLevel, 113
NhImage, 90
  color mode, 50
  example, 21, 30
  example nhtextfield.perl, 159
  image compression, 90
  master and result directory
    assignment, 40
  NHCompare definition, 45
  NHEnv definition, 45
  NHSave definition, 45
  setting color mode, 110
  setting pixel tolerance, 117
  use .Z suffix to compress, 90
NhImageRegion, 91
  color mode, 50
  example under
    NhFindComponentBox, 62
  image compression, 91
  master and result directory
    assignment, 40
  setting color mode, 110
  setting pixel tolerance, 117
NhImageRegion, see also NHImage
NhKeyEvent, 93
  example nhslider.c, 155
  include file to use, 19
  include files, 29
  NHPress, 43
  use lower-case keysyms, 93
NHLaunchAndConnect
  example, 25
NhLaunchAndConnect, 94
  diagram of sequence, 6
  example, 25, 29
  example nhslider.c, 155
  example nhtextfield.perl, 159
  usage in C interface, 20
NhLaunchNoConnect, 95
  problems with shell-script
    wrappers, 144
NHList
  definition, 38
NhLookupComponent, 96 example nhslider.c, 155
object type table, 36
NhLookupNth, 97
NhMakeImageName, 98
   default of .xpm.Z, 116
   example, 21, 31
   example nhtextfield.perl, 159
   image compression, 91
   NhGetDepth, 72
   use it to make image filenames, 39
   use of NhGetImageFileSuffix, 78
   use of NhSetImageFileSuffix, 116
   use of NhStr, 124
NhMalloc, 99
NhMatchConnection, 100
   problems with shell-script
      wrappers, 144
   use instead of sleep, 145
NHMenu, 36
   NhLookupComponent, 96
NhMotionEvent, 101
   example nhslider.c, 155
NHNone
   definition, 37
NHObject
   example, 25
   use of Object type in function
      descriptions, 48
NhObjectToPointer, 102
   example, 104
NhPid, 103
NhPointerToObject, 104
NHPress, 48
   definition, 43
   NhButtonEvent, 54
   NhKeyEvent, 93
   NhStringEvent, 125
NhPrintConnections, 105
   NhCommandLine, 57
   NhPid, 103
NhPutEnv, 106
   must be used if client already
      launched, 40 nhquery
   introduction, 7, 17, 26
   problems with shell script
      wrappers, 144
NHRelease, 48
   definition, 43
   NhButtonEvent, 54
   NhKeyEvent, 93
   NhStringEvent, 125
NhRetrieveData, 107
   use of NhData, 58
NHRoot, 48
   definition, 43
   NhRootBox, 108
   NhRootCenter, 109
NhRootBox, 108
   NHRoot, 43
   upperleft corners of objects, 64, 108
NhRootCenter, 109
   NHRoot, 43
NHSave, 49
   definition, 45
   NhImage, 90
   NhImageRegion, 91
NH_SAVE_IMAGES, 22, 31, 39, 45, 49, 90
NhSetColorMode, 110
   use of NH_COLORBLIND env
      variable, 110
NhSetDelay, 111
   example, 20, 29
   example nhslider.c, 155
NhSetErrorHandler, 112
NhSetErrorLevel, 113
NhSetEventHandling, 114
   when it's not enough, 52
NhSetExitHandler, 115
NhSetImageFileSuffix, 116
NhSetPixelTolerance, 117
NhSetResources, 118
   example nhslider.c, 155
   include file to use, 19
   include files, 29 not necessarily the same effect as a
        user input action, 119
NhSetTimeout, 120
    results of a too short timeout
        value, 143
NhSetTimeoutHandler, 121
NhSetWarningHandler, 122
NhSetXInput, 123
    when it's not enough, 52
nhslider.c example program, 155
NhStr, 124
    example, 21
    example use with
        NhMakeImageName, 98
NhStringEvent, 125
    example nhslider.c, 155
    example nhtextfield.perl, 159
    NHPress, 43
NhSymbol, 126
NhSync, 127
NHTextBox
    definition, 38
NHTextField, 36
    NhLookupComponent, 96
nhtextfield.perl, 160
nhtextfield.ph, 159
NHTitle
    definition, 38
NhVersionNumber, 128
NhVersionString, 129
NHVScrollbar, 36
    NhLookupComponent, 96
NhWaitExit, 130
    use instead of sleep, 145
NhWaitMap, 131
    called implicitly before event
        generation routines, 119
    not called before NhGetResources, 83
    not called before
        NhSetResources, 119
NhWaitUnmap, 132
NHWarn, 49
    consequences at NhError call, 61 definition, 44
    NhSetErrorLevel, 113
NhWindow, 133
NhXmGetFocusWidget, 134
NhXmProcessTraversal, 135
NhXtIsManaged, 136
NhXtMapWidget, 138
NhXtMoveWidget, 139
NhXtNameToWidget, 137
NhXtResizeWidget, 140
NhXtUnmapWidget, 141
NhXvGet, 142
no-hands-support, 3
non-matching pixels, 117
Notices
    NhEnableXInput overcomes
        problems, 123
    NhSetXInput, 123
nth subpart, 66
nth subpart, concept, 39
NULL
    representation in Perl, 124
    returned when object lookups fail, 36
NULL strings and Perl, 77
NULL terminated list
    NhGetResources, 83
    NhSetResources, 118
NumericFields
    NhArrowDown, 37
    NhArrowLeft, 37
    NhArrowRight, 37
    NhArrowUp, 37
    NhTextBox, 38

O

Object, 48
object hierarchy
    introduction, 7, 17, 26
Object Level Referencing, 7
objects, 26
ObjectType, 36

OLIT
　client-side library, 6
　getting Textedit widget contents, 151
　include files, 19, 29
　interactions with No Hands, 150
　NhSetEventHandling cures problems
　　with sliders and
　　scrollbars, 114
　Textedit Widget Selection, 150
　Widget Resources, 151
OLIT only
　NhAnchorDown, 37
　NhAnchorLeft, 38
　NhAnchorRight, 38
　NhAnchorUp, 37
OlStrings.h, 19
OlStrings.ph, 29
OpenWindows Regression Test
　　Harness, 165
OpenWindows V3.2, 3

P page down, 38
page left, 38
page right, 38
page up, 38
pagecounter, 145
panel.h, 19, 84
PANEL_LABEL_STRING
　description, 148
PANEL_LIST_STRING
　description, 148
PANEL_VALUE
　example, 21
　NhGetResources, 84
　NhSetResources, 119
　use with NhGetResources in
　　XView, 147
PartType
　table, 37
path, 12
Perl, 165

Perl headers, 29
Perl Interface External
　always use &, 36
　routines available, 33
　routines shared with other
　　interfaces, 34, 35, 36
　samples, 159
　string and int differences with C, 119
Perl interpreter, 24
pixel tolerance, 117
　default is zero, 117
　getting the current value, 80
platforms, 8
pointer, 101
popup windows
　NhWaitMap, 131
　NhWaitUnmap, 132
Programming Interfaces, 4

R read access is vital, 144
resource comparison, 30
resources
　setting them, 119
Return Type, 48
Root Window, 48
Root Window, ue NHRoot, 43
root, installation of XTrap as, 13
rotating array of statically allocated
　　strings, 124

S

Scrollbars
　NhAnchorDown, 37
　NhAnchorLeft, 38
　NhAnchorRight, 38
　NhArrowDown, 37
　NhArrowLeft, 37
　NhArrowRight, 37
　NhArrowUp, 37
　NhCableDown, 38
　NhCableLeft, 38

NhCableRight, 38
NhCableUp, 38
NhDragBox, 38
NhSetEventHandling, 114
scrolling left/right arrow boxes, 38
Scrolling Lists
    NhFindNthBox, 65
    NhFindNthXY, 66
    NhGetViewInfo, 87
    NHList, 38
    NhTitle, 38
    special routine list, 42
scrolling text
    left and right, 37
second client, necessity of, 150
Self-Executing Perl script, 26
self-test of No Hands, 159
self-tests, 159
Settings
    NhFindNthBox, 65
    NhFindNthXY, 66
    special routine list, 42
setuid
    problems with connecting, 144
shared libraries
    absolutely necessary, 144
shared library, 5
shell-script wrappers, 144
Shift key
    NhKeyEvent, 93
signal interference problems, 154
SIGPOLL problems, 154
sleep
    SIGPOLL will interrupt, 145
slider client program, 155
Sliders
    NhAnchorDown, 37
    NhAnchorLeft, 38
    NhAnchorRight, 38
    NhArrowUp, 37
    NhCableDown, 38
    NhCableLeft, 38
    NhCableRight, 38

NhCableUp, 38
NhDragBox, 38
NhGetResources, 84
NhLookupComponent, 96
NhSetEventHandling, 114
NhSetResources, 119
start up time, 143
String, 49
    used in NhGetResources, 83
    used in NhSetResources, 118
StringDefs.h, 19, 20
StringDefs.ph, 29
subpart becomes part of image name, 98
Success, 49
success code, 44
Support address, 3
sxpm, 31
synchronization
    NhBatchBegin, 52
    NhWaitMap, 131
    NhWaitUnmap, 132

T

Test Environment Toolkit (TET), 165
test name becomes part of image file
    name, 98
test purpose becomes part of image
    name, 98
TET
    interaction with No Hands, 154
    SIGPOLL problems, 154
    TET_CONFIG setting, 154
    TET_SIG_LEAVE is necessary, 154
Textedit widget contents, 151
TextFields
    NhArrowLeft, 37
    NhArrowRight, 37
    NhGetResources, 84
    NhSetResources, 119
    NhTextBox, 38
    XView example, 159
TEXTSW_CONTENTS
    description, 148

TEXTSW_INSERTION_POINT
 description, 148
thread of application, 123
thread-blocking problems, 52
thread-blocking widgets, 123
timeout setting
 when it is not long enough, 143
timeouts and NhSetXInput, 123
titlebar stippling, busy state, 146
toolkits, 2
triple clicking, 44
troubleshooting, 143

U

UNIX
 special environment
  considerations, 143
unprintable characters, 125
upper-case keysyms, don't use, 93

V variable argument list
 NhSetResources, 118
variable argument lists
 NhGetResources, 83
visible item, 66

W warnings, 44
Widget, 48
Window, 48
wrappers, 144

X

X event, 10
X event generation, 9
X event queue, 114
X event simulation, 35
X input loop, 123

X Pixmap Format, 72
X server, 9
xconnect
 example of use, 150
XK_Control_L, 93
XK_Tab, 93
Xlib, 19, 29
 client-side library, 6
XmNlabelString
 use with Motif, 154
XmStrDefs.ph, 29
XmStringDefs.h, 20
XOpenDisplay, 43
Xt
 client-side library, 6
XtNString
 use on OLIT widgets, 151
XTrap, 9
 installation, 13
XTrap requirement, 3
Xv_object, 48
XView
 busy windows, 146
 client-side library, 6
 getting Text Subwindow
  contents, 148
 include files, 19, 29
 interactions with No Hands, 146
 Object Attributes, 147
 Objects and Attributes, 147
 problems with notices, 123
 Sliders example, 155
 Textfields, 159
 use of NhGetResources, 147
XView only
 NhAnchorDown, 37
 NhAnchorLeft, 38
 NhAnchorRight, 38
 NhAnchorUp, 37
 use NhFindNthXY for checking
  checkboxes, 38
 uses Choices for checkboxes, 38
xview.h, 19, 84

Xv_object, 48
xvtypes.ph, 29, 84

What is claimed is:

1. A method executable in a computer system for testing a graphical user interface program, the program including a first component and a second component, the computer system including a processor, a memory, and a mechanism for communicating between the processor and the memory, the memory including the program and a test function component, the method comprising the steps of:

initiating execution of a test function from the test function component;

in response to execution of the test function, directly initiating execution of the first component;

capturing data produced by the first component; and determining whether the captured data indicates that the first component is performing properly, whereby execution of the first component is not initiated by the second component in response to the execution of the test function.

2. The method of claim 1 wherein the step of initiating execution of the test function further includes the steps of:

selecting from a test script, a request to initiate execution of at least one test function from the test function component;

sending the request to the program; and in response to receiving the request, initiating execution of the test function identified in the request.

3. The method of claim 2 wherein the test script is implemented as a first process and the graphical user interface program is implemented as a second process.

4. The method of claim 2 wherein a component, distinct from the test script and the program, implements the steps of selecting and sending.

5. The method of claim 1 wherein the test function component is included in the graphical user interface program.

6. The method of claim 5 further including the step of converting the graphical user interface program, including the test function component, into an object file.

7. The method of claim 1 wherein the test function component is part of a library.

8. The method of claim 7 wherein the library is dynamically linked to the graphical user interface program.

9. The method of claim 1 further including the step of testing the second component by examining whether a callback mechanism is invoked in response to receiving data in the program.

10. The method of claim 1 wherein the step of determining is performed by a test script.

11. A method executable in a computer system for testing a graphical user interface program, the program including an engine component and a graphical user interface component, the computer system including a display device, a processor, and a memory, the memory including the program and a test function component, the method comprising the steps of:

selecting from a test script, a request to initiate execution of at least one test function from the test function component;

sending the request to the program;

in response to receiving the request, initiating execution of the test function identified in the request;

in response to execution of the test function, initiating execution of the graphical user interface component;

capturing data produced by the graphical user interface component; and determining whether the captured data indicates that the graphical user interface component is performing properly, whereby the graphical user interface component is tested without initiating execution of the engine component.

12. A method executable in a computer system for testing a graphical user interface program, the program including a first component and a second component, the computer system including a processor, a memory, and a mechanism for communicating between the processor and the memory, the memory including the program and a test function component, the method comprising the steps of:

providing a first mechanism for initiating execution of a test function from the test function component;

providing a second mechanism, responsive to execution of the test function, for directly initiating execution of the first component;

providing a third mechanism for capturing data produced by the first component; and providing a fourth mechanism for determining whether the captured data indicates that the first component is performing properly, whereby execution of the first component is not initiated by the second component in response to the execution of the test function.

13. The method of claim 12 wherein the step of providing a mechanism for initiating execution of the test function further includes the steps of:

providing a fifth mechanism for selecting from a test script, a request to initiate execution of at least one test function from the test function component;

providing a sixth mechanism for sending the request to the program; and providing a seventh mechanism, responsive to receiving the request, for initiating execution of the test function identified in the request.

14. A method executable in a computer system for testing a graphical user interface program, the program including an engine component and a graphical user interface component, the computer system including a display device, a processor, and a memory, the memory including the program and a test function component, the method comprising the steps of:

providing a first mechanism for selecting from a test script, a request to initiate execution of at least one test function from the test function component;

providing a second mechanism for sending the request to the program;

providing a third mechanism, responsive to receiving the request, for initiating execution of the test function identified in the request;

providing a fourth mechanism, responsive to execution of the test function, for initiating execution of the graphical user interface component;

providing a fifth mechanism for capturing data produced by the graphical user interface component; and providing a sixth mechanism for determining whether the captured data indicates that the graphical user interface component is performing properly, whereby the graphical user interface component is tested without initiating execution of the engine component.

15. A computer system for testing a graphical user interface program, the program including a first component and a second component, the computer system including a processor, a memory, and a mechanism for communicating between the processor and the memory, the memory including the program and a test function component, the computer system comprising:

a first program mechanism configured to initiate execution of a test function from the test function component;

a second program mechanism, responsive to execution of the test function and configured to directly initiate execution of the first component;

a third program mechanism configured to capture data produced by the first component; and a fourth program mechanism configured to determine whether the captured data indicates that the first component is performing properly, whereby execution of the first component is not initiated by the second component in response to execution of the test function.

16. A computer system for testing a graphical user interface program, the program including an engine component and a graphical user interface component, the computer system including a display device, a processor, and a memory, the memory including the program and a test function component, the computer system comprising:

a first program mechanism configured to select from a test script, a request to initiate execution of at least one test function from the test function component;

a second program mechanism configured to send the request to the program;

a third program mechanism responsive to receiving the request and configured to initiate execution of the test function identified in the request;

a fourth program mechanism responsive to execution of the test function and configured to initiate execution of the graphical user interface component;

a fifth program mechanism configured to capture data produced by the graphical user interface component; and a sixth program mechanism configured to determine whether the captured data indicates that the graphical user interface component is performing properly, whereby the graphical user interface component is tested without initiating execution of the engine component.

17. A program storage device readable by a machine, tangibly embodying a program of instructions executable by the machine to perform method steps for testing a graphical user interface program, the program storage device including an engine component, a graphical user interface component, and a test function component, the method comprising the steps of:

initiating execution of a test function from the test function component;

in response to execution of the test function, directly initiating execution of the engine component;

capturing data produced by the engine component; and determining whether the captured data indicates that the engine component is performing properly, whereby execution of the engine component is not initiated by the graphical user interface component.

18. The method of claim 17 wherein the step of initiating execution of the test function further includes the steps of:

selecting from a test script, a request to initiate execution of at least one test function from the test function component;

sending the request to the program; and in response to receiving the request, initiating execution of the test function identified in the request.

19. A program storage device readable by a machine, tangibly embodying a program of instructions executable by the machine to perform method steps for testing a graphical user interface program, the program storage device including an engine component, a graphical user interface component, and a test function component, the method comprising the steps of:

selecting from a test script, a request to initiate execution of at least one test function from the test function component;

sending the request to the program;

in response to receiving the request, initiating execution of the test function identified in the request;

in response to execution of the test function, initiating execution of the graphical user interface component;

capturing data produced by the graphical user interface component; and determining whether the captured data indicates that the graphical user interface component is performing properly, whereby the graphical user interface component is tested without initiating execution of the engine component.

* * * * *